US012387731B2

(12) United States Patent
Dick et al.

(10) Patent No.: US 12,387,731 B2
(45) Date of Patent: *Aug. 12, 2025

(54) APPARATUS AND METHOD FOR STEREO FILLING IN MULTICHANNEL CODING

(71) Applicant: Fraunhofer-Gesellschaft zur Foerderung der angewandten Forschung e.V., Munich (DE)

(72) Inventors: Sascha Dick, Nuremberg (DE); Christian Helmrich, Berlin (DE); Nikolaus Rettelbach, Nuremberg (DE); Florian Schuh, Zirndorf (DE); Richard Fueg, Nuremberg (DE); Frederik Nagel, Heroldsberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,693

(22) Filed: Jul. 11, 2023

(65) Prior Publication Data

US 2023/0377586 A1 Nov. 23, 2023

Related U.S. Application Data

(63) Continuation of application No. 16/918,812, filed on Jul. 1, 2020, now Pat. No. 11,727,944, which is a
(Continued)

(30) Foreign Application Priority Data

Feb. 17, 2016 (EP) .................................... 16156209

(51) Int. Cl.
*G10L 19/008* (2013.01)
*G10L 19/028* (2013.01)
*G10L 19/035* (2013.01)

(52) U.S. Cl.
CPC .......... *G10L 19/008* (2013.01); *G10L 19/028* (2013.01); *G10L 19/035* (2013.01)

(58) Field of Classification Search
CPC .... G10L 19/008; G10L 19/035; G10L 19/028
See application file for complete search history.

(56) References Cited

U.S. PATENT DOCUMENTS

| | | | |
|---|---|---|---|
| 11,727,944 | B2 | 8/2023 | Dick et al. |
| 2007/0297616 | A1 | 12/2007 | Plogsties et al. |

(Continued)

FOREIGN PATENT DOCUMENTS

| | | | |
|---|---|---|---|
| CA | 2899657 | A1 | 8/2014 |
| CN | 101133680 | A | 2/2008 |

(Continued)

OTHER PUBLICATIONS

ETSI TS 103 190 V1.1.1 (Apr. 2014), "Digital Audio Compression (AC-4) Standard", Technical Specification, EBU, Operating Eurovision, Apr. 2014, pp. 1-295.

(Continued)

*Primary Examiner* — Brian L Albertalli
(74) *Attorney, Agent, or Firm* — Perkins Cole LLP; Michael A. Glenn

(57) ABSTRACT

An apparatus for decoding an encoded multichannel signal of a current frame to obtain three or more current audio output channels is provided. A multichannel processor is adapted to select two decoded channels from three or more decoded channels depending on first multichannel parameters. Moreover, the multichannel processor is adapted to generate a first group of two or more processed channels based on the selected channels. A noise filling module is adapted to identify for at least one of the selected channels, one or more frequency bands, within which all spectral lines are quantized to zero, and to generate a mixing channel (Continued)

using, depending on side information, a proper subset of three or more previous audio output channels that have been decoded, and to fill the spectral lines of frequency bands, within which all spectral lines are quantized to zero, with noise generated using spectral lines of the mixing channel.

21 Claims, 17 Drawing Sheets

Related U.S. Application Data continuation of application No. 15/999,260, filed on Aug. 17, 2018, now Pat. No. 10,733,999, which is a continuation of application No. PCT/EP2017/053272, filed on Feb. 14, 2017.

(56) References Cited

U.S. PATENT DOCUMENTS

| | | | |
|---|---|---|---|
| 2010/0003545 | A1 | 1/2010 | Hickey et al. |
| 2010/0114585 | A1 | 5/2010 | Yoon et al. |
| 2010/0322429 | A1 | 12/2010 | Norvell et al. |
| 2010/0324915 | A1 | 12/2010 | Seo et al. |
| 2011/0173012 | A1 | 7/2011 | Rettelbach et al. |
| 2011/0224994 | A1 | 9/2011 | Norvell et al. |
| 2012/0232908 | A1 | 9/2012 | Terriberry et al. |
| 2012/0243692 | A1 | 9/2012 | Ramamoorthy |
| 2012/0288117 | A1 | 11/2012 | Kim et al. |
| 2013/0018660 | A1 | 1/2013 | Qi et al. |
| 2013/0030817 | A1 | 1/2013 | Purnhagen et al. |
| 2013/0030819 | A1 | 1/2013 | Purnhagen et al. |
| 2013/0266145 | A1 | 10/2013 | Purnhagen et al. |
| 2015/0287417 | A1 | 10/2015 | Disch et al. |
| 2015/0380001 | A1 | 12/2015 | Purnhagen et al. |
| 2016/0140974 | A1 | 5/2016 | Valero et al. |
| 2016/0155447 | A1 | 6/2016 | Klejsa et al. |

FOREIGN PATENT DOCUMENTS

| | | | |
|---|---|---|---|
| CN | 102089806 | A | 6/2011 |
| CN | 102687198 | A | 9/2012 |
| CN | 102947880 | A | 2/2013 |
| CN | 103098126 | A | 5/2013 |
| CN | 104769671 | A | 7/2015 |
| CN | 104851427 | A | 8/2015 |
| EP | 2830060 | A1 | 1/2015 |
| JP | 2016530557 | A | 9/2016 |
| JP | 2016535316 | A | 11/2016 |
| RU | 2406164 | C2 | 12/2010 |
| RU | 2554844 | C2 | 6/2015 |
| WO | 2009056035 | A1 | 5/2009 |
| WO | 2015010998 | A1 | 1/2015 |
| WO | 2015011061 | A1 | 1/2015 |
| WO | 2015036351 | A1 | 3/2015 |

OTHER PUBLICATIONS

Helmrich, Christian R, et al., "Low-Complexity Semi-Parametric Joint-Stereo Audio Transform Coding", 23rd European Signal Processing Conference (EUSIPCO), Sep. 2015, pp. 799-803.

ISO/IEC 14496-3, "Information technology—Coding of audio-visual objects, Part 3 Audio", Proof Reference No. ISO/IEC 14496-3:2009(E), Fourth Edition, 2009, 1416 pp.

ISO/IEC 23003-1, "Information technology—MPEG audio technologies Part 1—MPEG Surround", First Edition, Feb. 15, 2007, 288 pp.

ISO/IEC DIS 23008-3, "[Part 1 of 3] Draft Information technology—High efficiency coding and media delivery in hetergeneous environments—Part 3: 3D audio", ISO/IEC JTC 1/SC 29/WG 11. Jul. 25, 2014., Jul. 25, 2014, 243 pp.

ISO/IEC DIS 23008-3, "[Part 2 of 3] Draft Information technology—High efficiency coding and media delivery in hetergeneous environments—Part 3: 3D audio", ISO/IEC JTC 1/SC 29/WG 11. Jul. 25, 2014., Jul. 25, 2014, 113 pp.

ISO/IEC DIS 23008-3, "[Part 3 of 3] Draft Information technology—High efficiency coding and media delivery in hetergeneous environments—Part 3: 3D audio", ISO/IEC JTC 1/SC 29/WG 11. Jul. 25, 2014., Jul. 25, 2014, 79 pp.

ISO/IEC FDIS, "Information Technology—MPEG Audio Technologies—Part 3: Unified Speech and Audio Coding", ISO/IEC FDIS 23003-3:2012, 2012, 286 pp.

Moriya, Takehiro, et al., "Overview of 3GPP Standard EVS Codec—High Performance Speech Acoustic Coding for VoLTE-", IEICE Technical Report, Mar. 2015, vol. 114, No. 473, p. 25-30, pp. 25-30.

Neuendorf, Max, et al., "MPEG Unified Speech and Audio Coding—The ISO/MPEG Standard for High-Efficienacy Audio Coding of All Content Types", Audio Engineering Society Convention Paper 8654, Presented at the 132nd ConventionBudapest, Hungary. Also to appear in the Journal of the AES, 2013, 22 pp.

APPARATUS AND METHOD FOR STEREO FILLING IN MULTICHANNEL CODING

CROSS-REFERENCES TO RELATED APPLICATIONS

This application is a continuation of copending U.S. patent application Ser. No. 16/918,812 filed Jul. 1, 2020, which is a continuation of U.S. patent application Ser. No. 15/999,260, filed Aug. 17, 2018, which in turn is a continuation of copending International Application No. PCT/EP2017/053272, filed Feb. 14, 2017, which is incorporated herein by reference in its entirety, and additionally claims priority from European Application No. 16156209.5, filed Feb. 17, 2016, which is incorporated herein by reference in its entirety.

The present invention relates to audio signal coding and, in particular, to an apparatus and method for stereo filling in multichannel coding.

BACKGROUND OF THE INVENTION

Audio coding is the domain of compression that deals with exploiting redundancy and irrelevancy in audio signals.

In MPEG USAC (see, e.g., [3]), joint stereo coding of two channels is performed using complex prediction, MPS 2-1-2 or unified stereo with band-limited or full-band residual signals. MPEG surround (see, e.g., [4]) hierarchically combines One-To-Two (OTT) and Two-To-Three (TTT) boxes for joint coding of multichannel audio with or without transmission of residual signals.

In MPEG-H, Quad Channel Elements hierarchically apply MPS 2-1-2 stereo boxes followed by complex prediction/MS stereo boxes building a fixed 4×4 remixing tree, (see, e.g., [1]).

AC4 (see, e.g., [6]) introduces new 3-, 4- and 5-channel elements that allow for remixing transmitted channels via a transmitted mix matrix and subsequent joint stereo coding information. Further, prior publications suggest to use orthogonal transforms like Karhunen-Loeve Transform (KLT) for enhanced multichannel audio coding (see, e.g., [7]).

For example, in the 3D audio context, loudspeaker channels are distributed in several height layers, resulting in horizontal and vertical channel pairs. Joint coding of only two channels as defined in USAC is not sufficient to consider the spatial and perceptual relations between channels. MPEG Surround is applied in an additional pre-/postprocessing step, residual signals are transmitted individually without the possibility of joint stereo coding, e.g. to exploit dependencies between left and right vertical residual signals. In AC-4 dedicated N-channel elements are introduced that allow for efficient encoding of joint coding parameters, but fail for generic speaker setups with more channels as proposed for new immersive playback scenarios (7.1+4, 22.2). MPEG-H Quad Channel element is also restricted to only 4 channels and cannot be dynamically applied to arbitrary channels but only a pre-configured and fixed number of channels.

The MPEG-H Multichannel Coding Tool allows the creation of an arbitrary tree of discretely coded stereo boxes, i.e. jointly coded channel pairs, see [2].

A problem that often arises in audio signal coding is caused by quantization, e.g., spectral quantization. Quantization may possibly result in spectral holes. For example, all spectral values in a particular frequency band may be set to zero on the encoder side as a result of quantization. For example, the exact value of such spectral lines before quantization may be relatively low and quantization then may lead to a situation, where the spectral values of all spectral lines, for example, within a particular frequency band have been set to zero. On the decoder side, when decoding, this may lead to undesired spectral holes.

Modern frequency-domain speech/audio coding systems such as the Opus/Celt codec of the IETF [9], MPEG-4 (HE-)AAC [10] or, in particular, MPEG-D xHE-AAC (USAC) [11], offer means to code audio frames using either one long transform—a long block—or eight sequential short transforms—short blocks—depending on the temporal stationarity of the signal. In addition, for low-bitrate coding these schemes provide tools to reconstruct frequency coefficients of a channel using pseudorandom noise or lower-frequency coefficients of the same channel. In xHE-AAC, these tools are known as noise filling and spectral band replication, respectively.

However, for very tonal or transient stereophonic input, noise filling and/or spectral band replication alone limit the achievable coding quality at very low bitrates, mostly since too many spectral coefficients of both channels need to be transmitted explicitly.

MPEG-H Stereo Filling is a parametric tool which relies on the use of a previous frame's downmix to improve the filling of spectral holes caused by quantization in the frequency domain. Like noise filling, Stereo Filling operates directly in the MDCT domain of the MPEG-H core coder, see [1], [5], [8].

However, using of MPEG Surround and Stereo Filling in MPEG-H is restricted to fixed channel pair elements and therefore cannot exploit time-variant inter-channel dependencies.

The Multichannel Coding Tool (MCT) in MPEG-H allows adapting to varying inter-channel dependencies but, due to usage of single channel elements in typical operating configurations, does not allow Stereo Filling. The conventional technology does not disclose perceptually optimal ways to generate previous frame's downmixes in case of time-variant, arbitrary jointly coded channel pairs. Using noise filling as a substitute for stereo filling in combination with the MCT to fill spectral holes would lead to noise artifacts, especially for tonal signals.

SUMMARY

An embodiment may have an apparatus for decoding a previous encoded multichannel signal of a previous frame to obtain three or more previous audio output channels, and for decoding a current encoded multichannel signal of a current frame to obtain three or more current audio output channels, wherein the apparatus may have an interface, a channel decoder, a multichannel processor for generating the three or more current audio output channels, and a noise filling module, wherein the interface is adapted to receive the current encoded multichannel signal, and to receive side information having first multichannel parameters, wherein the channel decoder is adapted to decode the current encoded multichannel signal of the current frame to obtain a set of three or more decoded channels of the current frame, wherein the multichannel processor is adapted to select a first selected pair of two decoded channels from the set of three or more decoded channels depending on the first multichannel parameters, wherein the multichannel processor is adapted to generate a first group of two or more processed channels based on said first selected pair of two decoded channels to obtain an updated set of three or more decoded channels, wherein, before the multichannel processor generates the first pair of two or more processed channels based on said first selected pair of two decoded channels, the noise filling module is adapted to identify for at least one of the two channels of said first selected pair of two decoded channels, one or more frequency bands, within which all spectral lines are quantized to zero, and to generate a mixing channel using two or more, but not all of the three or more previous audio output channels, and to fill the spectral lines of the one or more frequency bands, within which all spectral lines are quantized to zero, with noise generated using spectral lines of the mixing channel, wherein the noise filling module is adapted to select the two or more previous audio output channels that are used for generating the mixing channel from the three or more previous audio output channels depending on the side information.

According to another embodiment, an apparatus for encoding a multichannel signal having at least three channels may have: an iteration processor being adapted to calculate, in a first iteration step, inter-channel correlation values between each pair of the at least three channels, for selecting, in the first iteration step, a pair having a highest value or having a value above a threshold, and for processing the selected pair using a multichannel processing operation to derive initial multichannel parameters for the selected pair and to derive first processed channels, wherein the iteration processor is adapted to perform the calculating, the selecting and the processing in a second iteration step using at least one of the processed channels to derive further multichannel parameters and second processed channels; a channel encoder being adapted to encode channels resulting from an iteration processing performed by the iteration processor to obtain encoded channels; and an output interface being adapted to generate an encoded multichannel signal having the encoded channels, the initial multichannel parameters and the further multichannel parameters and having an information indicating whether or not an apparatus for decoding shall fill spectral lines of one or more frequency bands, within which all spectral lines are quantized to zero, with noise generated based on previously decoded audio output channels that have been previously decoded by the apparatus for decoding.

According to another embodiment, a system may have: an apparatus for encoding a multichannel signal having at least three channels, wherein the apparatus may have: an iteration processor being adapted to calculate, in a first iteration step, inter-channel correlation values between each pair of the at least three channels, for selecting, in the first iteration step, a pair having a highest value or having a value above a threshold, and for processing the selected pair using a multichannel processing operation to derive initial multichannel parameters for the selected pair and to derive first processed channels, wherein the iteration processor is adapted to perform the calculating, the selecting and the processing in a second iteration step using at least one of the processed channels to derive further multichannel parameters and second processed channels; a channel encoder being adapted to encode channels resulting from an iteration processing performed by the iteration processor to obtain encoded channels; and an output interface being adapted to generate an encoded multichannel signal having the encoded channels, the initial multichannel parameters and the further multichannel parameters and having an information indicating whether or not an apparatus for decoding shall fill spectral lines of one or more frequency bands, within which all spectral lines are quantized to zero, with noise generated based on previously decoded audio output channels that have been previously decoded by the apparatus for decoding; and an inventive apparatus for decoding, wherein the apparatus for decoding is configured to receive the encoded multichannel signal, being generated by the apparatus for encoding, from the apparatus for encoding.

According to another embodiment, a method for decoding a previous encoded multichannel signal of a previous frame to obtain three or more previous audio output channels, and for decoding a current encoded multichannel signal of a current frame to obtain three or more current audio output channels may have the steps of: receiving the current encoded multichannel signal, and receiving side information including first multichannel parameters; decoding the current encoded multichannel signal of the current frame to obtain a set of three or more decoded channels of the current frame; selecting a first selected pair of two decoded channels from the set of three or more decoded channels depending on the first multichannel parameters; generating a first group of two or more processed channels based on said first selected pair of two decoded channels to obtain an updated set of three or more decoded channels; wherein, before the first pair of two or more processed channels is generated based on said first selected pair of two decoded channels, the following steps are conducted: identifying for at least one of the two channels of said first selected pair of two decoded channels, one or more frequency bands, within which all spectral lines are quantized to zero, and generating a mixing channel using two or more, but not all of the three or more previous audio output channels, and filling the spectral lines of the one or more frequency bands, within which all spectral lines are quantized to zero, with noise generated using spectral lines of the mixing channel, wherein selecting the two or more previous audio output channels that are used for generating the mixing channel from the three or more previous audio output channels is conducted depending on the side information.

According to another embodiment, a method for encoding a multichannel signal having at least three channels may have the steps of: calculating, in a first iteration step, inter-channel correlation values between each pair of the at least three channels, for selecting, in the first iteration step, a pair having a highest value or having a value above a threshold, and processing the selected pair using a multichannel processing operation to derive initial multichannel parameters for the selected pair and to derive first processed channels; performing the calculating, the selecting and the processing in a second iteration step using at least one of the processed channels to derive further multichannel parameters and second processed channels; encoding channels resulting from an iteration processing performed by the iteration processor to obtain encoded channels; and generating an encoded multichannel signal having the encoded channels, the initial multichannel parameters and the further multichannel parameters and having an information indicating whether or not an apparatus for decoding shall fill spectral lines of one or more frequency bands, within which all spectral lines are quantized to zero, with noise generated based on previously decoded audio output channels that have been previously decoded by the apparatus for decoding.

According to an embodiment, a non-transitory digital storage medium may have a computer program stored thereon to perform the method for decoding a previous encoded multichannel signal of a previous frame to obtain three or more previous audio output channels, and for decoding a current encoded multichannel signal of a current frame to obtain three or more current audio output channels, the method having the steps of: receiving the current encoded multichannel signal, and receiving side information having first multichannel parameters; decoding the current encoded multichannel signal of the current frame to obtain a set of three or more decoded channels of the current frame; selecting a first selected pair of two decoded channels from the set of three or more decoded channels depending on the first multichannel parameters; generating a first group of two or more processed channels based on said first selected pair of two decoded channels to obtain an updated set of three or more decoded channels; wherein, before the first pair of two or more processed channels is generated based on said first selected pair of two decoded channels, the following steps are conducted: identifying for at least one of the two channels of said first selected pair of two decoded channels, one or more frequency bands, within which all spectral lines are quantized to zero, and generating a mixing channel using two or more, but not all of the three or more previous audio output channels, and filling the spectral lines of the one or more frequency bands, within which all spectral lines are quantized to zero, with noise generated using spectral lines of the mixing channel, wherein selecting the two or more previous audio output channels that are used for generating the mixing channel from the three or more previous audio output channels is conducted depending on the side information, when said computer program is run by a computer.

According to an embodiment, a non-transitory digital storage medium may have a computer program stored thereon to perform the method encoding a multichannel signal having at least three channels, the method having the steps of: calculating, in a first iteration step, inter-channel correlation values between each pair of the at least three channels, for selecting, in the first iteration step, a pair having a highest value or having a value above a threshold, and processing the selected pair using a multichannel processing operation to derive initial multichannel parameters for the selected pair and to derive first processed channels; performing the calculating, the selecting and the processing in a second iteration step using at least one of the processed channels to derive further multichannel parameters and second processed channels; encoding channels resulting from an iteration processing performed by the iteration processor to obtain encoded channels; and generating an encoded multichannel signal having the encoded channels, the initial multichannel parameters and the further multichannel parameters and having an information indicating whether or not an apparatus for decoding shall fill spectral lines of one or more frequency bands, within which all spectral lines are quantized to zero, with noise generated based on previously decoded audio output channels that have been previously decoded by the apparatus for decoding, when said computer program is run by a computer.

According to an embodiment, an encoded multichannel signal may have: encoded channels, multichannel parameters; and information indicating whether or not an apparatus for decoding shall fill spectral lines of one or more frequency bands, within which all spectral lines are quantized to zero, with spectral data generated based on previously decoded audio output channels that have been previously decoded by the apparatus for decoding.

An apparatus for decoding an encoded multichannel signal of a current frame to obtain three or more current audio output channels is provided. A multichannel processor is adapted to select two decoded channels from three or more decoded channels depending on first multichannel parameters. Moreover, the multichannel processor is adapted to generate a first group of two or more processed channels based on said selected channels.

A noise filling module is adapted to identify for at least one of the selected channels, one or more frequency bands, within which all spectral lines are quantized to zero, and to generate a mixing channel using, depending on side information, a proper subset of three or more previous audio output channels that have been decoded, and to fill the spectral lines of frequency bands, within which all spectral lines are quantized to zero, with noise generated using spectral lines of the mixing channel.

According to embodiments, an apparatus for decoding a previous encoded multichannel signal of a previous frame to obtain three or more previous audio output channels, and for decoding a current encoded multichannel signal of a current frame to obtain three or more current audio output channels is provided.

The apparatus comprises an interface, a channel decoder, a multichannel processor for generating the three or more current audio output channels, and a noise filling module.

The interface is adapted to receive the current encoded multichannel signal, and to receive side information comprising first multichannel parameters.

The channel decoder is adapted to decode the current encoded multichannel signal of the current frame to obtain a set of three or more decoded channels of the current frame.

The multichannel processor is adapted to select a first selected pair of two decoded channels from the set of three or more decoded channels depending on the first multichannel parameters.

Moreover, the multichannel processor is adapted to generate a first group of two or more processed channels based on said first selected pair of two decoded channels to obtain an updated set of three or more decoded channels.

Before the multichannel processor generates the first pair of two or more processed channels based on said first selected pair of two decoded channels, the noise filling module is adapted to identify for at least one of the two channels of said first selected pair of two decoded channels, one or more frequency bands, within which all spectral lines are quantized to zero, and to generate a mixing channel using two or more, but not all of the three or more previous audio output channels, and to fill the spectral lines of the one or more frequency bands, within which all spectral lines are quantized to zero, with noise generated using spectral lines of the mixing channel, wherein the noise filling module is adapted to select the two or more previous audio output channels that are used for generating the mixing channel from the three or more previous audio output channels depending on the side information.

A particular concept of embodiments that may be employed by the noise filling module that specifies how to generate and fill noise is referred to as Stereo Filling.

Moreover, an apparatus for encoding a multichannel signal having at least three channels is provided.

The apparatus comprises an iteration processor being adapted to calculate, in a first iteration step, inter-channel correlation values between each pair of the at least three channels, for selecting, in the first iteration step, a pair having a highest value or having a value above a threshold, and for processing the selected pair using a multichannel processing operation to derive initial multichannel parameters for the selected pair and to derive first processed channels.

The iteration processor is adapted to perform the calculating, the selecting and the processing in a second iteration step using at least one of the processed channels to derive further multichannel parameters and second processed channels.

Moreover, the apparatus comprises a channel encoder being adapted to encode channels resulting from an iteration processing performed by the iteration processor to obtain encoded channels.

Furthermore, the apparatus comprises an output interface being adapted to generate an encoded multichannel signal having the encoded channels, the initial multichannel parameters and the further multichannel parameters and having an information indicating whether or not an apparatus for decoding shall fill spectral lines of one or more frequency bands, within which all spectral lines are quantized to zero, with noise generated based on previously decoded audio output channels that have been previously decoded by the apparatus for decoding.

Moreover, a method for decoding a previous encoded multichannel signal of a previous frame to obtain three or more previous audio output channels, and for decoding a current encoded multichannel signal of a current frame to obtain three or more current audio output channels is provided. The method comprises:

Receiving the current encoded multichannel signal, and receiving side information comprising first multichannel parameters.

Decoding the current encoded multichannel signal of the current frame to obtain a set of three or more decoded channels of the current frame.

Selecting a first selected pair of two decoded channels from the set of three or more decoded channels depending on the first multichannel parameters.

Generating a first group of two or more processed channels based on said first selected pair of two decoded channels to obtain an updated set of three or more decoded channels.

Before the first pair of two or more processed channels is generated based on said first selected pair of two decoded channels, the following steps are conducted:

Identifying for at least one of the two channels of said first selected pair of two decoded channels, one or more frequency bands, within which all spectral lines are quantized to zero, and generating a mixing channel using two or more, but not all of the three or more previous audio output channels, and filling the spectral lines of the one or more frequency bands, within which all spectral lines are quantized to zero, with noise generated using spectral lines of the mixing channel, wherein selecting the two or more previous audio output channels that are used for generating the mixing channel from the three or more previous audio output channels is conducted depending on the side information.

Furthermore, a method for encoding a multichannel signal having at least three channels is provided. The method comprises:

Calculating, in a first iteration step, inter-channel correlation values between each pair of the at least three channels, for selecting, in the first iteration step, a pair having a highest value or having a value above a threshold, and processing the selected pair using a multichannel processing operation to derive initial multichannel parameters for the selected pair and to derive first processed channels.

Performing the calculating, the selecting and the processing in a second iteration step using at least one of the processed channels to derive further multichannel parameters and second processed channels.

Encoding channels resulting from an iteration processing performed by the iteration processor to obtain encoded channels. And:

Generating an encoded multichannel signal having the encoded channels, the initial multichannel parameters and the further multichannel parameters and having an information indicating whether or not an apparatus for decoding shall fill spectral lines of one or more frequency bands, within which all spectral lines are quantized to zero, with noise generated based on previously decoded audio output channels that have been previously decoded by the apparatus for decoding.

Moreover, computer programs are provided, wherein each of the computer programs is configured to implement one of the above-described methods when being executed on a computer or signal processor, so that each of the above-described methods is implemented by one of the computer programs.

Furthermore, an encoded multichannel signal is provided. The encoded multichannel signal comprises encoded channels and multichannel parameters and information indicating whether or not an apparatus for decoding shall fill spectral lines of one or more frequency bands, within which all spectral lines are quantized to zero, with spectral data generated based on previously decoded audio output channels that have been previously decoded by the apparatus for decoding.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
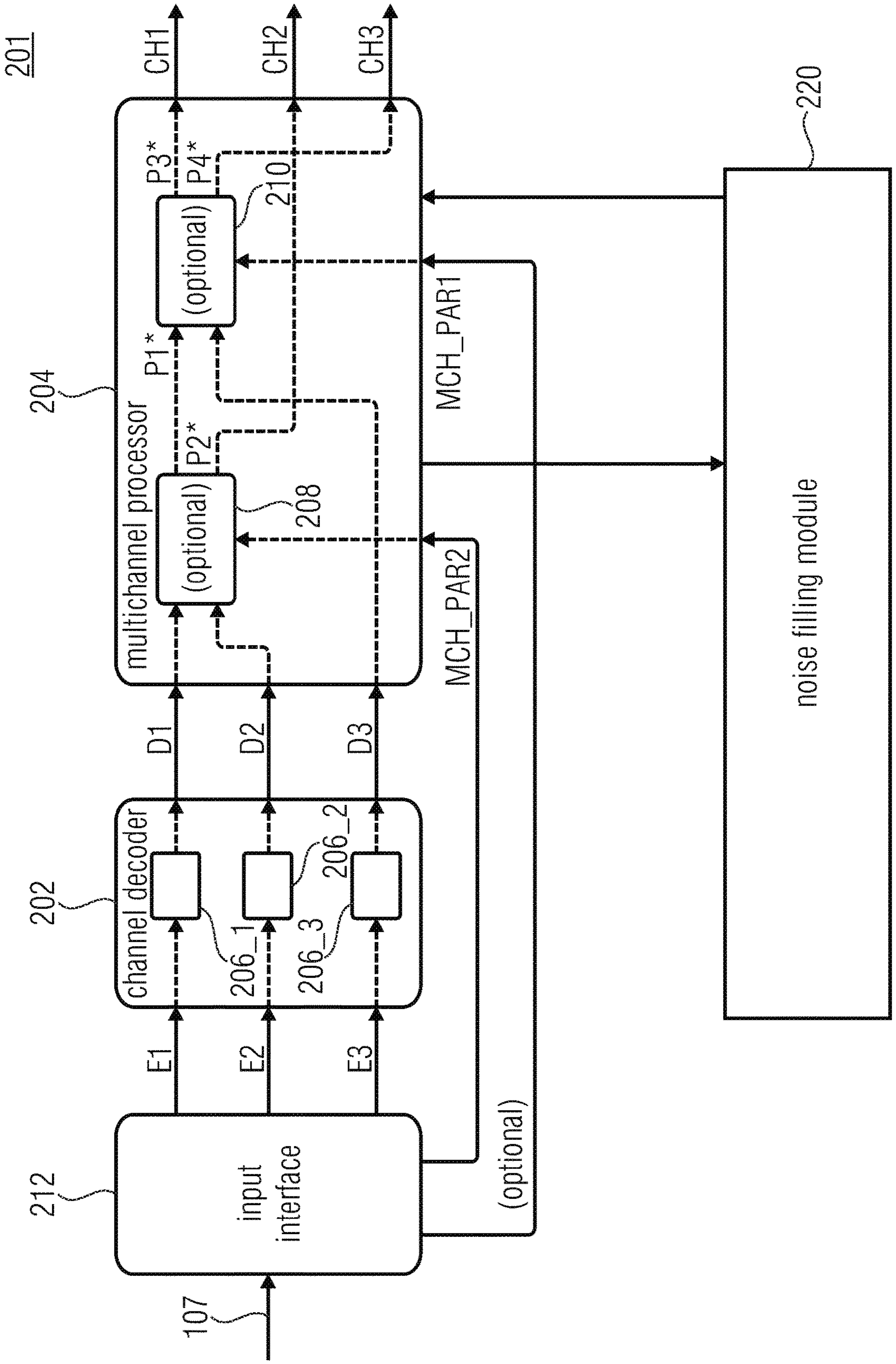
FIG. 1*a* shows an apparatus for decoding according to an embodiment.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Before describing the apparatus 201 for decoding of FIG. 1*a*, at first, noise filling for multichannel audio coding is described. In embodiments, the noise filing module 220 of FIG. 1*a* may, e.g., be configured to conduct on or more of the technologies below that are described regarding noise filling for multichannel audio coding.

Figure 2:
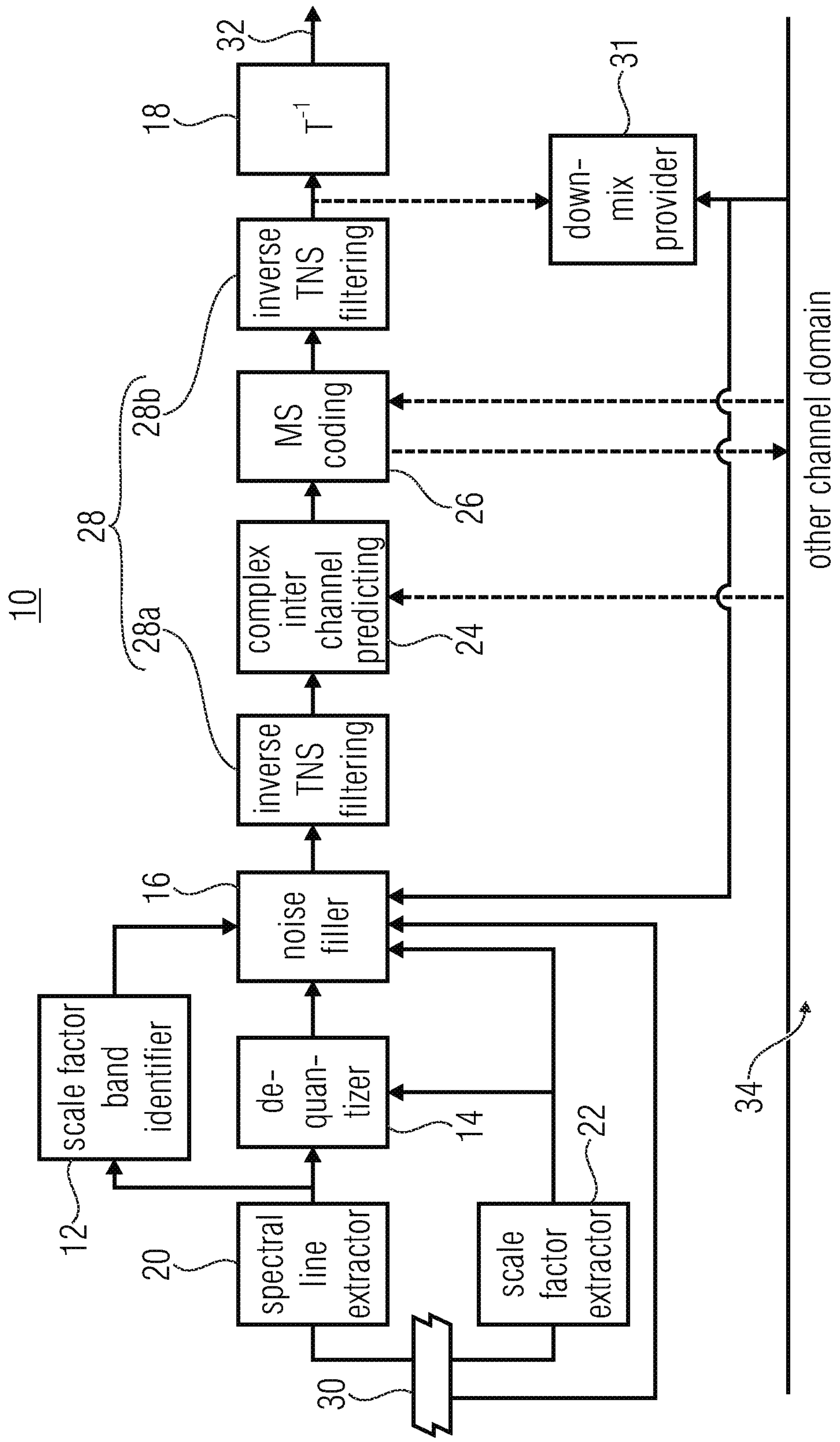
FIG. 2 shows a block diagram of a parametric frequency-domain decoder according to an embodiment of the present application.

FIG. 2 shows a frequency-domain audio decoder in accordance with an embodiment of the present application. The decoder is generally indicated using reference sign 10 and comprises a scale factor band identifier 12, a dequantizer 14, a noise filler 16 and an inverse transformer 18 as well as a spectral line extractor 20 and a scale factor extractor 22.

Optional further elements which might be comprised by decoder 10 encompass a complex stereo predictor 24, an MS (mid-side) decoder 26 and an inverse TNS (Temporal Noise Shaping) filter tool of which two instantiations 28*a* and 28*b* are shown in FIG. 2. In addition, a downmix provider is shown and outlined in more detail below using reference sign 30.

The frequency-domain audio decoder 10 of FIG. 2 is a parametric decoder supporting noise filling according to which a certain zero-quantized scale factor band is filled with noise using the scale factor of that scale factor band as a means to control the level of the noise filled into that scale factor band. Beyond this, the decoder 10 of FIG. 2 represents a multichannel audio decoder configured to reconstruct a multichannel audio signal from an inbound data stream 30. FIG. 2, however, concentrates on decoder's 10 elements involved in reconstructing one of the multichannel audio signals coded into data stream 30 and outputs this (output) channel at an output 32. A reference sign 34 indicates that decoder 10 may comprise further elements or may comprise some pipeline operation control responsible for reconstructing the other channels of the multichannel audio signal wherein the description brought forward below indicates how the decoder's 10 reconstruction of the channel of interest at output 32 interacts with the decoding of the other channels.

The multichannel audio signal represented by data stream 30 may comprise two or more channels. In the following, the description of the embodiments of the present application concentrate on the stereo case where the multichannel audio signal merely comprises two channels, but in principle the embodiments brought forward in the following may be readily transferred onto alternative embodiments concerning multichannel audio signals and their coding comprising more than two channels.

As will further become clear from the description of FIG. 2 below, the decoder 10 of FIG. 2 is a transform decoder. That is, according to the coding technique underlying decoder 10, the channels are coded in a transform domain such as using a lapped transform of the channels. Moreover, depending on the creator of the audio signal, there are time phases during which the channels of the audio signal largely represent the same audio content, deviating from each other merely by minor or deterministic changes therebetween, such as different amplitudes and/or phase in order to represent an audio scene where the differences between the channels enable the virtual positioning of an audio source of the audio scene with respect to virtual speaker positions associated with the output channels of the multichannel audio signal. At some other temporal phases, however, the different channels of the audio signal may be more or less uncorrelated to each other and may even represent, for example, completely different audio sources.

In order to account for the possibly time-varying relationship between the channels of the audio signal, the audio codec underlying decoder 10 of FIG. 2 allows for a time-varying use of different measures to exploit inter-channel redundancies. For example, MS coding allows for switching between representing the left and right channels of a stereo audio signal as they are or as a pair of M (mid) and S (side) channels representing the left and right channels' downmix and the halved difference thereof, respectively. That is, there are continuously—in a spectrotemporal sense—spectrograms of two channels transmitted by data stream 30, but the meaning of these (transmitted) channels may change in time and relative to the output channels, respectively.

Complex stereo prediction—another inter-channel redundancy exploitation tool—enables, in the spectral domain, predicting one channel's frequency-domain coefficients or spectral lines using spectrally co-located lines of another channel. More details concerning this are described below.

Figure 3:
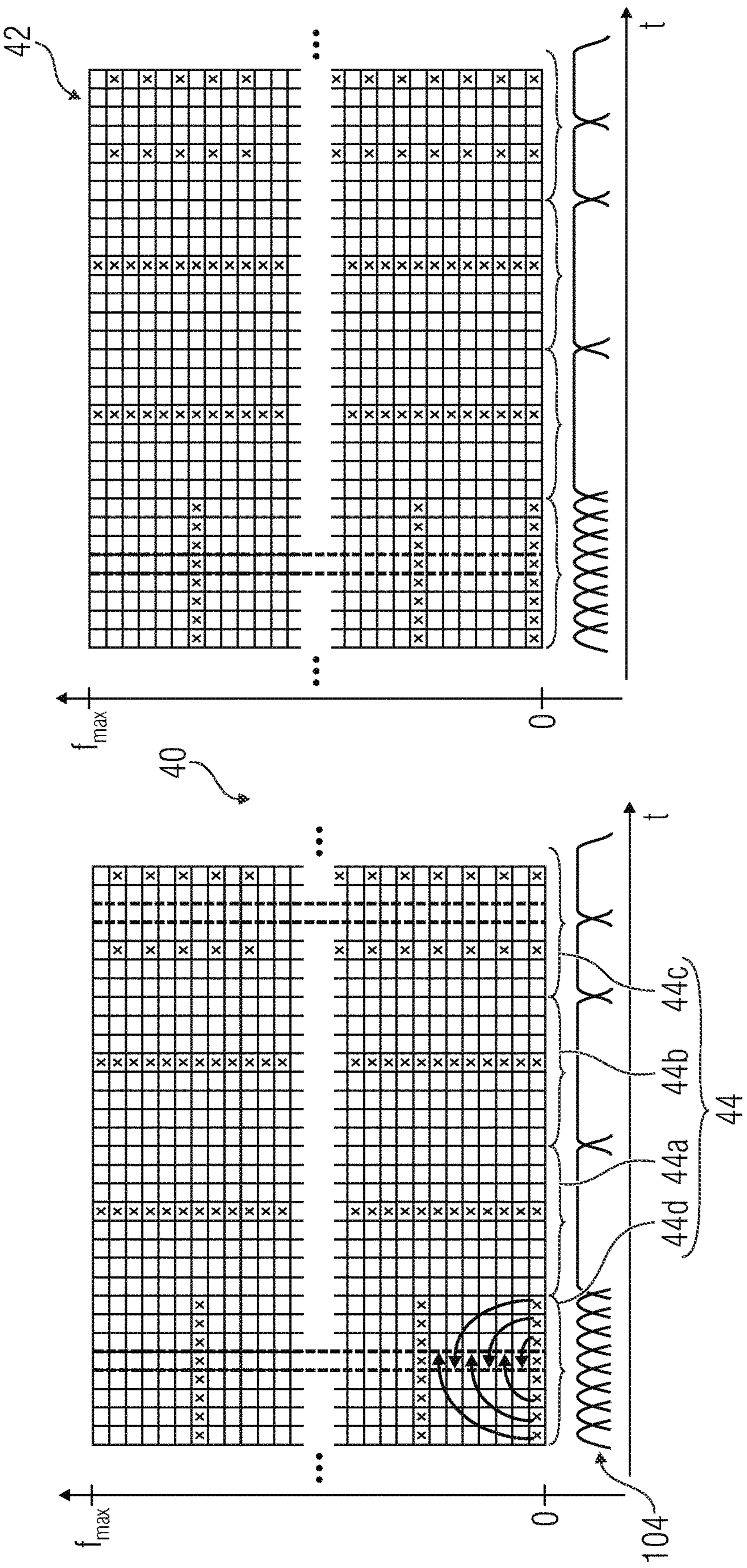
FIG. 3 shows a schematic diagram illustrating the sequence of spectra forming the spectrograms of channels of a multichannel audio signal in order to ease the understanding of the description of the decoder of FIG. 2.

In order to facilitate the understanding of the subsequent description of FIG. 2 and its components shown therein, FIG. 3 shows, for the exemplary case of a stereo audio signal represented by data stream 30, a possible way how sample values for the spectral lines of the two channels might be coded into data stream 30 so as to be processed by decoder 10 of FIG. 2. In particular, while at the upper half of FIG. 3 the spectrogram 40 of a first channel of the stereo audio signal is depicted, the lower half of FIG. 3 illustrates the spectrogram 42 of the other channel of the stereo audio signal. Again, it is worthwhile to note that the "meaning" of spectrograms 40 and 42 may change over time due to, for example, a time-varying switching between an MS coded domain and a non-MS-coded domain. In the first instance, spectrograms 40 and 42 relate to an M and S channel, respectively, whereas in the latter case spectrograms 40 and 42 relate to left and right channels. The switching between MS coded domain and non-coded MS coded domain may be signaled in the data stream 30.

FIG. 3 shows that the spectrograms 40 and 42 may be coded into data stream 30 at a time-varying spectrotemporal resolution. For example, both (transmitted) channels may be, in a time-aligned manner, subdivided into a sequence of frames indicated using curly brackets 44 which may be equally long and abut each other without overlap. As just mentioned, the spectral resolution at which spectrograms 40 and 42 are represented in data stream 30 may change over time. Preliminarily, it is assumed that the spectrotemporal resolution changes in time equally for spectrograms 40 and 42, but an extension of this simplification is also feasible as will become apparent from the following description. The change of the spectrotemporal resolution is, for example, signaled in data stream 30 in units of the frames 44. That is, the spectrotemporal resolution changes in units of frames 44. The change in the spectrotemporal resolution of the spectrograms 40 and 42 is achieved by switching the transform length and the number of transforms used to describe the spectrograms 40 and 42 within each frame 44. In the example of FIG. 3, frames 44*a* and 44*b* exemplify frames where one long transform has been used in order to sample the audio signal's channels therein, thereby resulting in highest spectral resolution with one spectral line sample value per spectral line for each of such frames per channel. In FIG. 3, the sample values of the spectral lines are indicated using small crosses within the boxes, wherein the boxes, in turn, are arranged in rows and columns and shall represent a spectral temporal grid with each row corresponding to one spectral line and each column corresponding to sub-intervals of frames 44 corresponding to the shortest transforms involved in forming spectrograms 40 and 42. In particular, FIG. 3 illustrates, for example, for frame 44*d*, that a frame may alternatively be subject to consecutive transforms of shorter length, thereby resulting, for such frames such as frame 44*d*, in several temporally succeeding spectra of reduced spectral resolution. Eight short transforms are exemplarily used for frame 44*d*, resulting in a spectrotemporal sampling of the spectrograms 40 and 42 within that frame 42*d*, at spectral lines spaced apart from each other so that merely every eighth spectral line is populated, but with a sample value for each of the eight transform windows or transforms of shorter length used to transform frame 44*d*. For illustration purposes, it is shown in FIG. 3 that other numbers of transforms for a frame would be feasible as well, such as the usage of two transforms of a transform length which is, for example, half the transform length of the long transforms for frames 44*a* and 44*b*, thereby resulting in a sampling of the spectrotemporal grid or spectrograms 40 and 42 where two spectral line sample values are obtained for every second spectral line, one of which relates to the leading transform, the other to the trailing transform.

The transform windows for the transforms into which the frames are subdivided are illustrated in FIG. 3 below each spectrogram using overlapping window-like lines. The temporal overlap serves, for example, for TDAC (Time-Domain Aliasing Cancellation) purposes.

Although the embodiments described further below could also be implemented in another fashion, FIG. 3 illustrates the case where the switching between different spectrotemporal resolutions for the individual frames 44 is performed in a manner such that for each frame 44, the same number of spectral line values indicated by the small crosses in FIG. 3 result for spectrogram 40 and spectrogram 42, the difference merely residing in the way the lines spectrotemporally sample the respective spectrotemporal tile corresponding to the respective frame 44, spanned temporally over the time of the respective frame 44 and spanned spectrally from zero frequency to the maximum frequency $f_{max}$.

Using arrows in FIG. 3, FIG. 3 illustrates with respect to frame 44*d* that similar spectra may be obtained for all of the frames 44 by suitably distributing the spectral line sample values belonging to the same spectral line but short transform windows within one frame of one channel, onto the un-occupied (empty) spectral lines within that frame up to the next occupied spectral line of that same frame. Such resulting spectra are called "interleaved spectra" in the following. In interleaving n transforms of one frame of one channel, for example, spectrally co-located spectral line values of the n short transforms follow each other before the set of n spectrally co-located spectral line values of the n short transforms of the spectrally succeeding spectral line follows. An intermediate form of interleaving would be feasible as well: instead of interleaving all spectral line coefficients of one frame, it would be feasible to interleave merely the spectral line coefficients of a proper subset of the short transforms of a frame 44*d*. In any case, whenever spectra of frames of the two channels corresponding to spectrograms 40 and 42 are discussed, these spectra may refer to interleaved ones or non-interleaved ones.

Figure 4:
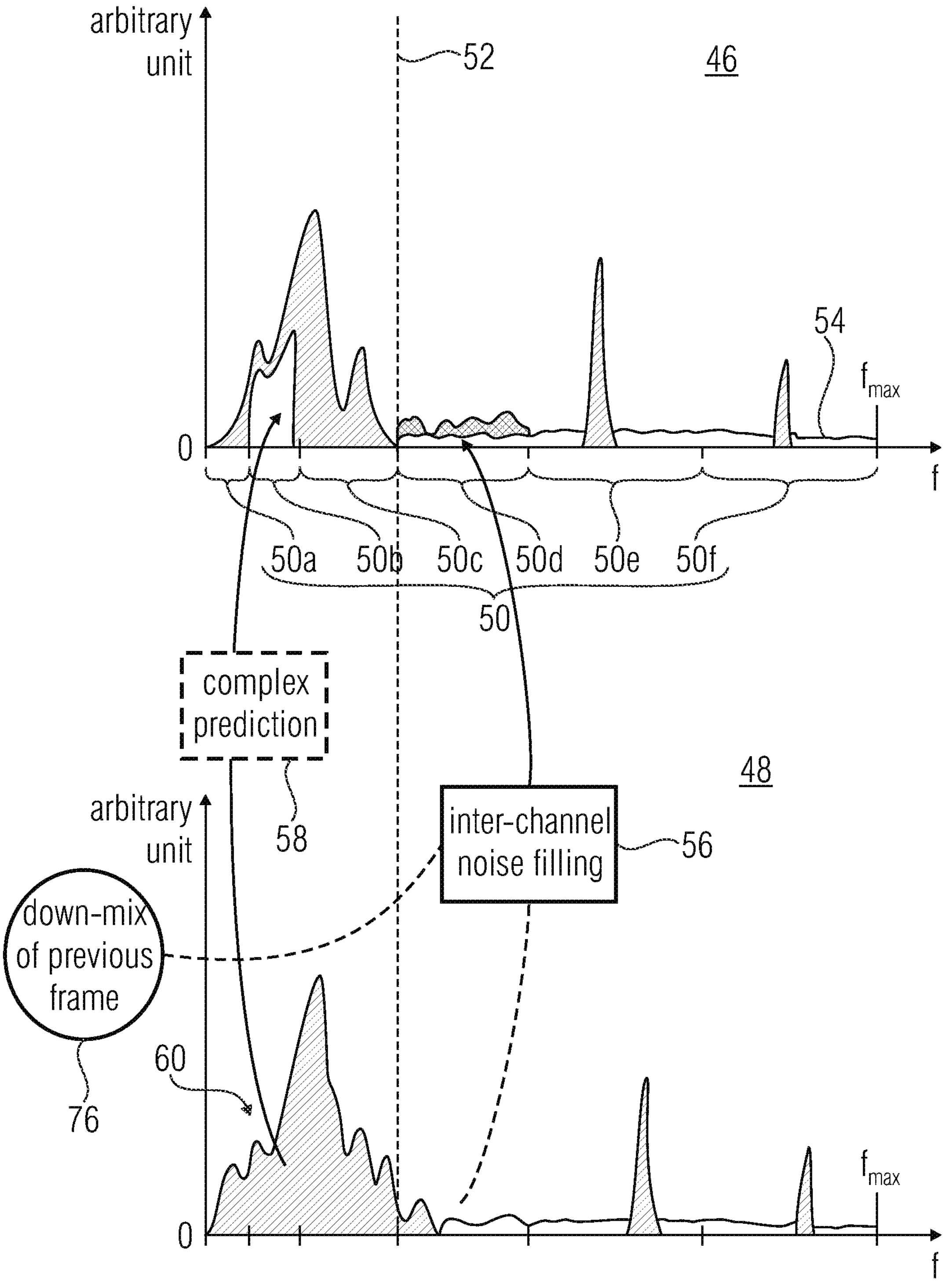
FIG. 4 shows a schematic diagram illustrating current spectra out of the spectrograms shown in FIG. 3 for the sake of alleviating the understanding of the description of FIG. 2.

In order to efficiently code the spectral line coefficients representing the spectrograms 40 and 42 via data stream 30 passed to decoder 10, same are quantized. In order to control the quantization noise spectrotemporally, the quantization step size is controlled via scale factors which are set in a certain spectrotemporal grid. In particular, within each of the sequence of spectra of each spectrogram, the spectral lines are grouped into spectrally consecutive non-overlapping scale factor groups. FIG. 4 shows a spectrum 46 of the spectrogram 40 at the upper half thereof, and a co-temporal spectrum 48 out of spectrogram 42. As shown therein, the spectra 46 and 48 are subdivided into scale factor bands along the spectral axis f so as to group the spectral lines into non-overlapping groups. The scale factor bands are illustrated in FIG. 4 using curly brackets 50. For the sake of simplicity, it is assumed that the boundaries between the scale factor bands coincide between spectrum 46 and 48, but this does not need to be the case.

That is, by way of the coding in data stream 30, the spectrograms 40 and 42 are each subdivided into a temporal sequence of spectra and each of these spectra is spectrally subdivided into scale factor bands, and for each scale factor band the data stream 30 codes or conveys information about a scale factor corresponding to the respective scale factor band. The spectral line coefficients falling into a respective scale factor band 50 are quantized using the respective scale factor or, as far as decoder 10 is concerned, may be dequantized using the scale factor of the corresponding scale factor band.

Before changing back again to FIG. 2 and the description thereof, it shall be assumed in the following that the specifically treated channel, i.e. the one the decoding of which the specific elements of the decoder of FIG. 2 except 34 are involved with, is the transmitted channel of spectrogram 40 which, as already stated above, may represent one of left and right channels, an M channel or an S channel with the assumption that the multichannel audio signal coded into data stream 30 is a stereo audio signal.

While the spectral line extractor 20 is configured to extract the spectral line data, i.e. the spectral line coefficients for frames 44 from data stream 30, the scale factor extractor 22 is configured to extract for each frame 44 the corresponding scale factors. To this end, extractors 20 and 22 may use entropy decoding. In accordance with an embodiment, the scale factor extractor 22 is configured to sequentially extract the scale factors of, for example, spectrum 46 in FIG. 4, i.e. the scale factors of scale factor bands 50, from the data stream 30 using context-adaptive entropy decoding. The order of the sequential decoding may follow the spectral order defined among the scale factor bands leading, for example, from low frequency to high frequency. The scale factor extractor 22 may use context-adaptive entropy decoding and may determine the context for each scale factor depending on already extracted scale factors in a spectral neighborhood of a currently extracted scale factor, such as depending on the scale factor of the immediately preceding scale factor band. Alternatively, the scale factor extractor 22 may predictively decode the scale factors from the data stream 30 such as, for example, using differential decoding while predicting a currently decoded scale factor based on any of the previously decoded scale factors such as the immediately preceding one. Notably, this process of scale factor extraction is agnostic with respect to a scale factor belonging to a scale factor band populated by zero-quantized spectral lines exclusively, or populated by spectral lines among which at least one is quantized to a non-zero value. A scale factor belonging to a scale factor band populated by zero-quantized spectral lines only may both serve as a prediction basis for a subsequent decoded scale factor which possibly belongs to a scale factor band populated by spectral lines among which one is non-zero, and be predicted based on a previously decoded scale factor which possibly belongs to a scale factor band populated by spectral lines among which one is non-zero.

For the sake of completeness only, it is noted that the spectral line extractor 20 extracts the spectral line coefficients with which the scale factor bands 50 are populated likewise using, for example, entropy coding and/or predictive coding. The entropy coding may use context-adaptivity based on spectral line coefficients in a spectrotemporal neighborhood of a currently decoded spectral line coefficient, and likewise, the prediction may be a spectral prediction, a temporal prediction or a spectrotemporal prediction predicting a currently decoded spectral line coefficient based on previously decoded spectral line coefficients in a spectrotemporal neighborhood thereof. For the sake of an increased coding efficiency, spectral line extractor 20 may be configured to perform the decoding of the spectral lines or line coefficients in tuples, which collect or group spectral lines along the frequency axis.

Thus, at the output of spectral line extractor 20 the spectral line coefficients are provided such as, for example, in units of spectra such as spectrum 46 collecting, for example, all of the spectral line coefficients of a corresponding frame, or alternatively collecting all of the spectral line coefficients of certain short transforms of a corresponding frame. At the output of scale factor extractor 22, in turn, corresponding scale factors of the respective spectra are output.

Scale factor band identifier 12 as well as dequantizer 14 have spectral line inputs coupled to the output of spectral line extractor 20, and dequantizer 14 and noise filler 16 have scale factor inputs coupled to the output of scale factor extractor 22. The scale factor band identifier 12 is configured to identify so-called zero-quantized scale factor bands within a current spectrum 46, i.e. scale factor bands within which all spectral lines are quantized to zero, such as scale factor band 50*c* in FIG. 4, and the remaining scale factor bands of the spectrum within which at least one spectral line is quantized to non-zero. In particular, in FIG. 4 the spectral line coefficients are indicated using hatched areas in FIG. 4. It is visible therefrom that in spectrum 46, all scale factor bands but scale factor band 50*b* have at least one spectral line, the spectral line coefficient of which is quantized to a non-zero value.

Later on it will become clear that the zero-quantized scale factor bands such as 50*d* form the subject of the inter-channel noise filling described further below. Before proceeding with the description, it is noted that scale factor band identifier 12 may restrict its identification onto merely a proper subset of the scale factor bands 50 such as onto scale factor bands above a certain start frequency 52. In FIG. 4, this would restrict the identification procedure onto scale factor bands 50*d*, 50*e* and 50*f*.

The scale factor band identifier 12 informs the noise filler 16 on those scale factor bands which are zero-quantized scale factor bands. The dequantizer 14 uses the scale factors associated with an inbound spectrum 46 so as to dequantize, or scale, the spectral line coefficients of the spectral lines of spectrum 46 according to the associated scale factors, i.e. the scale factors associated with the scale factor bands 50. In particular, dequantizer 14 dequantizes and scales spectral line coefficients falling into a respective scale factor band with the scale factor associated with the respective scale factor band. FIG. 4 shall be interpreted as showing the result of the dequantization of the spectral lines.

The noise filler 16 obtains the information on the zero-quantized scale factor bands which form the subject of the following noise filling, the dequantized spectrum as well as the scale factors of at least those scale factor bands identified as zero-quantized scale factor bands and a signalization obtained from data stream 30 for the current frame revealing whether inter-channel noise filling is to be performed for the current frame.

The inter-channel noise filling process described in the following example actually involves two types of noise filling, namely the insertion of a noise floor 54 pertaining to all spectral lines having been quantized to zero irrespective of their potential membership to any zero-quantized scale factor band, and the actual inter-channel noise filling procedure. Although this combination is described hereinafter, it is to be emphasized that the noise floor insertion may be omitted in accordance with an alternative embodiment. Moreover, the signalization concerning the noise filling switch-on and switch-off relating to the current frame and obtained from data stream 30 could relate to the inter-channel noise filling only, or could control the combination of both noise filling sorts together.

As far as the noise floor insertion is concerned, noise filler 16 could operate as follows. In particular, noise filler 16 could employ artificial noise generation such as a pseudorandom number generator or some other source of randomness in order to fill spectral lines, the spectral line coefficients of which were zero. The level of the noise floor 54 thus inserted at the zero-quantized spectral lines could be set according to an explicit signaling within data stream 30 for the current frame or the current spectrum 46. The "level" of noise floor 54 could be determined using a root-mean-square (RMS) or energy measure for example.

The noise floor insertion thus represents a kind of pre-filling for those scale factor bands having been identified as zero-quantized ones such as scale factor band 50*d* in FIG. 4. It also affects other scale factor bands beyond the zero-quantized ones, but the latter are further subject to the following inter-channel noise filling. As described below, the inter-channel noise filling process is to fill-up zero-quantized scale factor bands up to a level which is controlled via the scale factor of the respective zero-quantized scale factor band. The latter may be directly used to this end due to all spectral lines of the respective zero-quantized scale factor band being quantized to zero. Nevertheless, data stream 30 may contain an additional signalization of a parameter, for each frame or each spectrum 46, which commonly applies to the scale factors of all zero-quantized scale factor bands of the corresponding frame or spectrum 46 and results, when applied onto the scale factors of the zero-quantized scale factor bands by the noise filler 16, in a respective fill-up level which is individual for the zero-quantized scale factor bands. That is, noise filler 16 may modify, using the same modification function, for each zero-quantized scale factor band of spectrum 46, the scale factor of the respective scale factor band using the just mentioned parameter contained in data stream 30 for that spectrum 46 of the current frame so as to obtain a fill-up target level for the respective zero-quantized scale factor band measuring, in terms of energy or RMS, for example, the level up to which the inter-channel noise filling process shall fill up the respective zero-quantized scale factor band with (optionally) additional noise (in addition to the noise floor 54).

In particular, in order to perform the inter-channel noise filling 56, noise filler 16 obtains a spectrally co-located portion of the other channel's spectrum 48, in a state already largely or fully decoded, and copies the obtained portion of spectrum 48 into the zero-quantized scale factor band to which this portion was spectrally co-located, scaled in such a manner that the resulting overall noise level within that zero-quantized scale factor band—derived by an integration over the spectral lines of the respective scale factor band—equals the aforementioned fill-up target level obtained from the zero-quantized scale factor band's scale factor. By this measure, the tonality of the noise filled into the respective zero-quantized scale factor band is improved in comparison to artificially generated noise such as the one forming the basis of the noise floor 54, and is also better than an uncontrolled spectral copying/replication from very-low-frequency lines within the same spectrum 46.

To be even more precise, the noise filler 16 locates, for a current band such as 50*d*, a spectrally co-located portion within spectrum 48 of the other channel, scales the spectral lines thereof depending on the scale factor of the zero-quantized scale factor band 50*d* in a manner just described involving, optionally, some additional offset or noise factor parameter contained in data stream 30 for the current frame or spectrum 46, so that the result thereof fills up the respective zero-quantized scale factor band 50*d* up to the desired level as defined by the scale factor of the zero-quantized scale factor band 50*d*. In the present embodiment, this means that the filling-up is done in an additive manner relative to the noise floor 54.

In accordance with a simplified embodiment, the resulting noise-filled spectrum 46 would directly be input into the input of inverse transformer 18 so as to obtain, for each transform window to which the spectral line coefficients of spectrum 46 belong, a time-domain portion of the respective channel audio time-signal, whereupon (not shown in FIG. 2) an overlap-add process may combine these time-domain portions. That is, if spectrum 46 is a non-interleaved spectrum, the spectral line coefficients of which merely belong to one transform, then inverse transformer 18 subjects that transform so as to result in one time-domain portion and the preceding and trailing ends of which would be subject to an overlap-add process with preceding and trailing time-domain portions obtained by inverse transforming preceding and succeeding inverse transforms so as to realize, for example, time-domain aliasing cancelation. If, however, the spectrum 46 has interleaved there-into spectral line coefficients of more than one consecutive transform, then inverse transformer 18 would subject same to separate inverse transformations so as to obtain one time-domain portion per inverse transformation, and in accordance with the temporal order defined thereamong, these time-domain portions would be subject to an overlap-add process therebetween, as well as with respect to preceding and succeeding time-domain portions of other spectra or frames.

However, for the sake of completeness it may be noted that further processing may be performed onto the noise-filled spectrum. As shown in FIG. 2, the inverse TNS filter may perform an inverse TNS filtering onto the noise-filled spectrum. That is, controlled via TNS filter coefficients for the current frame or spectrum 46, the spectrum obtained so far is subject to a linear filtering along spectral direction.

With or without inverse TNS filtering, complex stereo predictor 24 could then treat the spectrum as a prediction residual of an inter-channel prediction. More specifically, inter-channel predictor 24 could use a spectrally co-located portion of the other channel to predict the spectrum 46 or at least a subset of the scale factor bands 50 thereof. The complex prediction process is illustrated in FIG. 4 with dashed box 58 in relation to scale factor band 50*b*. That is, data stream 30 may contain inter-channel prediction parameters controlling, for example, which of the scale factor bands 50 shall be inter-channel predicted and which shall not be predicted in such a manner. Further, the inter-channel prediction parameters in data stream 30 may further comprise complex inter-channel prediction factors applied by inter-channel predictor 24 so as to obtain the inter-channel prediction result. These factors may be contained in data stream 30 individually for each scale factor band, or alternatively each group of one or more scale factor bands, for which inter-channel prediction is activated or signaled to be activated in data stream 30.

The source of inter-channel prediction may, as indicated in FIG. 4, be the spectrum 48 of the other channel. To be more precise, the source of inter-channel prediction may be the spectrally co-located portion of spectrum 48, co-located to the scale factor band 50*b* to be inter-channel predicted, extended by an estimation of its imaginary part. The estimation of the imaginary part may be performed based on the spectrally co-located portion 60 of spectrum 48 itself, and/or may use a downmix of the already decoded channels of the previous frame, i.e. the frame immediately preceding the currently decoded frame to which spectrum 46 belongs. In effect, inter-channel predictor 24 adds to the scale factor bands to be inter-channel predicted such as scale factor band 50*b* in FIG. 4, the prediction signal obtained as just-described.

As already noted in the preceding description, the channel to which spectrum 46 belongs may be an MS coded channel, or may be a loudspeaker related channel, such as a left or right channel of a stereo audio signal. Accordingly, optionally an MS decoder 26 subjects the optionally inter-channel predicted spectrum 46 to MS decoding, in that same performs, per spectral line or spectrum 46, an addition or subtraction with spectrally corresponding spectral lines of the other channel corresponding to spectrum 48. For example, although not shown in FIG. 2, spectrum 48 as shown in FIG. 4 has been obtained by way of portion 34 of decoder 10 in a manner analogous to the description brought forward above with respect to the channel to which spectrum 46 belongs, and the MS decoding module 26, in performing MS decoding, subjects the spectra 46 and 48 to spectral line-wise addition or spectral line-wise subtraction, with both spectra 46 and 48 being at the same stage within the processing line, meaning, both have just been obtained by inter-channel prediction, for example, or both have just been obtained by noise filling or inverse TNS filtering.

It is noted that, optionally, the MS decoding may be performed in a manner globally concerning the whole spectrum 46, or being individually activatable by data stream 30 in units of, for example, scale factor bands 50. In other words, MS decoding may be switched on or off using respective signalization in data stream 30 in units of, for example, frames or some finer spectrotemporal resolution such as, for example, individually for the scale factor bands of the spectra 46 and/or 48 of the spectrograms 40 and/or 42, wherein it is assumed that identical boundaries of both channels' scale factor bands are defined.

As illustrated in FIG. 2, the inverse TNS filtering by inverse TNS filter 28 could also be performed after any inter-channel processing such as inter-channel prediction 58 or the MS decoding by MS decoder 26. The performance in front of, or downstream of, the inter-channel processing could be fixed or could be controlled via a respective signalization for each frame in data stream 30 or at some other level of granularity. Wherever inverse TNS filtering is performed, respective TNS filter coefficients present in the data stream for the current spectrum 46 control a TNS filter, i.e. a linear prediction filter running along spectral direction so as to linearly filter the spectrum inbound into the respective inverse TNS filter module 28*a* and/or 28*b*.

Thus, the spectrum 46 arriving at the input of inverse transformer 18 may have been subject to further processing as just described. Again, the above description is not meant to be understood in such a manner that all of these optional tools are to be present either concurrently or not. These tools may be present in decoder 10 partially or collectively.

In any case, the resulting spectrum at the inverse transformer's input represents the final reconstruction of the channel's output signal and forms the basis of the aforementioned downmix for the current frame which serves, as described with respect to the complex prediction 58, as the basis for the potential imaginary part estimation for the next frame to be decoded. It may further serve as the final reconstruction for inter-channel predicting another channel than the one which the elements except 34 in FIG. 2 relate to.

The respective downmix is formed by downmix provider 31 by combining this final spectrum 46 with the respective final version of spectrum 48. The latter entity, i.e. the respective final version of spectrum 48, formed the basis for the complex inter-channel prediction in predictor 24.

Figure 5A:
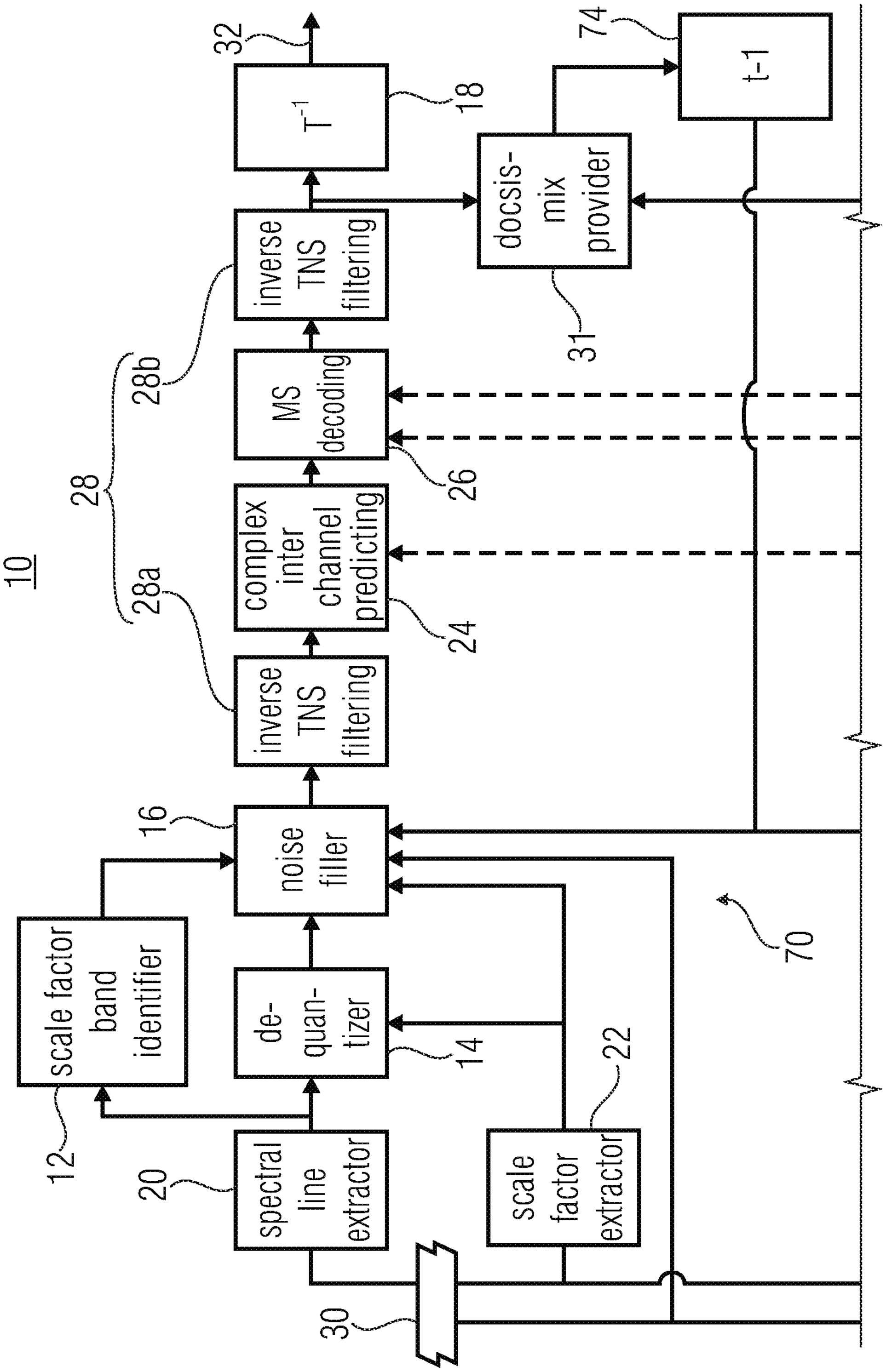
FIGS. 5*a* and 5*b* show a block diagram of a parametric frequency-domain audio decoder in accordance with an alternative embodiment according to which the downmix of the previous frame is used as a basis for inter-channel noise filling.
Figure 5B:
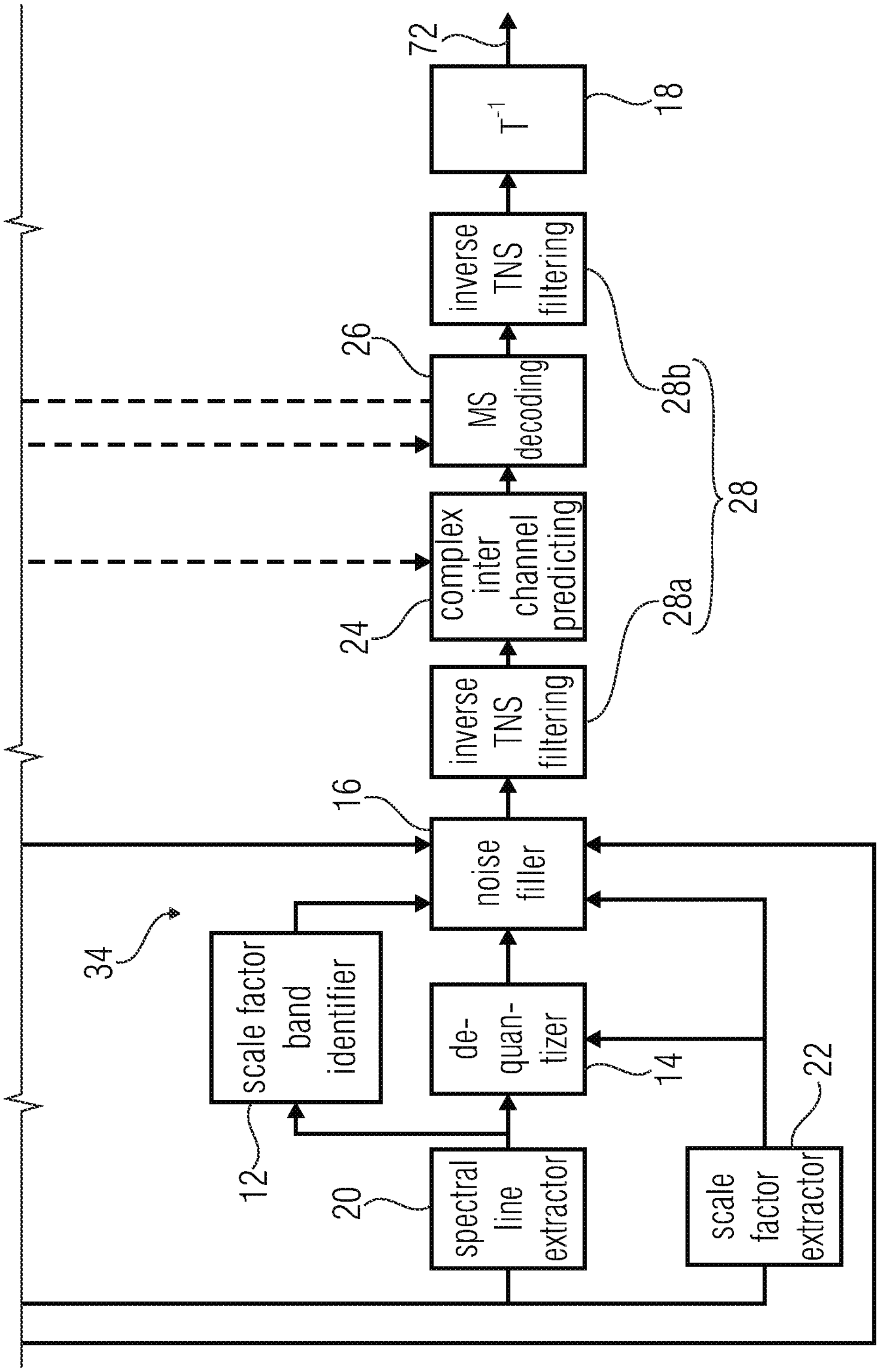

FIG. 5 shows an alternative relative to FIG. 2 insofar as the basis for inter-channel noise filling is represented by the downmix of spectrally co-located spectral lines of a previous frame so that, in the optional case of using complex inter-channel prediction, the source of this complex inter-channel prediction is used twice, as a source for the inter-channel noise filling as well as a source for the imaginary part estimation in the complex inter-channel prediction. FIG. 5 shows a decoder 10 including the portion 70 pertaining to the decoding of the first channel to which spectrum 46 belongs, as well as the internal structure of the aforementioned other portion 34, which is involved in the decoding of the other channel comprising spectrum 48. The same reference sign has been used for the internal elements of portion 70 on the one hand and 34 on the other hand. As can be seen, the construction is the same. At output 32, one channel of the stereo audio signal is output, and at the output of the inverse transformer 18 of second decoder portion 34, the other (output) channel of the stereo audio signal results, with this output being indicated by reference sign 74. Again, the embodiments described above may be easily transferred to a case of using more than two channels.

The downmix provider 31 is co-used by both portions 70 and 34 and receives temporally co-located spectra 48 and 46 of spectrograms 40 and 42 so as to form a downmix based thereon by summing up these spectra on a spectral line by spectral line basis, potentially with forming the average therefrom by dividing the sum at each spectral line by the number of channels downmixed, i.e. two in the case of FIG. 5. At the downmix provider's 31 output, the downmix of the previous frame results by this measure. It is noted in this regard that in case of the previous frame containing more than one spectrum in either one of spectrograms 40 and 42, different possibilities exist as to how downmix provider 31 operates in that case. For example, in that case downmix provider 31 may use the spectrum of the trailing transforms of the current frame, or may use an interleaving result of interleaving all spectral line coefficients of the current frame of spectrogram 40 and 42. The delay element 74 shown in FIG. 5 as connected to the downmix provider's 31 output, shows that the downmix thus provided at downmix provider's 31 output forms the down-mix of the previous frame 76 (see FIG. 4 with respect to the inter-channel noise filling 56 and complex prediction 58, respectively). Thus, the output of delay element 74 is connected to the inputs of inter-channel predictors 24 of decoder portions 34 and 70 on the one hand, and the inputs of noise fillers 16 of decoder portions 70 and 34, on the other hand.

That is, while in FIG. 2, the noise filler 16 receives the other channel's finally reconstructed temporally co-located spectrum 48 of the same current frame as a basis of the inter-channel noise filling, in FIG. 5 the inter-channel noise filling is performed instead based on the downmix of the previous frame as provided by downmix provider 31. The way in which the inter-channel noise filling is performed, remains the same. That is, the inter-channel noise filler 16 grabs out a spectrally co-located portion out of the respective spectrum of the other channel's spectrum of the current frame, in case of FIG. 2, and the largely or fully decoded, final spectrum as obtained from the previous frame representing the downmix of the previous frame, in case of FIG. 5, and adds same "source" portion to the spectral lines within the scale factor band to be noise filled, such as 50*d* in FIG. 4, scaled according to a target noise level determined by the respective scale factor band's scale factor.

Concluding the above discussion of embodiments describing inter-channel noise filling in an audio decoder, it should be evident to readers skilled in the art that, before adding the grabbed-out spectrally or temporally co-located portion of the "source" spectrum to the spectral lines of the "target" scale factor band, a certain pre-processing may be applied to the "source" spectral lines without digressing from the general concept of the inter-channel filling. In particular, it may be beneficial to apply a filtering operation such as, for example, a spectral flattening, or tilt removal, to the spectral lines of the "source" region to be added to the "target" scale factor band, like 50*d* in FIG. 4, in order to improve the audio quality of the inter-channel noise filling process. Likewise, and as an example of a largely (instead of fully) decoded spectrum, the aforementioned "source" portion may be obtained from a spectrum which has not yet been filtered by an available inverse (i.e. synthesis) TNS filter.

Thus, the above embodiments concerned a concept of an inter-channel noise filling. In the following, a possibility is described how the above concept of inter-channel noise filling may be built into an existing codec, namely xHE-AAC, in a semi-backward compatible manner.

In particular, hereinafter an implementation of the above embodiments is described, according to which a stereo filling tool is built into an xHE-AAC based audio codec in a semi-backward compatible signaling manner. By use of the implementation described further below, for certain stereo signals, stereo filling of transform coefficients in either one of the two channels in an audio codec based on an MPEG-D xHE-AAC (USAC) is feasible, thereby improving the coding quality of certain audio signals especially at low bitrates. The stereo filling tool is signaled semi-backward-compatibly such that legacy xHE-AAC decoders can parse and decode the bitstreams without obvious audio errors or drop-outs. As was already described above, a better overall quality can be attained if an audio coder can use a combination of previously decoded/quantized coefficients of two stereo channels to reconstruct zero-quantized (non-transmitted) coefficients of either one of the currently decoded channels. It is therefore desirable to allow such stereo filling (from previous to present channel coefficients) in addition to spectral band replication (from low- to high-frequency channel coefficients) and noise filling (from an uncorrelated pseudorandom source) in audio coders, especially xHE-AAC or coders based on it.

To allow coded bitstreams with stereo filling to be read and parsed by legacy xHE-AAC decoders, the desired stereo filling tool shall be used in a semi-backward compatible way: its presence should not cause legacy decoders to stop—or not even start—decoding.

Readability of the bitstream by xHE-AAC infrastructure can also facilitate market adoption.

To achieve the aforementioned wish for semi-backward compatibility for a stereo filling tool in the context of xHE-AAC or its potential derivatives, the following implementation involves the functionality of stereo filling as well as the ability to signal the same via syntax in the data stream actually concerned with noise filling. The stereo filling tool would work in line with the above description. In a channel pair with common window configuration, a coefficient of a zero-quantized scale factor band is, when the stereo filling tool is activated, as an alternative (or, as described, in addition) to noise filling, reconstructed by a sum or difference of the previous frame's coefficients in either one of the two channels, advantageously the right channel. Stereo filling is performed similar to noise filling. The signaling would be done via the noise filling signaling of xHE-AAC. Stereo filling is conveyed by means of the 8-bit noise filling side information. This is feasible because the MPEG-D USAC standard [3] states that all 8 bits are transmitted even if the noise level to be applied is zero. In that situation, some of the noise-fill bits can be reused for the stereo filling tool.

Semi-backward-compatibility regarding bitstream parsing and playback by legacy xHE-AAC decoders is ensured as follows. Stereo filling is signaled via a noise level of zero (i.e. the first three noise-fill bits all having a value of zero) followed by five non-zero bits (which traditionally represent a noise offset) containing side information for the stereo filling tool as well as the missing noise level. Since a legacy xHE-AAC decoder disregards the value of the 5-bit noise offset if the 3-bit noise level is zero, the presence of the stereo filling tool signaling only has an effect on the noise filling in the legacy decoder: noise filling is turned off since the first three bits are zero, and the remainder of the decoding operation runs as intended. In particular, stereo filling is not performed due to the fact that it is operated like the noise-fill process, which is deactivated. Hence, a legacy decoder still offers "graceful" decoding of the enhanced bitstream 30 because it does not need to mute the output signal or even abort the decoding upon reaching a frame with stereo filling switched on. Naturally, it is however unable to provide a correct, intended reconstruction of stereo-filled line coefficients, leading to a deteriorated quality in affected frames in comparison with decoding by an appropriate decoder capable of appropriately dealing with the new stereo filling tool.

Nonetheless, assuming the stereo filling tool is used as intended, i.e. only on stereo input at low bitrates, the quality through xHE-AAC decoders should be better than if the affected frames would drop out due to muting or lead to other obvious playback errors.

In the following, a detailed description is presented how a stereo filling tool may be built into, as an extension, the xHE-AAC codec.

When built into the standard, the stereo filling tool could be described as follows. In particular, such a stereo filling (SF) tool would represent a new tool in the frequency-domain (FD) part of MPEG-H 3D-audio. In line with the above discussion, the aim of such a stereo filling tool would be the parametric reconstruction of MDCT spectral coefficients at low bitrates, similar to what already can be achieved with noise filling according to section 7.2 of the standard described in [3]. However, unlike noise filling, which employs a pseudorandom noise source for generating MDCT spectral values of any FD channel, SF would be available also to reconstruct the MDCT values of the right channel of a jointly coded stereo pair of channels using a downmix of the left and right MDCT spectra of the previous frame. SF, in accordance with the implementation set forth below, is signaled semi-backward-compatibly by means of the noise filling side information which can be parsed correctly by a legacy MPEG-D USAC decoder.

The tool description could be as follows. When SF is active in a joint-stereo FD frame, the MDCT coefficients of empty (i.e. fully zero-quantized) scale factor bands of the right (second) channel, such as 50*d*, are replaced by a sum or difference of the corresponding decoded left and right channels' MDCT coefficients of the previous frame (if FD). If legacy noise filling is active for the second channel, pseudorandom values are also added to each coefficient. The resulting coefficients of each scale factor band are then scaled such that the RMS (root of the mean coefficient square) of each band matches the value transmitted by way of that band's scale factor. See section 7.3 of the standard in [3].

Some operational constraints could be provided for the use of the new SF tool in the MPEG-D USAC standard. For example, the SF tool may be available for use only in the right FD channel of a common FD channel pair, i.e. a channel pair element transmitting a StereoCoreToolInfo( ) with common_window==1. Besides, due to the semi-backward-compatible signaling, the SF tool may be available for use only when noiseFilling==1 in the syntax container UsacCoreConfig( ). If either of the channels in the pair is in LPD core_mode, the SF tool may not be used, even if the right channel is in the FD mode.

The following terms and definitions are used hereafter in order to more clearly describe the extension of the standard as described in [3].

In particular, as far as the data elements are concerned, the following data element is newly introduced:

| | |
|---|---|
| stereo_filling | binary flag indicating whether SF is utilized in the current frame and channel |

Further, new help elements are introduced:

| | |
|---|---|
| noise_offset | noise-fill offset to modify the scale factors of zero-quantized bands (section 7.2) |
| noise_level | noise-fill level representing the amplitude of added spectrum noise (section 7.2) |
| downmix_prev[ ] | downmix (i.e. sum or difference) of the previous frame's left and right channels |
| sf_index[g][sfb] | scale factor index (i.e. transmitted integer) for window group g and band sfb |

The decoding process of the standard would be extended in the following manner. In particular, the decoding of a joint-stereo coded FD channel with the SF tool being activated is executed in three sequential steps as follows:

First of all, the decoding of the stereo_filling flag would take place.

stereo_filling does not represent an independent bit-stream element but is derived from the noise-fill elements, noise_offset and noise_level, in a UsacChannelPairElement( ) and the common_window flag in StereoCoreToolInfo( ). If noiseFilling==0 or common_window==0 or the current channel is the left (first) channel in the element, stereo_filling is 0, and the stereo filling process ends. Otherwise,

```
if ( (noiseFilling != 0) && (common_window != 0) && (noise_level == 0) ) {
stereo_filling = (noise_offset & 16) / 16;
noise_level = (noise_offset & 14) / 2;
noise_offset = (noise_offset & 1) * 16;
}
else {
stereo_filling = 0;
}
```

In other words, if noise_level==0, noise_offset contains the stereo_filling flag followed by 4 bits of noise filling data, which are then rearranged. Since this operation alters the values of noise_level and noise_offset, it needs to be performed before the noise filling process of section 7.2. Moreover, the above pseudo-code is not executed in the left (first) channel of a UsacChannelPairElement( ) or any other element.

Then, the calculation of downmixprev would take place.

downmix_prev[ ], the spectral downmix which is to be used for stereo filling, is identical to the dmx re_prev[ ] used for the MDST spectrum estimation in complex stereo prediction (section 7.7.2.3). This means that All coefficients of downmix_prev[ ] may be zero if any of the channels of the frame and element with which the downmixing is performed—i.e. the frame before the currently decoded one—use core_mode==1 (LPD) or the channels use unequal transform lengths (split_transform==1 or block switching to window_sequence==EIGHT_SHORT_SEQUENCE in only one channel) or usacindependencyFlag==1.

All coefficients of downmix_prev[ ] may be zero during the stereo filling process if the channel's transform length changed from the last to the current frame (i.e. split_transform==1 preceded by split_transform==0, or window_sequence==EIGHT_SHORT_SEQUENCE preceded by window_sequence !=EIGHT_SHORT_SEQUENCE, or vice versa resp.) in the current element.

If transform splitting is applied in the channels of the previous or current frame, downmix_prev[ ] represents a line-by-line interleaved spectral downmix. See the transform splitting tool for details.

If complex stereo prediction is not utilized in the current frame and element, pred_dir equals 0.

Consequently, the previous downmix only has to be computed once for both tools, saving complexity. The only difference between downmix_prev[ ] and dmx_re_prev[ ] in section 7.7.2 is the behavior when complex stereo prediction is not currently used, or when it is active but usepre-v_frame==0. In that case, downmix_prev[ ] is computed for stereo filling decoding according to section 7.7.2.3 even though dmx_re_prev[ ] is not needed for complex stereo prediction decoding and is, therefore, undefined/zero.

Thereinafter, the stereo filling of empty scale factor bands would be performed.

If stereo filling==1, the following procedure is carried out after the noise filling process in all initially empty scale factor bands sfb[ ] below max_sfb_ste, i.e. all bands in which all MDCT lines were quantized to zero. First, the energies of the given sfb[ ] and the corresponding lines in downmix_prev[ ] are computed via sums of the line squares. Then, given sfbWidth containing the number of lines per sfb[ ],

```
if (energy[sfb] < sfbWidth[sfb] ) { /* noise level isn't maximum, or band starts below
noise-fill region */
facDmx = sqrt( (sfbWidth[sfb] - energy[sfb] ) / energy_dmx [sfb] ) ;
factor = 0.0;
/* if the previous downmix isn't empty, add the scaled downmix lines such that band reaches unity
energy */
for (index = swb_offset[sfb]; index < swb_offset[sfb+1]; index++) {
spectrum[window] [index] += downmix_prev[window] [index] * facDmx;
factor += spectrum[window] [index] * spectrum [window] [index];
}
```

-continued

```
if ( (factor != sfbWidth[sfb] ) && (factor > 0) ) { /* unity energy isn't reached, so
modify band */
factor = sqrt(sfbWidth[sfb] / (factor + 1e−8) ) ;
for (index = swb_offset [sfb]; index < swb_offset[sfb+1]; index++) {
spectrum[window] [index] *= factor;
}
}
}
```

for the spectrum of each group window. Then the scale factors are applied onto the resulting spectrum as in section 7.3, with the scale factors of the empty bands being processed like regular scale factors.

An alternative to the above extension of the xHE-AAC standard would use an implicit semi-backward compatible signaling method.

The above implementation in the xHE-AAC code framework describes an approach which employs one bit in a bitstream to signal usage of the new stereo filling tool, contained in stereo_filling, to a decoder in accordance with FIG. 2. More precisely, such signaling (let's call it explicit semi-backward-compatible signaling) allows the following legacy bitstream data—here the noise filling side information—to be used independently of the SF signalization: In the present embodiment, the noise filling data does not depend on the stereo filling information, and vice versa. For example, noise filling data consisting of all-zeros (noise_level=noise_offset=0) may be transmitted while stereo_filling may signal any possible value (being a binary flag, either 0 or 1).

In cases where strict independence between the legacy and the inventive bitstream data is not required and the inventive signal is a binary decision, the explicit transmission of a signaling bit can be avoided, and said binary decision can be signaled by the presence or absence of what may be called implicit semi-backward-compatible signaling. Taking again the above embodiment as an example, the usage of stereo filling could be transmitted by simply employing the new signaling: If noise_level is zero and, at the same time, noise_offset is not zero, the stereo_filling flag is set equal to 1. If both noise_level and noise_offset are not zero, stereo_filling is equal to 0. A dependent of this implicit signal on the legacy noise-fill signal occurs when both noise_level and noise_offset are zero. In this case, it is unclear whether legacy or new SF implicit signaling is being used. To avoid such ambiguity, the value of stereo_filling may defined in advance. In the present example, it is appropriate to define stereo_filling=0 if the noise filling data consists of all-zeros, since this is what legacy encoders without stereo filling capability signal when noise filling is not to be applied in a frame.

The issue which remains to be solved in the case of implicit semi-backward-compatible signaling is how to signal stereo_filling==1 and no noise filling at the same time. As explained, the noise filling data may not be all-zero, and if a noise magnitude of zero is requested, noise_level ((noise_offset & 14)/2 as mentioned above) may equal 0. This leaves only a noise offset ((noise_offset & 1)*16 as mentioned above) greater than 0 as a solution. The noise_offset, however, is considered in case of stereo filling when applying the scale factors, even if noise_level is zero. Fortunately, an encoder can compensate for the fact that a noise_offset of zero might not be transmittable by altering the affected scale factors such that upon bitstream writing, they contain an offset which is undone in the decoder via noise_offset. This allows said implicit signaling in the above embodiment at the cost of a potential increase in scale factor data rate. Hence, the signaling of stereo filling in the pseudo-code of the above description could be changed as follows, using the saved SF signaling bit to transmit noise_offset with 2 bits (4 values) instead of 1 bit:

```
if ( (noiseFilling) && (common_window) && (noise_level == 0) &&
(noise_offset > 0) ) {
stereo_filling = 1;
noise_level = (noise_offset & 28) / 4;
noise_offset = (noise_offset & 3) * 8;
}
else {
stereo_filling = 0;
}
```

Figure 6:
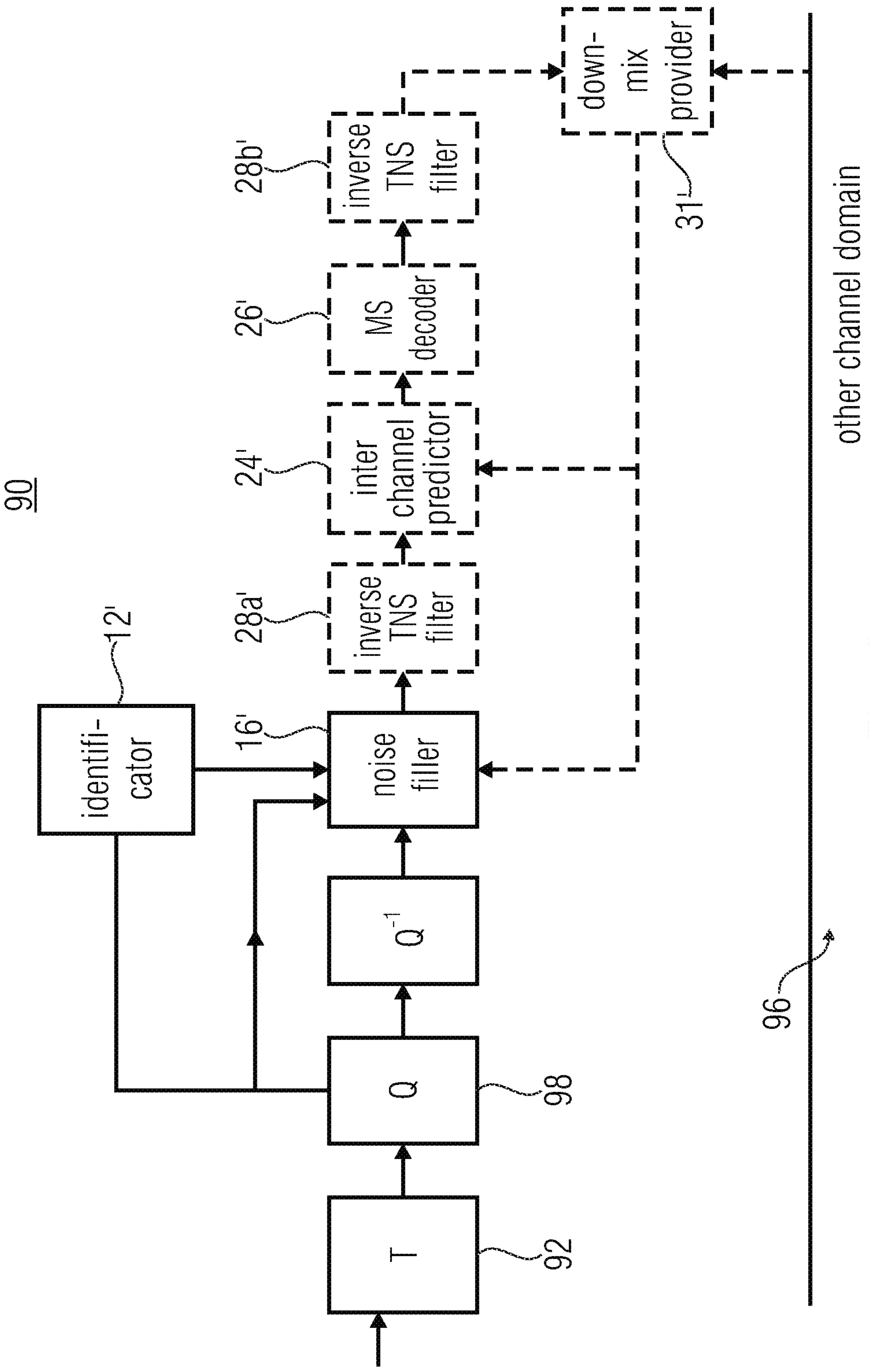
FIG. 6 shows a block diagram of a parametric frequency-domain audio encoder in accordance with an embodiment.

For the sake of completeness, FIG. 6 shows a parametric audio encoder in accordance with an embodiment of the present application. First of all, the encoder of FIG. 6 which is generally indicated using reference sign 90 comprises a transformer 92 for performing the transformation of the original, non-distorted version of the audio signal reconstructed at the output 32 of FIG. 2. As described with respect to FIG. 3, a lapped transform may be used with a switching between different transform lengths with corresponding transform windows in units of frames 44. The different transform length and corresponding transform windows are illustrated in FIG. 3 using reference sign 104. In a manner similar to FIG. 2, FIG. 6 concentrates on a portion of encoder 90 responsible for encoding one channel of the multichannel audio signal, whereas another channel domain portion of decoder 90 is generally indicated using reference sign 96 in FIG. 6.

At the output of transformer 92 the spectral lines and scale factors are unquantized and substantially no coding loss has occurred yet. The spectrogram output by transformer 92 enters a quantizer 98, which is configured to quantize the spectral lines of the spectrogram output by transformer 92, spectrum by spectrum, setting and using preliminary scale factors of the scale factor bands. That is, at the output of quantizer 98, preliminary scale factors and corresponding spectral line coefficients result, and a sequence of a noise filler 16', an optional inverse TNS filter **28*a*', inter-channel predictor 24', MS decoder 26' and inverse TNS filter 28*b*' are sequentially connected so as to provide the encoder 90 of FIG. 6 with the ability to obtain a reconstructed, final version of the current spectrum as obtainable at the decoder side at the downmix provider's input (see FIG. 2). In case of using inter-channel prediction 24' and/or using the inter-channel noise filling in the version forming the inter-channel noise using the downmix of the previous frame, encoder 90 also comprises a downmix provider 31' so as to form a downmix of the reconstructed, final versions of the spectra of the channels of the multichannel audio signal. Of course, to save computations, instead of the final, the original, unquantized versions of said spectra of the channels may be used by downmix provider 31'** in the formation of the downmix.

The encoder 90 may use the information on the available reconstructed, final version of the spectra in order to perform inter-frame spectral prediction such as the aforementioned possible version of performing inter-channel prediction using an imaginary part estimation, and/or in order to perform rate control, i.e. in order to determine, within a rate control loop, that the possible parameters finally coded into data stream 30 by encoder 90 are set in a rate/distortion optimal sense.

For example, one such parameter set in such a prediction loop and/or rate control loop of encoder 90 is, for each zero-quantized scale factor band identified by identifier 12', the scale factor of the respective scale factor band which has merely been preliminarily set by quantizer 98. In a prediction and/or rate control loop of encoder 90, the scale factor of the zero-quantized scale factor bands is set in some psychoacoustically or rate/distortion optimal sense so as to determine the aforementioned target noise level along with, as described above, an optional modification parameter also conveyed by the data stream for the corresponding frame to the decoder side. It should be noted that this scale factor may be computed using only the spectral lines of the spectrum and channel to which it belongs (i.e. the "target" spectrum, as described earlier) or, alternatively, may be determined using both the spectral lines of the "target" channel spectrum and, in addition, the spectral lines of the other channel spectrum or the downmix spectrum from the previous frame (i.e. the "source" spectrum, as introduced earlier) obtained from downmix provider 31'. In particular to stabilize the target noise level and to reduce temporal level fluctuations in the decoded audio channels onto which the inter-channel noise filing is applied, the target scale factor may be computed using a relation between an energy measure of the spectral lines in the "target" scale factor band, and an energy measure of the co-located spectral lines in the corresponding "source" region. Finally, as noted above, this "source" region may originate from a reconstructed, final version of another channel or the previous frame's downmix, or if the encoder complexity is to be reduced, the original, unquantized version of same other channel or the downmix of original, unquantized versions of the previous frame's spectra.

In the following, multichannel encoding and multichannel decoding according to embodiments is explained. In embodiments, the multichannel processor 204 of the apparatus 201 for decoding of FIG. 1*a* may, e.g., be configured to conduct on or more of the technologies below that are described regarding noise multichannel decoding.

At first, however, before describing multichannel decoding, multichannel encoding according to embodiments is explained with reference to FIG. 7 to FIG. 9 and, then, multichannel decoding is explained with reference to FIG. 10 and FIG. 12.

Figure 7:
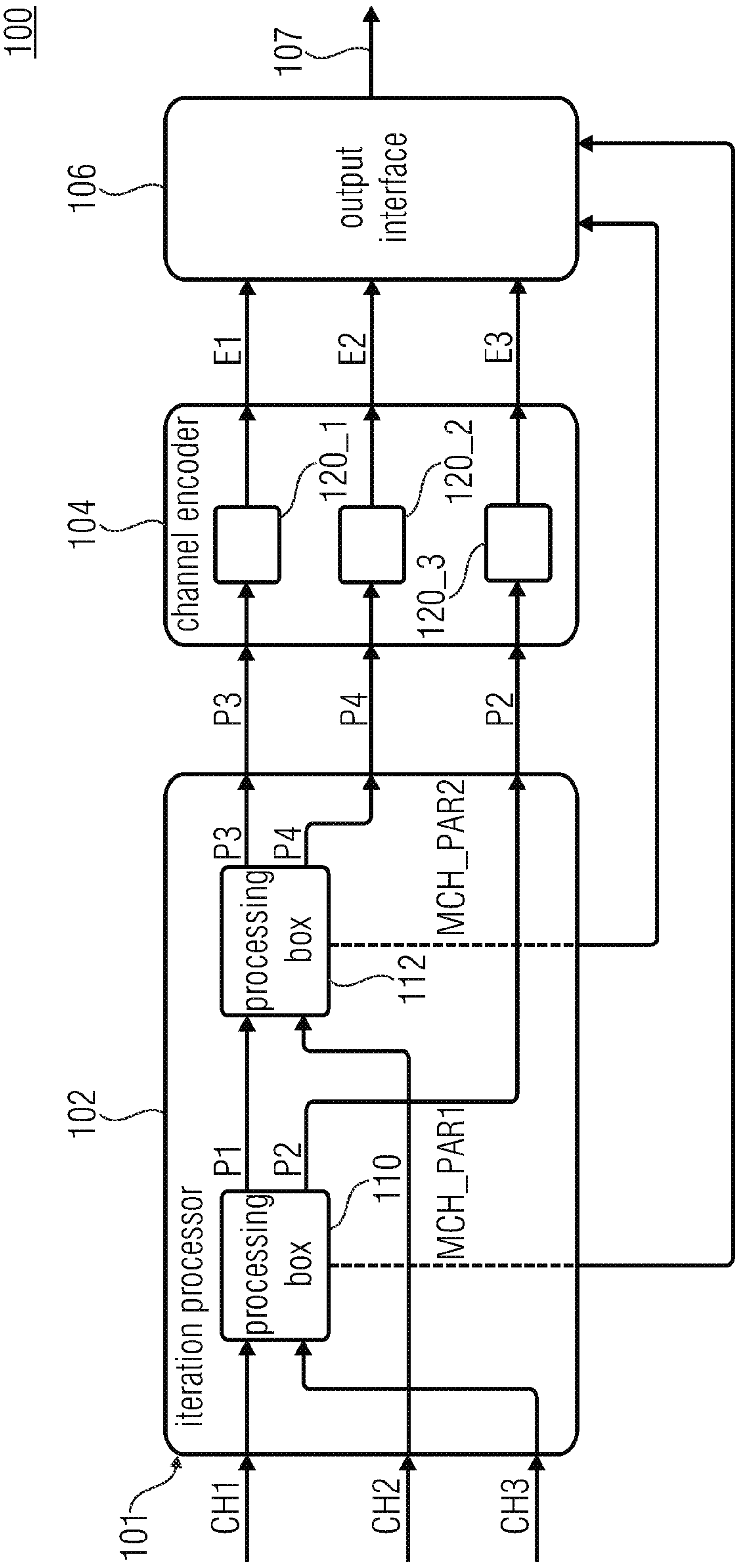
FIG. 7 shows a schematic block diagram of an apparatus for encoding a multichannel signal having at least three channels, according to an embodiment.

Now, multichannel encoding according to embodiments is explained with reference to FIG. 7 to FIG. 9 and FIG. 11:

FIG. 7 shows a schematic block diagram of an apparatus (encoder) 100 for encoding a multichannel signal 101 having at least three channels CH1 to CH3.

The apparatus 100 comprises an iteration processor 102, a channel encoder 104 and an output interface 106.

The iteration processor 102 is configured to calculate, in a first iteration step, inter-channel correlation values between each pair of the at least three channels CH1 to CH3 for selecting, in the first iteration step, a pair having a highest value or having a value above a threshold, and for processing the selected pair using a multichannel processing operation to derive multichannel parameters MCH_PAR1 for the selected pair and to derive first processed channels P1 and P2. In the following, such a processed channels P1 and such a processed channel P2 may also be referred to as a combination channel P1 and a combination channel P2, respectively. Further, the iteration processor 102 is configured to perform the calculating, the selecting and the processing in a second iteration step using at least one of the processed channels P1 or P2 to derive multichannel parameters MCH_PAR2 and second processed channels P3 and P4.

For example, as indicated in FIG. 7, the iteration processor 102 may calculate in the first iteration step an inter-channel correlation value between a first pair of the at least three channels CH1 to CH3, the first pair consisting of a first channel CH1 and a second channel CH2, an inter-channel correlation value between a second pair of the at least three channels CH1 to CH3, the second pair consisting of the second channel CH2 and a third channel CH3, and an inter-channel correlation value between a third pair of the at least three channels CH1 to CH3, the third pair consisting of the first channel CH1 and the third channel CH3.

In FIG. 7 it is assumed that in the first iteration step the third pair consisting of the first channel CH1 and the third channel CH3 comprises the highest inter-channel correlation value, such that the iteration processor 102 selects in the first iteration step the third pair having the highest inter-channel correlation value and processes the selected pair, i.e., the third pair, using a multichannel processing operation to derive multichannel parameters MCH_PAR1 for the selected pair and to derive first processed channels P1 and P2.

Further, the iteration processor 102 can be configured to calculate, in the second iteration step, inter-channel correlation values between each pair of the at least three channels CH1 to CH3 and the processed channels P1 and P2, for selecting, in the second iteration step, a pair having a highest inter-channel correlation value or having a value above a threshold. Thereby, the iteration processor 102 can be configured to not select the selected pair of the first iteration step in the second iteration step (or in any further iteration step).

Referring to the example shown in FIG. 7, the iteration processor 102 may further calculate an inter-channel correlation value between a fourth pair of channels consisting of the first channel CH1 and the first processed channel P1, an inter-channel correlation value between a fifth pair consisting of the first channel CH1 and the second processed channel P2, an inter-channel correlation value between a sixth pair consisting of the second channel CH2 and the first processed channel P1, an inter-channel correlation value between a seventh pair consisting of the second channel CH2 and the second processed channel P2, an inter-channel correlation value between an eighth pair consisting of the third channel CH3 and the first processed channel P1, an inter-correlation value between a ninth pair consisting of the third channel CH3 and the second processed channel P2, and an inter-channel correlation value between a tenth pair consisting of the first processed channel P1 and the second processed channel P2.

In FIG. 7, it is assumed that in the second iteration step the sixth pair consisting of the second channel CH2 and the first processed channel P1 comprises the highest inter-channel correlation value, such that the iteration processor 102 selects in the second iteration step the sixth pair and processes the selected pair, i.e., the sixth pair, using a multichannel processing operation to derive multichannel parameters MCH_PAR2 for the selected pair and to derive second processed channels P3 and P4.

The iteration processor 102 can be configured to only select a pair when the level difference of the pair is smaller than a threshold, the threshold being smaller than 40 dB, 25 dB, 12 dB or smaller than 6 dB. Thereby, the thresholds of 25 or 40 dB correspond to rotation angles of 3 or 0.5 degree.

The iteration processor 102 can be configured to calculate normalized integer correlation values, wherein the iteration processor 102 can be configured to select a pair, when the integer correlation value is greater than e.g. 0.2 or advantageously 0.3.

Further, the iteration processor 102 may provide the channels resulting from the multichannel processing to the channel encoder 104. For example, referring to FIG. 7, the iteration processor 102 may provide the third processed channel P3 and the fourth processed channel P4 resulting from the multichannel processing performed in the second iteration step and the second processed channel P2 resulting from the multichannel processing performed in the first iteration step to the channel encoder 104. Thereby, the iteration processor 102 may only provide those processed channels to the channel encoder 104 which are not (further) processed in a subsequent iteration step. As shown in FIG. 7, the first processed channel P1 is not provided to the channel encoder 104 since it is further processed in the second iteration step.

The channel encoder 104 can be configured to encode the channels P2 to P4 resulting from the iteration processing (or multichannel processing) performed by the iteration processor 102 to obtain encoded channels E1 to E3.

For example, the channel encoder 104 can be configured to use mono encoders (or mono boxes, or mono tools) 120_1 to 120_3 for encoding the channels P2 to P4 resulting from the iteration processing (or multichannel processing). The mono boxes may be configured to encode the channels such that less bits may be used for encoding a channel having less energy (or a smaller amplitude) than for encoding a channel having more energy (or a higher amplitude). The mono boxes 120_1 to 120_3 can be, for example, transformation based audio encoders. Further, the channel encoder 104 can be configured to use stereo encoders (e.g., parametric stereo encoders, or lossy stereo encoders) for encoding the channels P2 to P4 resulting from the iteration processing (or multichannel processing).

The output interface 106 can be configured to generate and encoded multichannel signal 107 having the encoded channels E1 to E3 and the multichannel parameters MCH_PAR1 and MCH_PAR2.

For example, the output interface 106 can be configured to generate the encoded multichannel signal 107 as a serial signal or serial bit stream, and so that the multichannel parameters MCH_PAR2 are in the encoded signal 107 before the multichannel parameters MCH_PAR1. Thus, a decoder, an embodiment of which will be described later with respect to FIG. 10, will receive the multichannel parameters MCH_PAR2 before the multichannel parameters MCH-PAR1.

In FIG. 7 the iteration processor 102 exemplarily performs two multichannel processing operations, a multichannel processing operation in the first iteration step and a multichannel processing operation in the second iteration step. Naturally, the iteration processor 102 also can perform further multichannel processing operations in subsequent iteration steps.

Thereby, the iteration processor 102 can be configured to perform iteration steps until an iteration termination criterion is reached. The iteration termination criterion can be that a maximum number of iteration steps is equal to or higher than a total number of channels of the multichannel signal 101 by two, or wherein the iteration termination criterion is, when the inter-channel correlation values do not have a value greater than the threshold, the threshold advantageously being greater than 0.2 or the threshold advantageously being 0.3. In further embodiments, the iteration termination criterion can be that a maximum number of iteration steps is equal to or higher than a total number of channels of the multichannel signal 101, or wherein the iteration termination criterion is, when the inter-channel correlation values do not have a value greater than the threshold, the threshold advantageously being greater than 0.2 or the threshold advantageously being 0.3.

For illustration purposes the multichannel processing operations performed by the iteration processor 102 in the first iteration step and the second iteration step are exemplarily illustrated in FIG. 7 by processing boxes 110 and 112. The processing boxes 110 and 112 can be implemented in hardware or software. The processing boxes 110 and 112 can be stereo boxes, for example.

Thereby, inter-channel signal dependency can be exploited by hierarchically applying known joint stereo coding tools. In contrast to previous MPEG approaches, the signal pairs to be processed are not predetermined by a fixed signal path (e.g., stereo coding tree) but can be changed dynamically to adapt to input signal characteristics. The inputs of the actual stereo box can be (1) unprocessed channels, such as the channels CH1 to CH3, (2) outputs of a preceding stereo box, such as the processed signals P1 to P4, or (3) a combination channel of an unprocessed channel and an output of a preceding stereo box.

The processing inside the stereo box 110 and 112 can either be prediction based (like complex prediction box in USAC) or KLT/PCA based (the input channels are rotated (e.g., via a 2×2 rotation matrix) in the encoder to maximize energy compaction, i.e., concentrate signal energy into one channel, in the decoder the rotated signals will be retransformed to the original input signal directions).

In a possible implementation of the encoder 100, (1) the encoder calculates an inter channel correlation between every channel pair and selects one suitable signal pair out of the input signals and applies the stereo tool to the selected channels; (2) the encoder recalculates the inter channel correlation between all channels (the unprocessed channels as well as the processed intermediate output channels) and selects one suitable signal pair out of the input signals and applies the stereo tool to the selected channels; and (3) the encoder repeats step (2) until all inter channel correlation is below a threshold or if a maximum number of transformations is applied.

As already mentioned, the signal pairs to be processed by the encoder 100, or more precisely the iteration processor 102, are not predetermined by a fixed signal path (e.g., stereo coding tree) but can be changed dynamically to adapt to input signal characteristics.

Thereby, the encoder 100 (or the iteration processor 102) can be configured to construct the stereo tree in dependence on the at least three channels CH1 to CH3 of the multichannel (input) signal 101. In other words, the encoder 100 (or the iteration processor 102) can be configured to build the stereo tree based on an inter-channel correlation (e.g., by calculating, in the first iteration step, inter-channel correlation values between each pair of the at least three channels CH1 to CH3, for selecting, in the first iteration step, a pair having the highest value or a value above a threshold, and by calculating, in a second iteration step, inter-channel correlation values between each pair of the at least three channels and previously processed channels, for selecting, in the second iteration step, a pair having the highest value or a value above a threshold). According to a one step approach, a correlation matrix may be calculated for possibly each iteration containing the correlations of all, in previous iterations possibly processed, channels.

As indicated above, the iteration processor 102 can be configured to derive multichannel parameters MCH_PAR1 for the selected pair in the first iteration step and to derive multichannel parameters MCH_PAR2 for the selected pair in the second iteration step. The multichannel parameters MCH_PAR1 may comprise a first channel pair identification (or index) identifying (or signaling) the pair of channels selected in the first iteration step, wherein the multichannel parameters MCH_PAR2 may comprise a second channel pair identification (or index) identifying (or signaling) the pair of channels selected in the second iteration step.

In the following, an efficient indexing of input signals is described. For example, channel pairs can be efficiently signaled using a unique index for each pair, dependent on the total number of channels. For example, the indexing of pairs for six channels can be as shown in the following table:

| | 0 | 1 | 2 | 3 | 4 | 5 |
|---|---|---|---|---|---|---|
| 0 | | 0 | 1 | 2 | 3 | 4 |
| 1 | | | 5 | 6 | 7 | 8 |
| 2 | | | | 9 | 10 | 11 |
| 3 | | | | | 12 | 13 |
| 4 | | | | | | 14 |
| 5 | | | | | | |

For example, in the above table the index 5 may signal the pair consisting of the first channel and the second channel. Similarly, the index 6 may signal the pair consisting of the first channel and the third channel.

The total number of possible channel pair indices for n channels can be calculated to:

numPairs=numChannels*(numChannels−1)/2

Hence, the number of bits needed for signaling one channel pair amount to:

$$numBits=floor(\log_2(numPairs-1))+1$$

Further, the encoder 100 may use a channel mask. The multichannel tool's configuration may contain a channel mask indicating for which channels the tool is active. Thus, LFEs (LFE=low frequency effects/enhancement channels) can be removed from the channel pair indexing, allowing for a more efficient encoding. E.g. for a 11.1 setup, this reduces the number of channel pair indices from 12*11/2=66 to 11*10/2=55, allowing signaling with 6 instead of 7 bit. This mechanism can also be used to exclude channels intended to be mono objects (e.g. multiple language tracks). On decoding of the channel mask (channelMask), a channel map (channelMap) can be generated to allow re-mapping of channel pair indices to decoder channels.

Moreover, the iteration processor 102 can be configured to derive, for a first frame, a plurality of selected pair indications, wherein the output interface 106 can be configured to include, into the multichannel signal 107, for a second frame, following the first frame, a keep indicator, indicating that the second frame has the same plurality of selected pair indications as the first frame.

The keep indicator or the keep tree flag can be used to signal that no new tree is transmitted, but the last stereo tree shall be used. This can be used to avoid multiple transmission of the same stereo tree configuration if the channel correlation properties stay stationary for a longer time.

Figure 8:
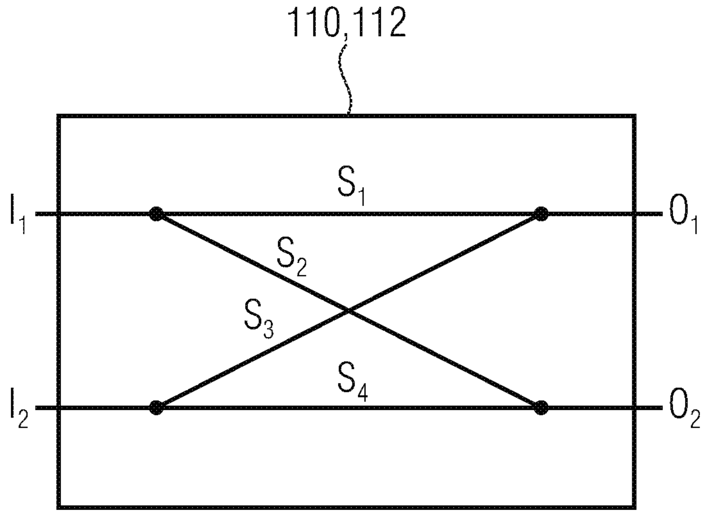
FIG. 8 shows a schematic block diagram of an apparatus for encoding a multichannel signal having at least three channels, according to an embodiment.

FIG. 8 shows a schematic block diagram of a stereo box 110, 112. The stereo box 110, 112 comprises inputs for a first input signal I1 and a second input signal I2, and outputs for a first output signal O1 and a second output signal O2. As indicated in FIG. 8, dependencies of the output signals O1 and O2 from the input signals I1 and I2 can be described by the s-parameters S1 to S4.

The iteration processor 102 can use (or comprise) stereo boxes 110,112 in order to perform the multichannel processing operations on the input channels and/or processed channels in order to derive (further) processed channels. For example, the iteration processor 102 can be configured to use generic, prediction based or KLT (Karhunen-Lobve-Transformation) based rotation stereo boxes 110,112.

A generic encoder (or encoder-side stereo box) can be configured to encode the input signals I1 and I2 to obtain the output signals O1 and O2 based on the equation:

$$\begin{bmatrix} O_1 \\ O_2 \end{bmatrix} = \begin{bmatrix} s_1 & s_2 \\ s_3 & s_4 \end{bmatrix} \cdot \begin{bmatrix} I_1 \\ I_2 \end{bmatrix}.$$

A generic decoder (or decoder-side stereo box) can be configured to decode the input signals I1 and I2 to obtain the output signals O1 and O2 based on the equation:

$$\begin{bmatrix} O_1 \\ O_2 \end{bmatrix} = \begin{bmatrix} s_1 & s_2 \\ s_3 & s_4 \end{bmatrix}^{-1} \cdot \begin{bmatrix} I_1 \\ I_2 \end{bmatrix}.$$

A prediction based encoder (or encoder-side stereo box) can be configured to encode the input signals I1 and I2 to obtain the output signals O1 and O2 based on the equation $$\begin{bmatrix} O_1 \\ O_2 \end{bmatrix} = 0.5 \cdot \begin{bmatrix} 1 & 1 \\ 1-p & -(1+p) \end{bmatrix} \cdot \begin{bmatrix} I_1 \\ I_2 \end{bmatrix},$$

wherein p is the prediction coefficient.

A prediction based decoder (or decoder-side stereo box) can be configured to decode the input signals I1 and I2 to obtain the output signals O1 and O2 based on the equation:

$$\begin{bmatrix} O_1 \\ O_2 \end{bmatrix} = \begin{bmatrix} 1+p & 1 \\ 1-p & -1 \end{bmatrix} \cdot \begin{bmatrix} I_1 \\ I_2 \end{bmatrix}.$$

A KLT based rotation encoder (or encoder-side stereo box) can be configured to encode the input signals I1 to I2 to obtain the output signals O1 and O2 based on the equation:

$$\begin{bmatrix} O_1 \\ O_2 \end{bmatrix} = \begin{bmatrix} \cos\alpha & \sin\alpha \\ -\sin\alpha & \cos\alpha \end{bmatrix} \cdot \begin{bmatrix} I_1 \\ I_2 \end{bmatrix}.$$

A KLT based rotation decoder (or decoder-side stereo box) can be configured to decode the input signals I1 and I2 to obtain the output signals O1 and O2 based on the equation (inverse rotation):

$$\begin{bmatrix} O_1 \\ O_2 \end{bmatrix} = \begin{bmatrix} \cos\alpha & -\sin\alpha \\ \sin\alpha & \cos\alpha \end{bmatrix} \cdot \begin{bmatrix} I_1 \\ I_2 \end{bmatrix}.$$

In the following, a calculation of the rotation angle α for the KLT based rotation is described.

The rotation angle α for the KLT based rotation can be defined as:

$$\alpha = \frac{1}{2}\tan^{-1}\left(\frac{2c_{12}}{c_{11} - c_{22}}\right)$$

with $c_{xy}$ being the entries of a non-normalized correlation matrix, wherein $c_{11}$, $c_{22}$ are the channel energies.

This can be implemented using the a tan 2 function to allow for differentiation between negative correlations in the numerator and negative energy difference in the denominator:

```
alpha=0.5*a tan 2(2*correlation[ch1][ch2],(correlation[ch1][ch1]–correlation[ch2][ch2]));
```

Further, the iteration processor 102 can be configured to calculate an inter-channel correlation using a frame of each channel comprising a plurality of bands so that a single inter-channel correlation value for the plurality of bands is obtained, wherein the iteration processor 102 can be configured to perform the multichannel processing for each of the plurality of bands so that the multichannel parameters are obtained from each of the plurality of bands.

Thereby, the iteration processor 102 can be configured to calculate stereo parameters in the multichannel processing, wherein the iteration processor 102 can be configured to only perform a stereo processing in bands, in which a stereo parameter is higher than a quantized-to-zero threshold defined by a stereo quantizer (e.g., KLT based rotation encoder). The stereo parameters can be, for example, MS On/Off or rotation angles or prediction coefficients).

For example, the iteration processor 102 can be configured to calculate rotation angles in the multichannel processing, wherein the iteration processor 102 can be configured to only perform a rotation processing in bands, in which a rotation angle is higher than a quantized-to-zero threshold defined by a rotation angle quantizer (e.g., KLT based rotation encoder).

Thus, the encoder 100 (or output interface 106) can be configured to transmit the transformation/rotation information either as one parameter for the complete spectrum (full band box) or as multiple frequency dependent parameters for parts of the spectrum.

The encoder 100 can be configured to generate the bit stream 107 based on the following tables:

TABLE 1

Syntax of mpegh3daExtElementConfig( )

| Syntax | No. of bits | Mnemonic |
|---|---|---|
| mpegh3daExtElementConfig( ) | | |
| { | | |
| usacExtElementType = escapedValue(4, 8, 16); | | |
| usacExt ElementConfigLength = escapedValue(4, 8, 16); | | |
| if (usacExtElementDefaultLengthPresent) { | 1 | uimsbf |
| usacExtElementDefaultLength = escapedValue(8, 16, 0) + 1; | | |
| } else { | | |
| usacExtElementDefaultLength = 0; | | |
| } | | |
| usacExtElementPayloadFrag; | 1 | uimsbf |
| switch (usacExtElementType) { | | |
| case ID_EXT_ELE_FILL: | | |
| /* No configuration element */ | | |
| break; | | |
| case ID_EXT_ELE_MPEGS: | | |
| SpatialSpecificConfig( ); | | |
| break; | | |
| case ID_EXT_ELE_SAOC: | | |
| SAOCSpecificConfig( ); | | |
| break; | | |
| case ID_EXT_ELE_AUDIOPREROLL: | | |
| /* No configuration element */ | | |
| break; | | |
| case ID_EXT_ELE_UNI_DRC: | | |
| mpegh3daUniDrcConfig( ); | | |
| break; | | |
| case ID_EXT_ELE_OBJ_METADATA: | | |
| ObjectMetadataConfig( ); | | |
| break; | | |
| case ID_EXT_ELE_SAOC_3D: | | |
| SAOC3DSpecificConfig( ); | | |
| break; | | |
| case ID_EXT_ELE_HOA: | | |
| HOAConfig( ); | | |
| break; | | |
| case ID_EXT_ELE_MCC: /* multi channel coding */ | | |
| MCCConfig(grp); | | |
| break; | | |
| case ID_EXT_ELE_FMT_CNVRTR | | |
| /* No configuration element */ | | |
| break; | | |

TABLE 1-continued

Syntax of mpegh3daExtElementConfig( )

| Syntax | No. of bits | Mnemonic |
|---|---|---|
| default: | NOTE | |
| while (usacExtElementConfigLength--) { | | |
| tmp; | 8 | uimsbf |
| } | | |
| break; | | |
| } | | |
| } | | |

NOTE:
The default entry for the usacExtElementType is used for unknown extElementTypes so that legacy decoders can cope with future extensions.

TABLE 21

Syntax of MCCConfig( ),

| Syntax | No. of bits | Mnemonic |
|---|---|---|
| MCCConfig(grp) | | |
| { | | |
| nChannels = 0 | | |
| for(chan=0;chan < bsNumberOfSignals[grp]; chan++) | | |
| chanMask[chan] | 1 | |
| if(chanMask[chan] > 0) { | | |
| mctChannelMap[nChannels]=chan; | | |
| nChannels++; | | |
| } | | |
| } | | |
| } | | |

NOTE:
The corresponding ID_USAC_EXT element shall be prior to any audio element of the certain signal group grp.

TABLE 32

Syntax of MultichannelCodingBoxBandWise( )

| Syntax | No. of bits | Mnemonic |
|---|---|---|
| MultichannelCodingBoxBandWise( ) | | |
| { | | |
| for(pair=0; pair<numPairs;pair++) { | | |
| if (keepTree == 0) { | | |
| channelPairIndex[pair] | nBits NOTE 1) | |
| } | | |
| else { | | |
| channelPairIndex[pair]= | | |
| lastChannelPairIndex[pair]; | | |
| } | | |
| hasMctMask | 1 | |
| hasBandwiseAngles | 1 | |
| if (hasMctMask \| \| hasBandwiseAngles) { | | |
| isShort | 1 | |
| numMaskBands; | 5 | |
| if (isShort) { | | |
| numMaskBands = numMaskBands*8 | | |
| } | | |
| } else { | NOTE 2) | |
| numMaskBands = MAX_NUM_MC_BANDS; | | |
| } | | |
| if (hasMctMask) { | | |
| for(j=0;j<numMaskBands;j++) { | | |
| msMask[pair][j]; | 1 | |
| } else { | | |
| for(j=0;j<numMaskBands;j++) { | | |
| msMask[pair][j] = 1; | | |
| } | | |
| } | | |
| } | | |

TABLE 32-continued

Syntax of MultichannelCodingBoxBandWise( )

| Syntax | No. of bits | Mnemonic |
|---|---|---|
|     If(indepFlag > 0) { | | |
|       delta_code_time = 0; | | |
|     } else { | | |
|       delta_code_time; | 1 | |
|     } | | |
|     if (hasBandwiseAngles == 0) { | | |
|       hcod_angle[dpcm_alpha[pair][0]]; | 1..10 | vlclbf |
|     } | | |
|     else { | | |
|       for(j=0;j< numMaskBands;j++) { | | |
|         if (msMask[pair] [j] == 1) { | | |
|           hcod_angle[dpcm_alpha[pair][j]]; | 1..10 | vlclbf |
|         } | | |
|       } | | |
|     } | | |
|   } | | |
| } | | |

NOTE
1) nBits = floor(log2(nChannels*(nChannels-1)/2 − 1))+1

TABLE 4

Syntax of MultichannelCodingBoxFullband( )

| Syntax | No. of bits | Mnemonic |
|---|---|---|
| MultichannelCodingBoxFullband( ) | | |
| { | | |
|   for (pair=0; pair<numPairs; pair++) { | | |
|   If(keepTree == 0) { | | |
|     channelPairIndex[pair] | nBits | |
|   } | NOTE 1) | |

TABLE 4-continued

Syntax of MultichannelCodingBoxFullband( )

| Syntax | No. of bits | Mnemonic |
|---|---|---|
|   else { | | |
|     numPairs = lastNumPairs; | | |
|   } | | |
|   alpha; | 8 | |
| } | | |

NOTE:
1) nBits = floor(log2(nChannels*(nChannels-1)/2 − 1))+1

TABLE 5

Syntax of MultichannelCodingFrame( )

| Syntax | No. | Mnemonic |
|---|---|---|
| MultichannelCodingFrame( ) | | |
| { | | |
|   MCCSignalingType | 2 | |
|   keepTree | 1 | |
|   if(keepTree == 0) { | | |
|     numPairs | 5 | |
|   } | | |
|   else { | | |
|     numPairs=lastNumPairs; | | |
|   } | | |
|   if(MCCSignalingType == 0) { /* tree of standard stereo boxes */ | | |
|     for(i=0;i<numPairs;i++) { | | |
|       MCCBox[i] = StereoCoreToolInfo(0); | | |
|     } | | |
|   } | | |
|   if(MCCSignalingType == 1) { /* arbitrary mct trees */ | | |
|       MultichannelCodingBoxBandWise( ); | | |
|   } | | |
|   if(MCCSignalingType == 2) { /* transmitted trees */ | | |
|   } | | |
|   if(MCCSignalingType == 3) { /* simple fullband tree */ | | |
|     MultichannelCodingBoxFullband( ); | | |
|   } | | |
| } | | |

TABLE 6

Value of usacExtElementType

| usacExtElementType | Value |
|---|---|
| ID_EXT_ELE_FILL | 0 |
| ID_EXT_ELE_MPEGS | 1 |
| ID_EXT_ELE_SAOC | 2 |
| ID_EXT_ELE_AUDIOPREROLL | 3 |
| ID_EXT_ELE_UNI_DRC | 4 |
| ID_EXT_ELE_OBJ_METADATA | 5 |
| ID_EXT_ELE_SAOC_3D | 6 |
| ID_EXT_ELE_HOA | 7 |
| ID_EXT_ELE_FMT_CNVRTR | 8 |
| ID_EXT_ELE_MCC | 9 or 10 |
| /* reserved for ISO use */ | 10-127 |
| /* reserved for use outside of ISO scope */ | 128 and higher |

NOTE:
Application-specific usacExtElementType values are mandated to be in the space reserved for use outside of ISO scope. These are skipped by a decoder as a minimum of structure is needed by the decoder to skip these extensions.

TABLE 7

Interpretation of data blocks for extension payload decoding

| usacExtElementType | The concatenated usacExtElementSegmentData represents: |
|---|---|
| ID_EXT_ELE_FILL | Series of fill_byte |
| ID_EXT_ELE_MPEGS | SpatialFrame( ) |
| ID_EXT_ELE_SAOC | SaocFrame( ) |
| ID_EXT_ELE_AUDIOPREROLL | AudioPreRoll( ) |
| ID_EXT_ELE_UNI_DRC | uniDrcGain( ) as defined in ISO/IEC 23003-4 |
| ID_EXT_ELE_OBJ_METADATA | object_metadata( ) |
| ID_EXT_ELE_SAOC_3D | Saoc3DFrame( ) |
| ID_EXT_ELE_HOA | HOAFrame( ) |
| ID_EXT_ELE_FMT_CNVRTR | FormatConverterFrame( ) |
| ID_EXT_ELE_MCC | MultichannelCodingFrame( ) |
| unknown | unknown data. The data block shall be discarded. |

Figure 9:
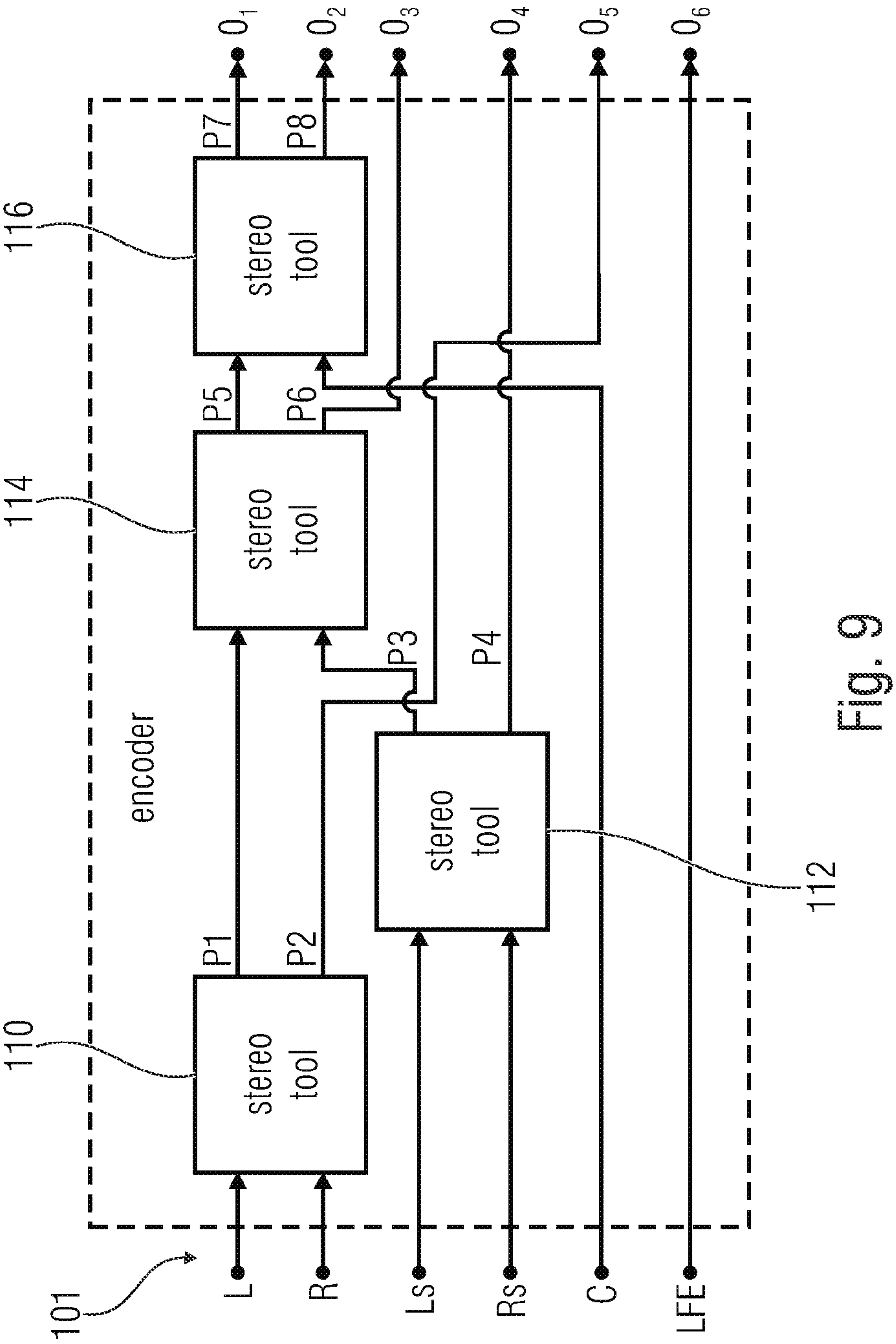
FIG. 9 shows a schematic block diagram of a stereo box, according to an embodiment.

FIG. 9 shows a schematic block diagram of an iteration processor 102, according to an embodiment. In the embodiment shown in FIG. 9, the multichannel signal 101 is a 5.1 channel signal having six channels: a left channel L, a right channel R, a left surround channel Ls, a right surround channel Rs, a center channel C and a low frequency effects channel LFE.

As indicated in FIG. 9, the LFE channel is not processed by the iteration processor 102. This might be the case since the inter-channel correlation values between the LFE channel and each of the other five channels L, R, Ls, Rs, and C are to small, or since the channel mask indicates not to process the LFE channel, which will be assumed in the following.

In a first iteration step, the iteration processor 102 calculates the inter-channel correlation values between each pair of the five channels L, R, Ls, Rs, and C, for selecting, in the first iteration step, a pair having a highest value or having a value above a threshold. In FIG. 9 it is assumed that the left channel L and the right channel R have the highest value, such that the iteration processor 102 processes the left channel L and the right channel R using a stereo box (or stereo tool) 110, which performs the multichannel operation processing operation, to derive first and second processed channels P1 and P2.

In a second iteration step, the iteration processor 102 calculates inter-channel correlation values between each pair of the five channels L, R, Ls, Rs, and C and the processed channels P1 and P2, for selecting, in the second iteration step, a pair having a highest value or having a value above a threshold. In FIG. 9 it is assumed that the left surround channel Ls and the right surround channel Rs have the highest value, such that the iteration processor 102 processes the left surround channel Ls and the right surround channel Rs using the stereo box (or stereo tool) 112, to derive third and fourth processed channels P3 and P4.

In a third iteration step, the iteration processor 102 calculates inter-channel correlation values between each pair of the five channels L, R, Ls, Rs, and C and the processed channels P1 to P4, for selecting, in the third iteration step, a pair having a highest value or having a value above a threshold. In FIG. 9 it is assumed that the first processed channel P1 and the third processed channel P3 have the highest value, such that the iteration processor 102 processes the first processed channel P1 and the third processed channel P3 using the stereo box (or stereo tool) 114, to derive fifth and sixth processed channels P5 and P6.

In a fourth iteration step, the iteration processor 102 calculates inter-channel correlation values between each pair of the five channels L, R, Ls, Rs, and C and the processed channels P1 to P6, for selecting, in the fourth iteration step, a pair having a highest value or having a value above a threshold. In FIG. 9 it is assumed that the fifth processed channel P5 and the center channel C have the highest value, such that the iteration processor 102 processes the fifth processed channel P5 and the center channel C using the stereo box (or stereo tool) 115, to derive seventh and eighth processed channels P7 and P8.

The stereo boxes 110 to 116 can be MS stereo boxes, i.e. mid/side stereophony boxes configured to provide a mid-channel and a side-channel. The mid-channel can be the sum of the input channels of the stereo box, wherein the side-channel can be the difference between the input channels of the stereo box. Further, the stereo boxes 110 and 116 can be rotation boxes or stereo prediction boxes.

In FIG. 9, the first processed channel P1, the third processed channel P3 and the fifth processed channel P5 can be mid-channels, wherein the second processed channel P2, the fourth processed channel P4 and the sixth processed channel P6 can be side-channels.

Further, as indicated in FIG. 9, the iteration processor 102 can be configured to perform the calculating, the selecting and the processing in the second iteration step and, if applicable, in any further iteration step using the input channels L, R, Ls, Rs, and C and (only) the mid-channels P1, P3 and P5 of the processed channels. In other words, the iteration processor 102 can be configured to not use the side-channels P1, P3 and P5 of the processed channels in the calculating, the selecting and the processing in the second iteration step and, if applicable, in any further iteration step.

Figure 11:
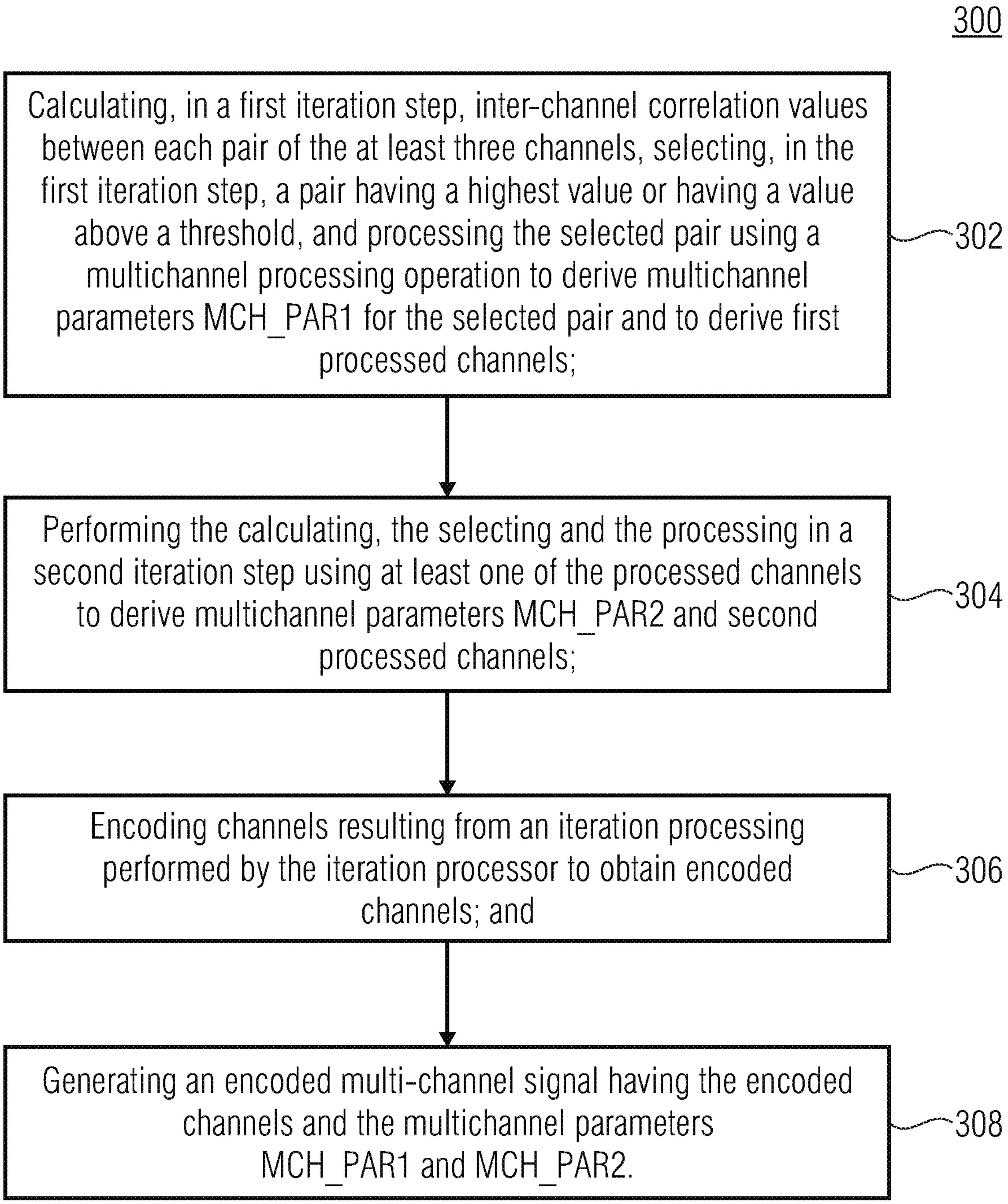
FIG. 11 shows a flowchart of a method for encoding a multichannel signal having at least three channels, according to an embodiment.

FIG. 11 shows a flowchart of a method 300 for encoding a multichannel signal having at least three channels. The method 300 comprises a step 302 of calculating, in a first iteration step, inter-channel correlation values between each pair of the at least three channels, selecting, in the first iteration step, a pair having a highest value or having a value above a threshold, and processing the selected pair using a multichannel processing operation to derive multichannel parameters MCH_PAR1 for the selected pair and to derive first processed channels; a step 304 of performing the calculating, the selecting and the processing in a second iteration step using at least one of the processed channels to derive multichannel parameters MCH_PAR2 and second processed channels; a step 306 of encoding channels resulting from an iteration processing performed by the iteration processor to obtain encoded channels; and a step 308 of generating an encoded multichannel signal having the encoded channels and the first and the multichannel parameters MCH_PAR2.

In the following, multichannel decoding is explained.

Figure 10:
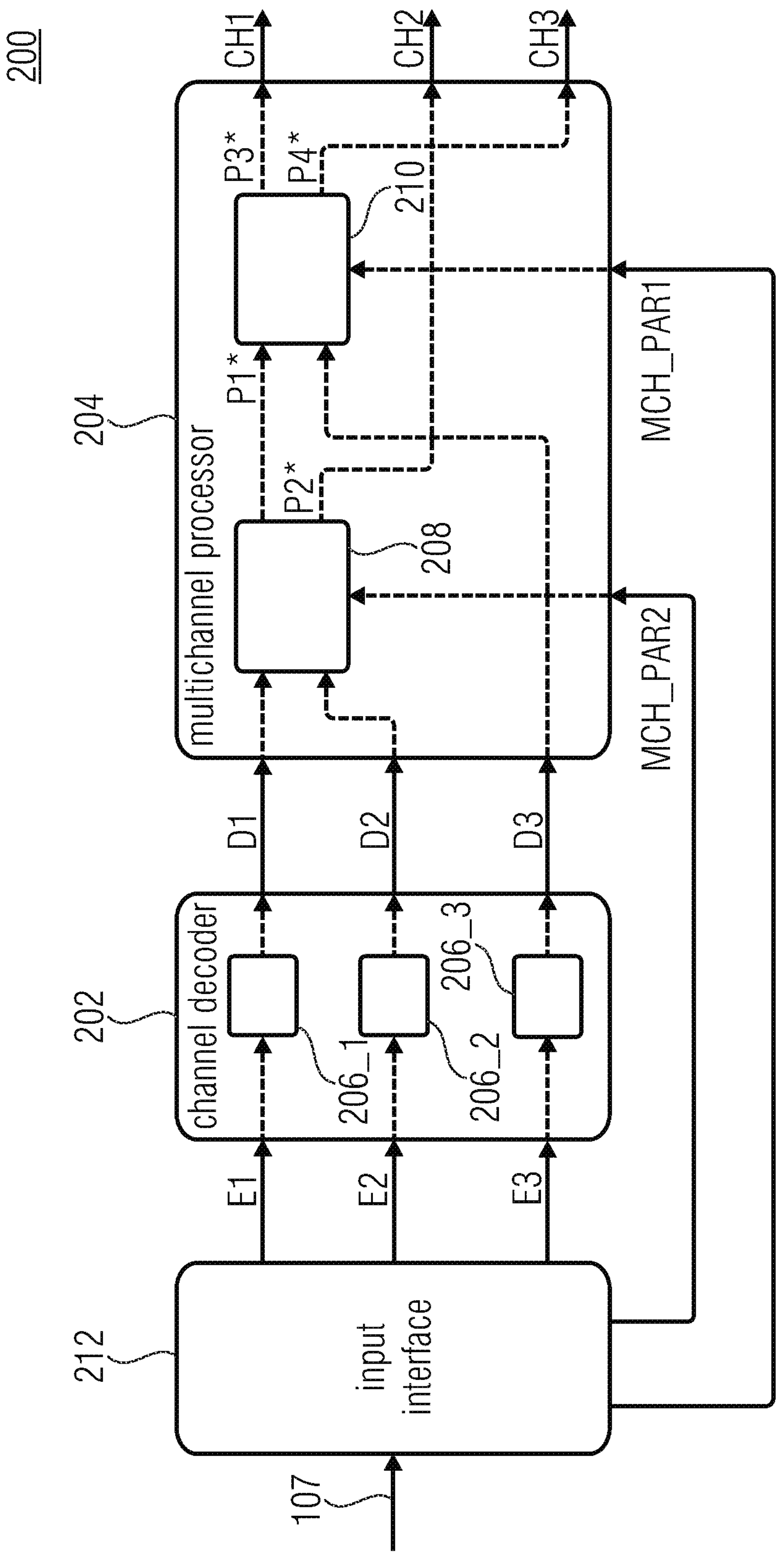
FIG. 10 shows a schematic block diagram of an apparatus for decoding an encoded multichannel signal having encoded channels and at least two multichannel parameters, according to an embodiment.

FIG. 10 shows a schematic block diagram of an apparatus (decoder) 200 for decoding an encoded multichannel signal 107 having encoded channels E1 to E3 and at least two multichannel parameters MCH_PAR1 and MCH_PAR2.

The apparatus 200 comprises a channel decoder 202 and a multichannel processor 204.

The channel decoder 202 is configured to decode the encoded channels E1 to E3 to obtain decoded channels in D1 to D3.

For example, the channel decoder 202 can comprise at least three mono decoders (or mono boxes, or mono tools) 206_1 to 206_3, wherein each of the mono decoders 206_1 to 206_3 can be configured to decode one of the at least three encoded channels E1 to E3, to obtain the respective decoded channel E1 to E3. The mono decoders 206_1 to 206_3 can be, for example, transformation based audio decoders.

The multichannel processor 204 is configured for performing a multichannel processing using a second pair of the decoded channels identified by the multichannel parameters MCH_PAR2 and using the multichannel parameters MCH_PAR2 to obtain processed channels, and for performing a further multichannel processing using a first pair of channels identified by the multichannel parameters MCH_PAR1 and using the multichannel parameters MCH_PAR1, where the first pair of channels comprises at least one processed channel.

As indicated in FIG. 10 by way of example, the multichannel parameters MCH_PAR2 may indicate (or signal) that the second pair of decoded channels consists of the first decoded channel D1 and the second decoded channel D2. Thus, the multichannel processor 204 performs a multichannel processing using the second pair of the decoded channels consisting of the first decoded channel D1 and the second decoded channel D2 (identified by the multichannel parameters MCH_PAR2) and using the multichannel parameters MCH_PAR2, to obtain processed channels P1* and P2*. The multichannel parameters MCH_PAR1 may indicate that the first pair of decoded channels consists of the first processed channel P1* and the third decoded channel D3. Thus, the multichannel processor 204 performs the further multichannel processing using this first pair of decoded channels consisting of the first processed channel P1* and the third decoded channel D3 (identified by the multichannel parameters MCH_PAR1) and using the multichannel parameters MCH_PAR1, to obtain processed channels P3* and P4*.

Further, the multichannel processor 204 may provide the third processed channel P3* as first channel CH1, the fourth processed channel P4* as third channel CH3 and the second processed channel P2* as second channel CH2.

Assuming that the decoder 200 shown in FIG. 10 receives the encoded multichannel signal 107 from the encoder 100 shown in FIG. 7, the first decoded channel D1 of the decoder 200 may be equivalent to the third processed channel P3 of the encoder 100, wherein the second decoded channel D2 of the decoder 200 may be equivalent to the fourth processed channel P4 of the encoder 100, and wherein the third decoded channel D3 of the decoder 200 may be equivalent to the second processed channel P2 of the encoder 100. Further, the first processed channel P1* of the decoder 200 may be equivalent to the first processed channel P1 of the encoder 100.

Further, the encoded multichannel signal 107 can be a serial signal, wherein the multichannel parameters MCH_PAR2 are received, at the decoder 200, before the multichannel parameters MCH_PAR1. In that case, the multichannel processor 204 can be configured to process the decoded channels in an order, in which the multichannel parameters MCH_PAR1 and MCH_PAR2 are received by the decoder. In the example shown in FIG. 10, the decoder receives the multichannel parameters MCH_PAR2 before the multichannel parameters MCH_PAR1, and thus performs the multichannel processing using the second pair of the decoded channels (consisting of the first and second decoded channels D1 and D2) identified by the multichannel parameters MCH_PAR2 before performing the multichannel processing using the first pair of the decoded channels (consisting of the first processed channel P1* and the third decoded channel D3) identified by the multichannel parameter MCH_PAR1.

In FIG. 10, the multichannel processor 204 exemplarily performs two multichannel processing operations. For illustration purposes, the multichannel processing operations performed by multichannel processor 204 are illustrated in FIG. 10 by processing boxes 208 and 210. The processing boxes 208 and 210 can be implemented in hardware or software.

The processing boxes 208 and 210 can be, for example, stereo boxes, as discussed above with reference to the encoder 100, such as generic decoders (or decoder-side stereo boxes), prediction based decoders (or decoder-side stereo boxes) or KLT based rotation decoders (or decoder-side stereo boxes).

For example, the encoder 100 can use KLT based rotation encoders (or encoder-side stereo boxes). In that case, the encoder 100 may derive the multichannel parameters MCH_PAR1 and MCH_PAR2 such that the multichannel parameters MCH_PAR1 and MCH_PAR2 comprise rotation angles. The rotation angles can be differentially encoded.

Therefore, the multichannel processor 204 of the decoder 200 can comprise a differential decoder for differentially decoding the differentially encoded rotation angles.

The apparatus 200 may further comprise an input interface 212 configured to receive and process the encoded multichannel signal 107, to provide the encoded channels E1 to E3 to the channel decoder 202 and the multichannel parameters MCH_PAR1 and MCH_PAR2 to the multichannel processor 204.

As already mentioned, a keep indicator (or keep tree flag) may be used to signal that no new tree is transmitted, but the last stereo tree shall be used. This can be used to avoid multiple transmission of the same stereo tree configuration if the channel correlation properties stay stationary for a longer time.

Therefore, when the encoded multichannel signal 107 comprises, for a first frame, the multichannel parameters MCH_PAR1 and MCH_PAR2 and, for a second frame, following the first frame, the keep indicator, the multichannel processor 204 can be configured to perform the multichannel processing or the further multichannel processing in the second frame to the same second pair or the same first pair of channels as used in the first frame.

The multichannel processing and the further multichannel processing may comprise a stereo processing using a stereo parameter, wherein for individual scale factor bands or groups of scale factor bands of the decoded channels D1 to D3, a first stereo parameter is included in the multichannel parameter MCH_PAR1 and a second stereo parameter is included in the multichannel parameter MCH_PAR2.

Thereby, the first stereo parameter and the second stereo parameter can be of the same type, such as rotation angles or prediction coefficients. Naturally, the first stereo parameter and the second stereo parameter can be of different types. For example, the first stereo parameter can be a rotation angle, wherein the second stereo parameter can be a prediction coefficient, or vice versa.

Further, the multichannel parameters MCH_PAR1 and MCH_PAR2 can comprise a multichannel processing mask indicating which scale factor bands are multichannel processed and which scale factor bands are not multichannel processed. Thereby, the multichannel processor 204 can be configured to not perform the multichannel processing in the scale factor bands indicated by the multichannel processing mask.

The multichannel parameters MCH_PAR1 and MCH_PAR2 may each include a channel pair identification (or index), wherein the multichannel processor 204 can be configured to decode the channel pair identifications (or indexes) using a predefined decoding rule or a decoding rule indicated in the encoded multichannel signal.

For example, channel pairs can be efficiently signaled using a unique index for each pair, dependent on the total number of channels, as described above with reference to the encoder 100.

Further, the decoding rule can be a Huffman decoding rule, wherein the multichannel processor 204 can be configured to perform a Huffman decoding of the channel pair identifications.

The encoded multichannel signal 107 may further comprise a multichannel processing allowance indicator indicating only a sub-group of the decoded channels, for which the multichannel processing is allowed and indicating at least one decoded channel for which the multichannel processing is not allowed. Thereby, the multichannel processor 204 can be configured for not performing any multichannel processing for the at least one decoded channel, for which the multichannel processing is not allowed as indicated by the multichannel processing allowance indicator.

For example, when the multichannel signal is a 5.1 channel signal, the multichannel processing allowance indicator may indicate that the multichannel processing is only allowed for the 5 channels, i.e. right R, left L, right surround Rs, left surround LS and center C, wherein the multichannel processing is not allowed for the LFE channel.

For the decoding process (decoding of channel pair indices) the following c-code may be used. Thereby, for all channel pairs, the number of channels with active KLT processing (nChannels) as well as the number of channel pairs (numPairs) of the current frame is needed.

```
maxNumPairIdx = nChannels* (nChannels-1)/2 - 1;
numBits = floor (log2 (maxNumPairIdx) +1;
pairCounter = 0;
for (chan1=1; chan1 < nChannels; chan1++) {
      for (chan0=0; chan0 < chan1; chan0++) {
         if (pairCounter == pairIdx)
            channelPair [0] = chan0;
            channelPair [1] = chan1;
            return;
         }
         else
            pairCounter++;
      }
   }
}
```

For decoding the prediction coefficients for non-bandwise angles the following c-code can be used.

```
for (pair=0; pair<numPairs; pair++) {
   mctBandsPerWindow = numMaskBands [pair]/windowsPerFrame;
   if (delta_code_time [pair] > 0) {
      lastVal = alpha_prev_fullband [pair];
   } else {
      lastVal = DEFAULT_ALPHA;
   }
   newAlpha = lastVal + dpcm_alpha [pair] [0];
   if (newAlpha >= 64) {
         newAlpha -= 64;
   }
   for (band=0; band < numMaskBands; band++) {
      /* set all angles to fullband angle */
      pairAlpha [pair] [band] = newAlpha;
      / * set previous angles according to mctMask */
      if (mctMask [pair] [band] > 0) {
         alpha_prev_frame [pair] [band%mctBandsPerWindow] = newAlpha;
      }
      else {
         alpha_prev_frame [pair] [band%mctBandsPerWindow] =
DEFAULT_ALPHA;
      }
   }
   alpha_prev_fullband [pair] = newAlpha;
   for (band=bandsPerWindow; band<MAX_NUM_MC_BANDS; band++) {
      alpha_prev_frame [pair] [band] = DEFAULT_ALPHA;
   }
}
```

For decoding the prediction coefficients for non-bandwise KLT angles the following c-code can be used.

```
for (pair=0; pair<numPairs; pair++) {
   mctBandsPerWindow = numMaskBands [pair]/windowsPerFrame;
   for (band=0; band<numMaskBands [pair]; band++) {
      if (delta_code_time [pair] > 0) {
         lastVal = alpha_prev_frame [pair] [band%mctBandsPerWindow];
      }
      else {
         if ( (band % mctBandsPerWindow) == 0) {
            lastVal = DEFAULT_ALPHA;
         }
      }
      if (msMask [pair] [band] > 0 ) {
         newAlpha = lastVal + dpcm_alpha [pair] [band];
         if (newAlpha >= 64) {
            newAlpha -= 64;
         }
         pairAlpha [pair] [band] = newAlpha;
         alpha_prev_frame [pair ] [band%mctBandsPerWindow] = newAlpha;
         lastVal = newAlpha;
      }
      else {
         alpha_prev_frame [pair ] [band%mctBandsPerWindow] =
DEFAULT_ALPHA; /* - 45° */
      }
      /* reset fullband angle */
      alpha_prev_fullband [pair] = DEFAULT_ALPHA;
   }
   for (band=bandsPerWindow; band<MAX_NUM_MC_BANDS; band++) {
      alpha_prev_frame [pair ] [band] = DEFAULT_ALPHA;
   }
}
```

To avoid floating point differences of trigonometric functions on different platforms, the following lookup-tables for converting angle indices directly to sin/cos shall be used:

```
tabIndexToSinAlpha [ 64] = {
-1.000000f,-0.998795f, -0.995185f,-0.989177f, -0.980785f,-0.970031f,-
0.956940f, -0.941544f,
-0.923880f,-0.903989f, -0.881921f,-0.857729f, -0.831470f, -0.803208f,-
0.773010f, -0.740951f,
-0.707107f, -0.671559f, -0.634393f,-0.595699f, -0.555570f,-0.514103f,-
0.471397f, -0.427555f,
-0.382683f, -0.336890f, -0.290285f, -0.242980f, -0.195090f,-0.146730f,-
0.098017f, -0.049068f,
   0.000000f, 0.049068f, 0.098017f, 0.146730f, 0.195090f, 0.242980f,
0.290285f, 0.336890f,
   0.382683f, 0.427555f, 0.471397f, 0.514103f, 0.555570f, 0.595699f,
0.634393f, 0.671559f,
   0.707107f, 0.740951f, 0.773010f, 0.803208f, 0.831470f, 0.857729f,
0.881921f, 0.903989f,
   0.923880f, 0.941544f, 0.956940f, 0.970031f, 0.980785f, 0.989177f,
0.995185f, 0.998795f
};
tabIndexToCosAlpha [64] = {
0.000000f, 0.049068f, 0.098017f, 0.146730f, 0.195090f, 0.242980f,
0.290285f, 0.336890f,
0.382683f, 0.427555f, 0.471397f, 0.514103f, 0.555570f, 0.595699f,
0.634393f, 0.671559f,
0.707107f, 0.740951f, 0.773010f, 0.803208f, 0.831470f, 0.857729f,
0.881921f, 0.903989f,
0.923880f, 0.941544f, 0.956940f, 0.970031f, 0.980785f, 0.989177f,
0.995185f, 0.998795f,
1.000000f, 0.998795f, 0.995185f, 0.989177f, 0.980785f, 0.970031f,
0.956940f, 0.941544f,
0.923880f, 0.903989f, 0.881921f, 0.857729f, 0.831470f, 0.803208f,
0.773010f, 0.740951f,
0.707107f, 0.671559f, 0.634393f, 0.595699f, 0.555570f, 0.514103f,
0.471397f, 0.427555f,
0.382683f, 0.336890f, 0.290285f, 0.242980f, 0.195090f, 0.146730f,
0.098017f, 0.049068f
};
```

For decoding of multichannel coding the following c-code can be used for the KLT rotation based approach.

```
decode_mct_rotation ( )
{
  for (pair=0; pair < self->numPairs; pair++) {
  mctBandOffset = 0;
  /* inverse MCT rotation */
  for (win = 0, group = 0; group <num_window_groups; group++) {
    for ( groupwin = 0; groupwin < window_group_length [group];
groupwin++, win++) {
      *dmx = spectral_data [ch1] [win];
      *res = spectral_data [ch2] [win];
apply_mct_rotation_wrapper (self,dmx,res,&alphaSfb [mctBandOffset],
&mctMask [mctBandOffset],mctBandsPerWindow, alpha,
        totalSfb, pair, nSamples);
      }
      mctBandOffset += mctBandsPerWindow;
    }
  }
}
```

For bandwise processing the following c-code can be used.

```
apply_mct_rotation_wrapper (self, *dmx, *res, *alphaSfb, *mctMask,
mctBandsPerWindow,
            alpha, totalSfb, pair, nSamples)
{
  sfb = 0;
  if (self->MCCSignalingType == 0) {
  }
  else if (self->MCCSignalingType == 1) {
    /* apply fullband box * /
    if (!self->bHasBandwiseAngles [pair] && !self-
>bHasMctMask [pair]) {
      apply_mct_rotation (dmx, res, alphaSfb[0], nSamples);
    }
    else {
      /* apply bandwise processing */
      for (i = 0; i< mctBandsPerWindow; i++) {
        if (mctMask [i] == 1) {
          startLine = swb_offset [sfb];
          stopLine = (sfb+2<totalSfb) ? swb_offset [sfb+2] :
swb_offset [sfb+1];
          nSamples = stopLine-startLine;
          apply_mct_rotation (&dmx [ startLine], &res [startLine],
alphaSfb[i], nSamples);
        }
        sfb += 2;
        / * break condition */
        if (sfb >= totalSfb) {
          break;
        }
      }
    }
  }
  else if (self->MCCSignalingType == 2) {
  }
  else if (self->MCCSignalingType == 3) {
    apply_mct_rotation (dmx, res, alpha, nSamples);
  }
}
```

For an application of KLT rotation the following c-code can be used.

```
apply_mct_rotation (*dmx, *res, alpha, nSamples)
{
  for (n=0; n<nSamples; n++) {
    L = dmx [n] * tabIndexToCosAlpha [alphaIdx] - res [n] *
tabIndexToSinAlpha [alphaIdx];
```

-continued

```
    R = dmx [n] * tabIndexToSinAlpha [alphaIdx] + res [n] *
tabIndexToCosAlpha [alphaIdx];
    dmx [n] = L;
    res [n] = R;
  }
}
```

Figure 12:
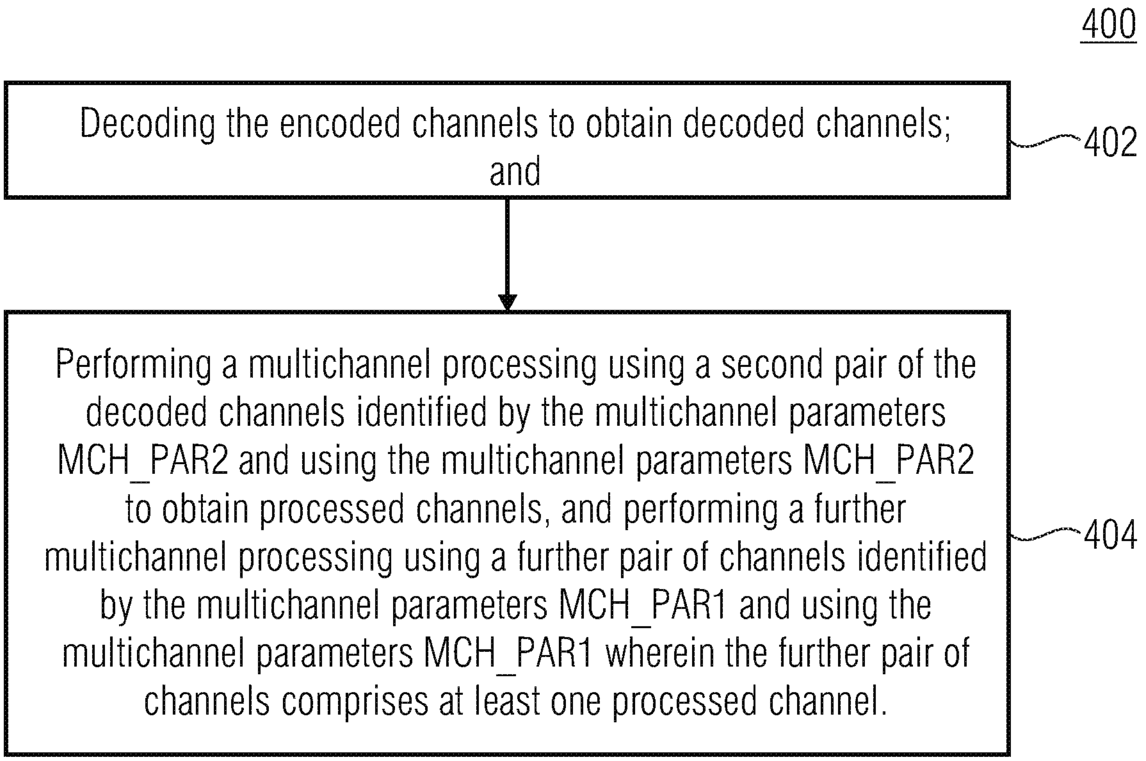
FIG. 12 shows a flowchart of a method for decoding an encoded multichannel signal having encoded channels and at least two multichannel parameters, according to an embodiment.

FIG. 12 shows a flowchart of a method 400 for decoding an encoded multichannel signal having encoded channels and at least two multichannel parameters MCH_PAR1, MCH_PAR2. The method 400 comprises a step 402 of decoding the encoded channels to obtain decoded channels; and a step 404 of performing a multichannel processing using a second pair of the decoded channels identified by the multichannel parameters MCH_PAR2 and using the multichannel parameters MCH_PAR2 to obtain processed channels, and performing a further multichannel processing using a first pair of channels identified by the multichannel parameters MCH_PAR1 and using the multichannel parameters MCH_PAR1, wherein the first pair of channels comprises at least one processed channel.

In the following, stereo filling in multichannel coding according to embodiments is explained:

As already outlined, an undesired effect of spectral quantization may be that quantization may possibly result in spectral holes. For example, all spectral values in a particular frequency band may be set to zero on the encoder side as a result of quantization. For example, the exact value of such spectral lines before quantization may be relatively low and quantization then may lead to a situation, where the spectral values of all spectral lines, for example, within a particular frequency band have been set to zero. On the decoder side, when decoding, this may lead to undesired spectral holes.

The Multichannel Coding Tool (MCT) in MPEG-H allows adapting to varying inter-channel dependencies but, due to usage of single channel elements in typical operating configurations, does not allow Stereo Filling.

Figure 14:
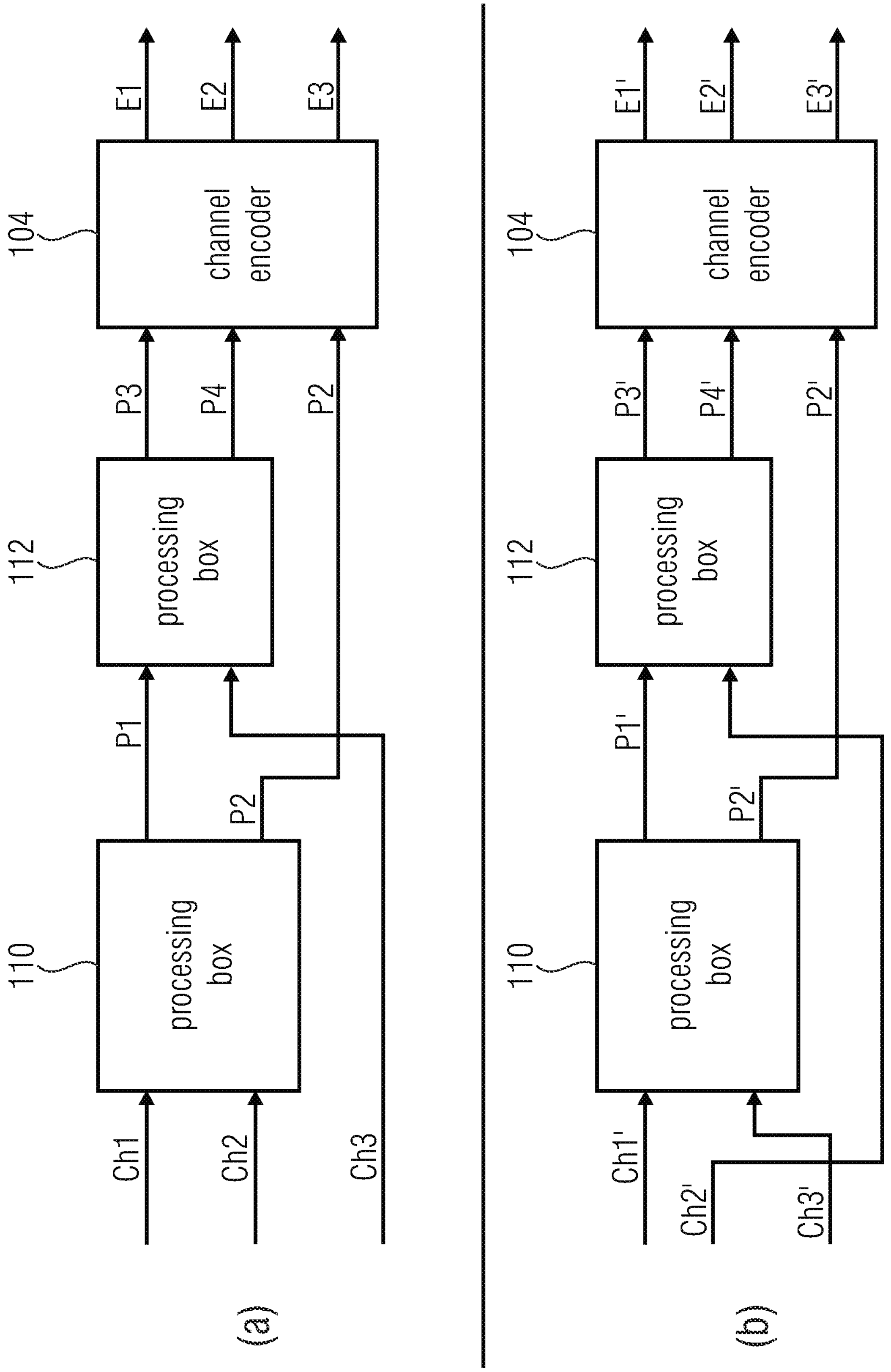
FIG. 14 shows in scenario (a) a generation of combination channels for a first frame in scenario, and in scenario (b) a generation of combination channels for a second frame succeeding the first frame according to an embodiment.

As can be seen in FIG. 14, the Multichannel Coding Tool combines the three or more channels that are encoded in a hierarchical fashion. However, the way, how the Multichannel Coding Tool (MCT) combines the different channels when encoding varies from frame to frame depending on the current signal properties of the channels.

For example, in FIG. 14, scenario (a), to generate a first encoded audio signal frame, the Multichannel Coding Tool (MCT) may combine a first channel Chi and a second channel CH2 to obtain a first combination channel (processed channel) P1 and a second combination channel P2. Then, the Multichannel Coding Tool (MCT) may combine the first combination channel P1 and the third channel CH3 to obtain a third combination channel P3 and a fourth combination channel P4. The Multichannel Coding Tool (MCT) may then encode the second combination channel P2, the third combination channel P3 and the fourth combination channel P4 to generate the first frame.

Then, for example, in FIG. 14 scenario (b), to generate a second encoded audio signal frame (temporally) succeeding the first encoded audio signal frame, the Multichannel Coding Tool (MCT) may combine the first channel CH1' and the third channel CH3' to obtain a first combination channel P1' and a second combination channel P2'. Then, the Multichannel Coding Tool (MCT) may combine the first combination channel P1' and the second channel CH2' to obtain a third combination channel P3' and a fourth combination channel P4'. The Multichannel Coding Tool (MCT) may then encode the second combination channel P2', the third combination channel P3' and the fourth combination channel P4' to generate the second frame.

As can be seen from FIG. 14, the way in which the second, third and fourth combinational channel of the first frame has been generated in scenario of FIG. 14 (*a*) significantly differs from the way in which the second, third and fourth combinational channel of the second frame, respectively, has been generated in the scenario of FIG. 14 (*b*), as different combinations of channels have been used to generate the respective combination channels P2, P3 and P4 and P2', P3', P4', respectively.

Inter alia, embodiments of the present invention are based on the following findings: As can be seen in FIG. 7 and FIG. 14, the combination channels P3, P4 and P2 (or P2', P3' and P4' in scenario (b) of FIG. 14) are fed into channel encoder 104. Inter alia, channel encoder 104 may, e.g., conduct quantization, so that spectral values of the channels P2, P3 and P4 may be set to zero due to quantization. Spectrally neighbored spectral samples may be encoded as a spectral band, wherein each spectral band may comprise a number of spectral samples.

The number of spectral samples of a frequency band may be different for different frequency bands. For example, frequency bands with in a lower frequency range may, e.g., comprise fewer spectral samples, (e.g., 4 spectral samples) than frequency bands in a higher frequency range, which may, e.g., comprise 16 frequency samples. For example, the Bark scale critical bands may define the used frequency bands.

A particularly undesired situation may arise, when all spectral samples of a frequency band have been set to zero after quantization. If such a situation may arise, according to the present invention it is advisable to conduct stereo filling. The present invention is moreover based on the finding that at least not only (pseudo-) random noise should be generated.

Instead or in addition to adding (pseudo-) random noise, according to embodiments of the present invention, if, for example, in FIG. 14, scenario (b), all spectral values of a frequency band of channel P4' have been set to zero, a combination channel that would have been generated in the same or similar way as channel P3' would be a very suitable basis for generating noise for filling in the frequency band that has been quantized to zero.

However, according to embodiments of the present invention, it is advantageous to not use the spectral values of the P3' combination channel of the current frame/of the current point-in-time as a basis for filling a frequency band of the P4' combination channel, which comprises only spectral values that are zero, because both the combination channel P3' as well as the combination channel P4' have been generated based on channel P1' and P2', and thus, using the P3' combination channel of the current point-in-time would result in a mere panning.

For example, if P3' is a mid channel of P1' and P2' (e.g., P3'=0.5*(P1'+P2')) and P4' if is a side channel of P1' and P2' (e.g., P4'=0.5*(P1'−P2')), than introducing, e.g., attenuated, spectral values of P3' into a frequency band of P4' would merely result in a panning.

Instead, using channels of a previous point-in-time for generating spectral values for filling the spectral holes in the current P4' combination channel would be advantageous. According to the findings of the present invention, a combination of channels of a previous frame that corresponds to the P3' combination channel of the current frame would be a desirable basis for generating spectral samples for filling the spectral holes of P4'.

However, the combination channel P3 that has been generated in the scenario of FIG. 10 (*a*) for the previous frame does not correspond to the combination channel P3' of the current frame, as the combination channel P3 of the previous frame has been generated in a different way than the combination channel P3' of the current frame.

According to the findings of embodiments of the present invention, an approximation of the P3' combination channel should be generated based on the reconstructed channels of a previous frame on the decoder side.

FIG. 10 (*a*) illustrates an encoder scenario where the channels CH1, CH2 and CH3 are encoded for a previous frame by generating E1, E2 and E3. The decoder receives the channels E1, E2, and E3 and reconstructs the channels CH1, CH2 and CH3 that have been encoded. Some coding loss may have occurred, but still, the generated channels CH1*, CH2* and CH3* that approximate CH1, CH2 and CH3 will be quite similar to the original channels CH1, CH2 and CH3, so that CH1*≈CH1; CH2*≈CH2 and CH3*≈CH3. According to embodiments, the decoder keeps the channels CH1*, CH2* and CH3*, generated for a previous frame in a buffer to use them for noise filling in a current frame.

FIG. 1*a*, which illustrates an apparatus 201 for decoding according to embodiments, is now described in more detail:

The apparatus 201 of FIG. 1*a* is adapted to decode a previous encoded multichannel signal of a previous frame to obtain three or more previous audio output channels, and is configured to decode a current encoded multichannel signal 107 of a current frame to obtain three or more current audio output channels.

The apparatus comprises an interface 212, a channel decoder 202, a multichannel processor 204 for generating the three or more current audio output channels CH1, CH2, CH3, and a noise filling module 220.

The interface 212 is adapted to receive the current encoded multichannel signal 107, and to receive side information comprising first multichannel parameters MCH_PAR2.

The channel decoder 202 is adapted to decode the current encoded multichannel signal of the current frame to obtain a set of three or more decoded channels D1, D2, D3 of the current frame.

The multichannel processor 204 is adapted to select a first selected pair of two decoded channels D1, D2 from the set of three or more decoded channels D1, D2, D3 depending on the first multichannel parameters MCH_PAR2.

As an example this is illustrated in FIG. 1*a* by the two channels D1, D2 that are fed into (optional) processing box 208.

Moreover, the multichannel processor 204 is adapted to generate a first group of two or more processed channels P1*, P2* based on said first selected pair of two decoded channels D1, D2 to obtain an updated set of three or more decoded channels D3, P1*, P2*.

In the example, where the two channels D1 and D2 are fed into the (optional) box 208, two processed channels P1* and P2* are generated from the two selected channels D1 and D2. The updated set of the three or more decoded channels then comprises channel D3 that had been left and unmodified and further comprises P1* and P2* that have been generated from D1 and D2.

Before the multichannel processor 204 generates the first pair of two or more processed channels P1*,P2* based on said first selected pair of two decoded channels D1, D2, the noise filling module 220 is adapted to identify for at least one of the two channels of said first selected pair of two decoded channels D1, D2, one or more frequency bands, within which all spectral lines are quantized to zero, and to generate a mixing channel using two or more, but not all of the three or more previous audio output channels, and to fill the spectral lines of the one or more frequency bands, within which all spectral lines are quantized to zero, with noise generated using spectral lines of the mixing channel, wherein the noise filling module 220 is adapted to select the two or more previous audio output channels that are used for generating the mixing channel from the three or more previous audio output channels depending on the side information.

Thus, the noise filling module 220 analyses, whether there are frequency bands that only have spectral values that are zero, and furthermore fills the found empty frequency bands with generated noise. For example, a frequency band may, e.g., have 4 or 8 or 16 spectral lines and when all spectral lines of a frequency band have quantized to zero then the noise filling module 220 fills generated noise.

A particular concept of embodiments that may be employed by the noise filling module 220 that specifies how to generate and fill noise is referred to as Stereo Filling.

In the embodiments of FIG. 1*a*, the noise filling module 220 interacts with the multichannel processor 204. For example, in an embodiment, when the noise filling module wants to process two channels, for example, by a processing box, it feeds these channels to the noise filling module 220, and the noise filling module 220 checks, whether frequency bands have been quantized to zero, and fills such frequency bands, if detected.

Figure 1B:
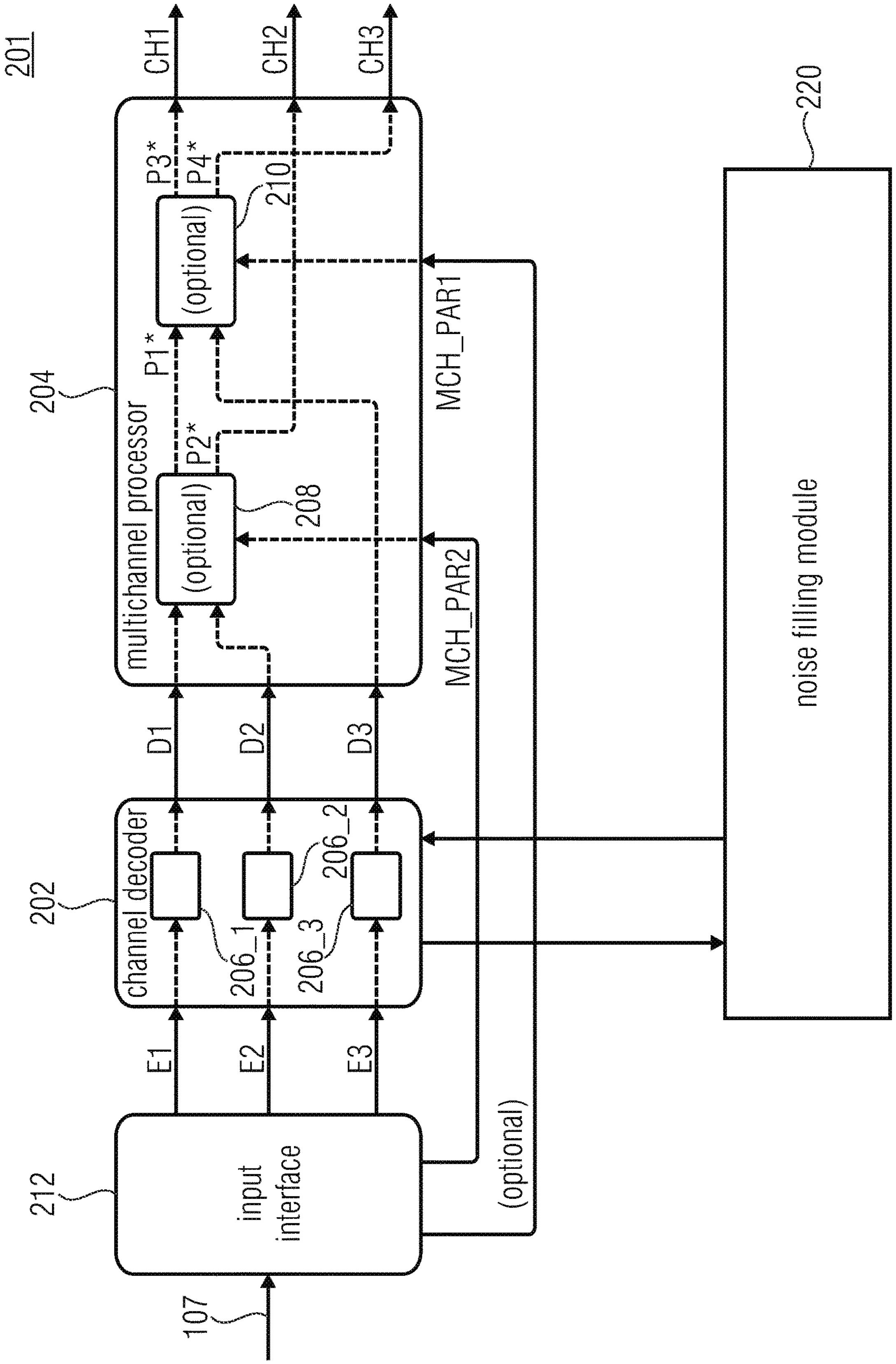
FIG. 1*b* shows an apparatus for decoding according to another embodiment.

In other embodiments illustrated by FIG. 1*b*, the noise filling module 220 interacts with the channel decoder 202. For example, already when the channel decoder decodes the encoded multichannel signal to obtain the three or more decoded channels D1, D2 and D3, the noise filling module may, for example, check whether frequency bands have been quantized to zero, and, for example, fills such frequency bands, if detected. In such an embodiment, the multichannel processor 204 can be sure that all spectral holes have already been closed before by filling noise.

In further embodiments (not shown), the noise filling module 220 may both interact with the channel decoder and the multichannel processor. For example, when the channel decoder 202 generates the decoded channels D1, D2 and D3, the noise filling module 220 may already check whether frequency bands have been quantized to zero, just after the channel decoder 202 has generated them, but may only generate the noise and fill the respective frequency bands, when the multichannel processor 204 really processes these channels.

For example, random noise, a computational cheap operation may be inserted into any of the frequency bands have been quantized to zero, but the noise filling module may fill the noise that was generated from previously generated audio output channels only if they are really processed by the multichannel processor 204. In such embodiments, however, before inserting random noise, a detection whether spectral holes exist should be made before inserting random noise, and that information should be kept in memory, because after inserting random noise, the respective frequency bands than have spectral values different from zero, because the random noise was inserted.

In embodiments, random noise is inserted into frequency bands that have been quantized to zero in addition to the noise generated based on the previous audio output signals.

In some embodiments, the interface 212 may, e.g., be adapted to receive the current encoded multichannel signal 107, and to receive the side information comprising the first multichannel parameters MCH_PAR2 and second multichannel parameters MCH_PAR1.

The multichannel processor 204 may, e.g., be adapted to select a second selected pair of two decoded channels P1*, D3 from the updated set of three or more decoded channels D3, P1*, P2* depending on the second multichannel parameters MCH_PAR1, wherein at least one channel P1* of the second selected pair of two decoded channels (P1*, D3) is one channel of the first pair of two or more processed channels P1*,P2*, and The multichannel processor 204 may, e.g., adapted to generate a second group of two or more processed channels P3*,P4* based on said second selected pair of two decoded channels P1*, D3 to further update the updated set of three or more decoded channels.

An example for such an embodiment can be seen in FIGS. 1*a* and 1*b*, where the (optional) processing box 210 receives channel D3 and processed channel P1* and processes them to obtain processed channels P3* and P4* so that the further updated set of the three decoded channels comprises P2*, which has not been modified by processing box 210, and the generated P3* and P4*.

Processing boxes 208 and 210 has been marked in FIG. 1*a* and FIG. 1*b* as optional. This is to show that although it is a possibility to use processing boxes 208 and 210 for implementing the multichannel processor 204, various other possibilities exist, How to exactly implement the multichannel processor 204. For example, instead of using a different processing box 208, 210 for each different processing of two (or more) channels, the same processing box may be reused, or the multichannel processor 204 may implement the processing of two channels without using processing boxes 208, 210 (as subunits of the multichannel processor 204) at all.

According to a further embodiment, the multichannel processor 204 may, e.g., be adapted to generate the first group of two or more processed channels P1*, P2* by generating a first group of exactly two processed channels P1*, P2* based on said first selected pair of two decoded channels D1, D2. The multichannel processor 204 may, e.g., adapted to replace said first selected pair of two decoded channels D1, D2 in the set of three of more decoded channels D1, D2, D3 by the first group of exactly two processed channels P1*,P2* to obtain the updated set of three or more decoded channels D3, P1*, P2*. The multichannel processor 204 may, e.g., be adapted to generate the second group of two or more processed channels P3*,P4* by generating a second group of exactly two processed channels P3*,P4* based on said second selected pair of two decoded channels P1*, D3.

Furthermore, the multichannel processor 204 may, e.g., adapted to replace said second selected pair of two decoded channels P1*, D3 in the updated set of three of more decoded channels D3, P1*, P2* by the second group of exactly two processed channels P3*,P4* to further update the updated set of three or more decoded channels.

Such in such an embodiment, from the two selected channels (for example, the two input channels of a processing box 208 or 210) exactly two processed channels are generated and these exactly two processed channels replace the selected channels in the set of the three or more decoded channels. For example, processing box 208 of the multichannel processor 204 replaces the selected channels D1 and D2 by P1* and P2*.

However, in other embodiments, an upmix may take place in the apparatus 201 for decoding, and more than two processed channels may be generated from the two selected channels, or not all of the selected channels may be deleted from the updated set of decoded channels.

A further issue is how to generate the mixing channel that is used for generating the noise being generated by the noise filling module 220.

According to some embodiments, the noise filling module 220 may, e.g., be adapted to generate the mixing channel using exactly two of the three or more previous audio output channels as the two or more of the three or more previous audio output channels; wherein the noise filling module 220 may, e.g., be adapted to select the exactly two previous audio output channels from the three or more previous audio output channels depending on the side information.

Using only two of the three or more previous output channels helps to reduce computational complexity of calculating the mixing channel.

However, in other embodiments, more than two channels of the previous audio output channels are used for generating a mixing channel, but the number of previous audio output channels that are taken into account is smaller than the total number of the three or more previous audio output channels.

In embodiments, where only two of the previous output channels are taken into account, the mixing channel may, for example, be calculated as follows:

In an embodiment, the noise filling module 220 is adapted to generate the mixing channel using exactly two previous audio output channels based on the formula $$D_{ch}=(\ddot{O}_1+\ddot{O}_2)\cdot d \text{ or based on the formula}$$

$$D_{ch}=(\hat{O}_1-\hat{O}_2)\cdot d$$

wherein $D_{ch}$ is the mixing channel; wherein $\hat{O}_1$ is a first one of the exactly two previous audio output channels; wherein $\hat{O}_2$ is a second one of the exactly two previous audio output channels, being different from the first one of the exactly to previous audio output channels, and wherein d is a real, positive scalar.

In typical situations, a mid channel $D_{ch}=(\hat{O}_1+\hat{O}_2)\cdot d$ may be a suitable mixing channel.

Such an approach calculates the mixing channel as a mid channel of the two previous audio output channel that are taken into account.

However, in some scenarios, a mixing channel close to zero may occur when applying $D_{ch}=(\hat{O}_1+\hat{O}_2)\cdot d$, for example when $\hat{O}_1\approx-\hat{O}_2$. Then, it may, e.g., be advantageous to use $D_{ch}=(\hat{O}_1-\hat{O}_2)\cdot d$ as the mixing signal. Thus, then, a side channel (for out of phase input channels) used.

According to an alternative approach, the noise filling module 220 is adapted to generate the mixing channel using exactly two previous audio output channels based on the formula $$\hat{I}_{ch}=(\cos\alpha\cdot\hat{O}_1+\sin\alpha\cdot\hat{O}_2)\cdot d \text{ or based on the formula}$$

$$\hat{I}_{ch}=(-\sin\alpha\cdot\hat{O}_1+\cos\alpha\cdot\hat{O}_2)\cdot d$$

wherein $\hat{I}_{ch}$ is the mixing channel, wherein $\hat{O}_1$ is a first one of the exactly two previous audio output channels, wherein $\hat{O}_2$ is a second one of the exactly two previous audio output channels, being different from the first one of the exactly to previous audio output channels, and wherein α is an rotation angle.

Such an approach calculates the mixing channel by conducting a rotation of the two previous audio output channels that are taken into account.

The rotation angle α may, for example, be in the range: $-90°<\alpha<90°$.

In an embodiment, the rotation angle may, for example, be in the range: $30°<\alpha<60°$.

Again, in typical situations, a channel $\hat{I}_{ch}=(\cos\alpha\cdot\hat{O}_1+\sin\alpha\cdot\hat{O}_2)\cdot d$ may be a suitable mixing channel. Such an approach calculates the mixing channel as a mid channel of the two previous audio output channel that are taken into account.

However, in some scenarios, a mixing channel close to zero may occur when applying $\hat{I}_{ch}=(\cos\alpha\cdot\hat{O}_1+\sin\alpha\cdot\hat{O}_2)\cdot d$, for example when $\cos\alpha\cdot\hat{O}_1\approx-\sin\alpha\cdot\hat{O}_2$. Then, it may, e.g., be advantageous to use $\hat{I}_{ch}=(-\sin\alpha\cdot\hat{O}_1+\cos\alpha\cdot\hat{O}_2)\cdot d$ as the mixing signal.

According to a particular embodiment, the side information may, e.g., be current side information being assigned to the current frame, wherein the interface 212 may, e.g., be adapted to receive previous side information being assigned to the previous frame, wherein the previous side information comprises a previous angle; wherein the interface 212 may, e.g., be adapted to receive the current side information comprising a current angle, and wherein the noise filling module 220 may, e.g., be adapted to use the current angle of the current side information as the rotation angle α, and is adapted to not use the previous angle of the previous side information as the rotation angle α.

Thus, in such an embodiment, even if the mixing channel is calculated based on previous audio output channels, still, the current angle that is transmitted in the side information is used as rotation angle and not a previously received rotation angle, although the mixing channel is calculated based on previous audio output channels that have been generated based on a previous frame.

Another aspect of some embodiments of the present invention relates to scale factors.

The frequency bands may, for example, be scale factor bands.

According to some embodiments, before the multichannel processor 204 generates the first pair of two or more processed channels P1*,P2* based on said first selected pair of two decoded channels (D1, D2), the noise filling module (220) may, e.g., be adapted to identify for at least one of the two channels of said first selected pair of two decoded channels D1, D2, one or more scale factor bands being the one or more frequency bands, within which all spectral lines are quantized to zero, and may, e.g., be adapted to generate the mixing channel using said two or more, but not all of the three or more previous audio output channels, and to fill the spectral lines of the one or more scale factor bands, within which all spectral lines are quantized to zero, with the noise generated using the spectral lines of the mixing channel depending on a scale factor of each of the one or more scale factor bands within which all spectral lines are quantized to zero.

In such embodiments, a scale factor may, e.g., be assigned to each of the scale factor bands, and that scale factor is taken into account when generating the noise using the mixing channel.

In a particular embodiment, the receiving interface 212 may, e.g., be configured to receive the scale factor of each of said one or more scale factor bands, and the scale factor of each of said one or more scale factor bands indicates an energy of the spectral lines of said scale factor band before quantization. The noise filling module 220 may, e.g., be adapted to generate the noise for each of the one or more scale factor bands, within which all spectral lines are quantized to zero, so that an energy of the spectral lines after adding the noise into one of the frequency bands corresponds to the energy being indicated by the scale factor for said scale factor band.

For example, a mixing channel may indicate for spectral values for four spectral lines of a scale factor band in which noise shall be inserted, and these spectral values may for example, be: 0.2; 0.3; 0.5; 0.1.

An energy of that scale factor band of the mixing channel may, for example, be calculated as follows:

$$(0.2)^2+(0.3)^2+(0.5)^2+(0.1)^2=0.39$$

However, the scale factor for that scale factor band of the channel in which noise shall be filled may, for example, be only 0.0039.

An attenuation factor may, e.g., be calculated as follows:

$$\text{attenuation factor} = \frac{\text{Energy indicated by scale factor}}{\text{Energy of mixing channel}}$$

Thus, in the above example, $$\text{attenuation factor} = \frac{0.0039}{0.39} = 0.01$$

In an embodiment, each of the spectral values of the scale factor band of the mixing channel that shall be used as noise, is multiplied with the attenuation factor:

Thus, each of the four spectral values of the scale factor band of the above example is multiplied by the attenuation factor and that results in attenuated spectral values:

$$0.2 \cdot 0.01 = 0.002$$

$$0.3 \cdot 0.01 = 0.003$$

$$0.5 \cdot 0.01 = 0.005$$

$$0.1 \cdot 0.01 = 0.001$$

These attenuated spectral values may, e.g. then be inserted into the scale factor band of the channel in which noise shall be filled.

The above example is equally applicable on logarithmic values by replacing the above operations by their corresponding logarithmic operations, for example, by replacing multiplication by addition, etc.

Moreover, in addition to the description of particular embodiments provided above, other embodiments of the noise filling module 220 apply one, some or all the concepts described with reference to FIG. 2 to FIG. 6.

Another aspect of embodiments of the present invention relates to the question based on which information channels from the previous audio output channels are selected for being used to generate the mixing channel to obtain the noise to be inserted.

According to an embodiment, apparatus according the noise filling module 220 may, e.g., be adapted to select the exactly two previous audio output channels from the three or more previous audio output channels depending on the first multichannel parameters MCH_PAR2.

Thus, in such an embodiment, the first multichannel parameters that steers which channels are to be selected for being processed, does also steer which of the previous audio output channels are to be used to generate the mixing channel for generating the noise to be inserted.

In an embodiment, the first multichannel parameters MCH_PAR2 may, e.g., indicate two decoded channels D1, D2 from the set of three or more decoded channels; and the multichannel processor 204 is adapted to select the first selected pair of two decoded channels D1, D2 from the set of three or more decoded channels D1, D2, D3 by selecting the two decoded channels D1, D2 being indicated by the first multichannel parameters MCH_PAR2. Moreover, the second multichannel parameters MCH_PAR1 may, e.g., indicate two decoded channels P1*, D3 from the updated set of three or more decoded channels. The multichannel processor 204 may, e.g., be adapted to select the second selected pair of two decoded channels P1*, D3 from the updated set of three or more decoded channels D3, P1*, P2* by selecting the two decoded channels P1*, D3 being indicated by the second multichannel parameters MCH_PAR1.

Thus, in such an embodiment, the channels that are selected for the first processing, e.g., the processing of processing box 208 in FIG. 1*a* or FIG. 1*b* do not only depend on the first multichannel parameters MCH_PAR2. More than that, these two selected channels are explicitly specified in the first multichannel parameters MCH_PAR2.

Likewise, in such an embodiment, the channels that are selected for the second processing, e.g., the processing of processing box 210 in FIG. 1*a* or FIG. 1*b* do not only depend on the second multichannel parameters MCH_PAR1. More than that, these two selected channels are explicitly specified in the second multichannel parameters MCH_PAR1.

Embodiments of the present invention introduce a sophisticated indexing scheme for the multichannel parameters that is explained with reference to FIG. 15.

Figure 15:
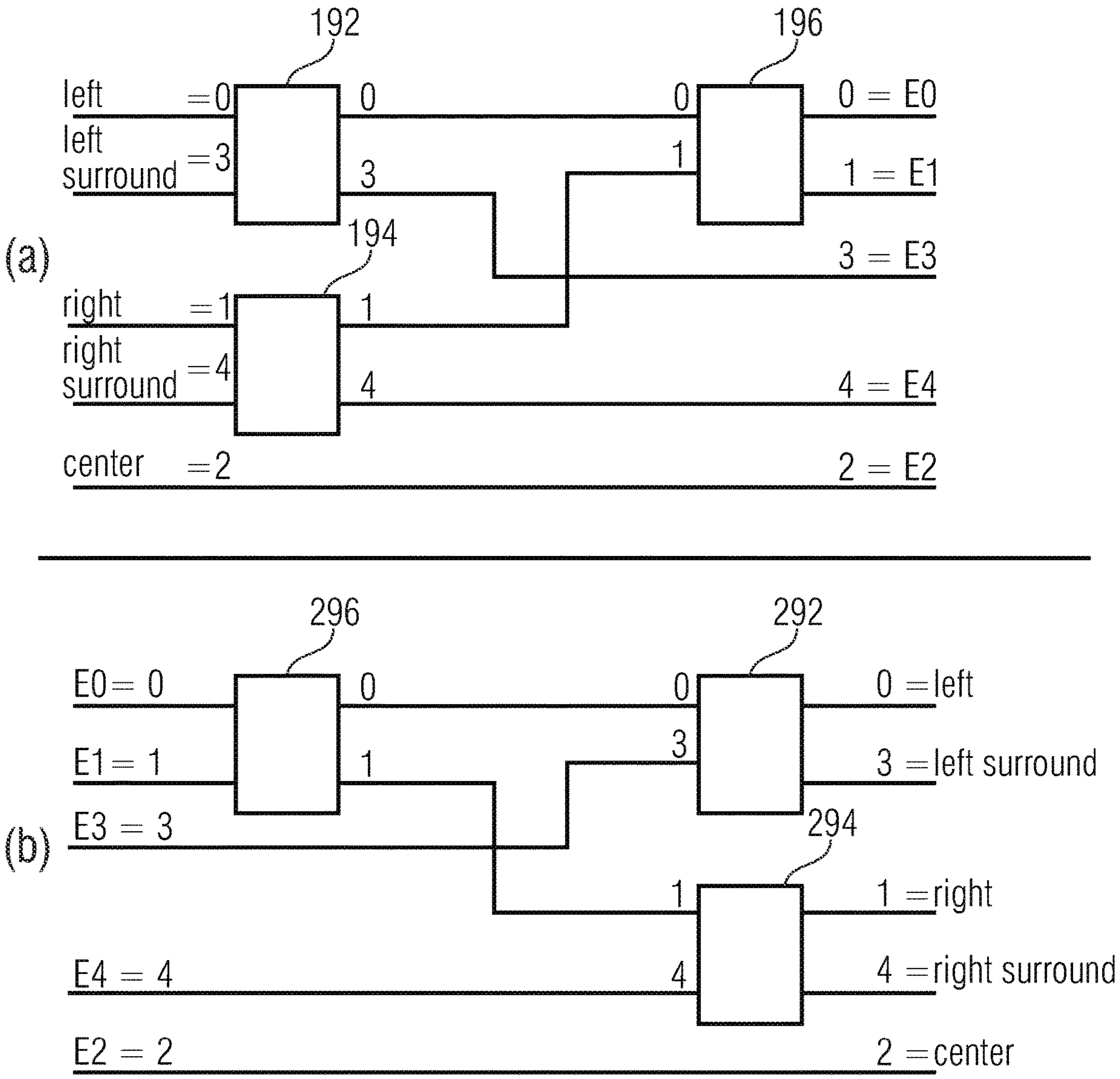
FIG. 15 shows an indexing scheme for the multichannel parameters according to embodiments.

FIG. 15 (*a*) shows an encoding of five channels, namely the channels Left, Right, Center, Left Surround and Right Surround, on an encoder side. FIG. 15 (*b*) shows a decoding of the encoded channels E0, E1, E2, E3, E4 to reconstruct the channels Left, Right, Center, Left Surround and Right Surround.

It is assumed that an index is assigned to each of the five channels Left, Right, Center, Left Surround and Right Surround, namely

| Index | Channel Name |
|---|---|
| 0 | Left |
| 1 | Right |
| 2 | Center |
| 3 | Left Surround |
| 4 | Right Surround |

In FIG. 15 (*a*), on the encoder side, the first operation that is conducted may, e.g., be the mixing of channel 0 (Left) and channel 3 (Left Surround) in processing box 192 to obtain two processed channels. It may be assumed that one of the processed channels is a mid channel and the other channel is a side channel. However, other concepts of forming two processed channels may also be applied, for example, determining the two processed channels by conducting a rotation operation.

Now, the two generated processed channels get the same indexes as the indexes of the channels that were used for the processing. Namely, a first one of the processed channels has index 0 and a second one of the processed channels has index 3. The determined multichannel parameters for this processing may, e.g., be (0; 3).

The second operation on the encoder side that is conducted may, e.g., be the mixing of channel 1 (Right) and channel 4 (Right Surround) in processing box 194 to obtain two further processed channels. Again, the two further generated processed channels get the same indexes as the indexes of the channels that were used for the processing. Namely, a first one of the further processed channels has index 1 and a second one of the processed channels has index 4. The determined multichannel parameters for this processing may, e.g., be (1; 4).

The third operation on the encoder side that is conducted may, e.g., be the mixing of processed channel 0 and processed channel 1 in processing box 196 to acquire another two processed channels. Again, these two generated processed channels get the same indexes as the indexes of the channels that were used for the processing. Namely, a first one of the further processed channels has index 0 and a second one of the processed channels has index 1. The determined multichannel parameters for this processing may, e.g., be (0; 1).

The encoded channels E0, E1, E2, E3 and E4 are distinguished by their indices, namely, E0 has index 0, E1 has index 1, E2 has index 2, etc.

The three operations on the encoder side result in the three multichannel parameters:

(0; 3), (1; 4), (0; 1).

As the apparatus for decoding shall perform the encoder operations in inverse order, the order of the multichannel parameters may, e.g., be inverted when being transmitted to the apparatus for decoding, resulting in the multichannel parameters:

(0; 1), (1; 4), (0; 3).

For the apparatus for decoding, (0; 1) may be referred to as first multichannel parameters, (1; 4) may be referred to as second multichannel parameters and (0; 3) may be referred to as third multichannel parameters.

On the decoder side shown in FIG. 15 (*b*), from receiving the first multichannel parameters (0; 1), the apparatus for decoding concludes that as a first processing operation on the decoder side, channels 0 (E0) and 1 (E1) shall be processed. This is conducted in box 296 of FIG. 15 (*b*). Both generated processed channels inherit the indices from the channels E0 and E1 that have been used for generating them, and thus, the generated processed channels also have the indices 0 and 1.

From receiving the second multichannel parameters (1; 4), the apparatus for decoding concludes that as a second processing operation on the decoder side, processed channel 1 and channel 4 (E4) shall be processed. This is conducted in box 294 of FIG. 15 (*b*). Both generated processed channels inherit the indices from the channels 1 and 4 that have been used for generating them, and thus, the generated processed channels also have the indices 1 and 4.

From receiving the third multichannel parameters (0; 3), the apparatus for decoding concludes that as a third processing operation on the decoder side, processed channel 0 and channel 3 (E3) shall be processed. This is conducted in box 292 of FIG. 15 (*b*). Both generated processed channels inherit the indices from the channels 0 and 3 that have been used for generating them, and thus, the generated processed channels also have the indices 0 and 3.

As a result of the processing of the apparatus for decoding, the channels Left (index 0), Right (index 1), Center (index 2), Left Surround (index 3) and Right Surround (index 4) are reconstructed.

Let us assume that on the decoder side, due to quantization, all values of channel E1 (index 1) within a certain scale factor band have been quantized to zero. When the apparatus for decoding wants to conduct the processing in box 296, a noise filled channel 1 (channel E1) is desired.

As already outlined, embodiments now use two previous audio output signal for noise filling the spectral hole of channel 1.

In a particular embodiment, if a channel with which an operation shall be conducted has scale factor bands that are quantized to zero, then the two previous audio output channels are used for generating the noise that have the same index number as the two channels with which the processing shall be conducted. In the example, if a spectral hole of channel 1 is detected before the processing in processing box 296, then the previous audio output channels having index 0 (previous Left channel) and having index 1 (previous Right channel) are used to generate noise to fill the spectral hole of channel 1 on the decoder side.

As the indices are consistently inherited by the processed channels that result from a processing, it can be assumed that the previous output channels would have played a role for generating the channels that take part in the actual processing of the decoder side, if the previous audio output channels would be the current audio output channels. Thus, a good estimation for the scale factor band that has been quantized to zero can be achieved.

According to embodiments the apparatus may, e.g., be adapted to assign an identifier from a set of identifiers to each previous audio output channel of the three or more previous audio output channels, so that each previous audio output channel of the three or more previous audio output channels is assigned to exactly one identifier of the set of identifiers, and so that each identifier of the set of identifiers is assigned to exactly one previous audio output channel of the three or more previous audio output channels. Moreover, the apparatus may, e.g., be adapted to assign an identifier from said set of identifiers to each channel of the set of the three or more decoded channels, so that each channel of the set of the three or more decoded channels is assigned to exactly one identifier of the set of identifiers, and so that each identifier of the set of identifiers is assigned to exactly one channel of the set of the three or more decoded channels.

Furthermore, the first multichannel parameters MCH_PAR2 may, e.g., indicate a first pair of two identifiers of the set of the three or more identifiers. The multichannel processor 204 may, e.g., be adapted to select the first selected pair of two decoded channels D1, D2 from the set of three or more decoded channels D1, D2, D3 by selecting the two decoded channels D1, D2 being assigned to the two identifiers of the first pair of two identifiers.

The apparatus may, e.g., be adapted to assign a first one of the two identifiers of the first pair of two identifiers to a first processed channel of the first group of exactly two processed channels P1*,P2*. Moreover, the apparatus may, e.g., be adapted to assign a second one of the two identifiers of the first pair of two identifiers to a second processed channel of the first group of exactly two processed channels P1*,P2*.

The set of identifiers, may, e.g., be a set of indices, for example, a set of non-negative integers (for example, a set comprising the identifiers 0; 1; 2; 3 and 4).

In particular embodiments, the second multichannel parameters MCH_PAR1 may, e.g., indicate a second pair of two identifiers of the set of the three or more identifiers. The multichannel processor 204 may, e.g., be adapted to select the second selected pair of two decoded channels P1*, D3 from the updated set of three or more decoded channels D3, P1*, P2* by selecting the two decoded channels (D3, P1*) being assigned to the two identifiers of the second pair of two identifiers. Moreover, the apparatus may, e.g., be adapted to assign a first one of the two identifiers of the second pair of two identifiers to a first processed channel of the second group of exactly two processed channels P3*, P4*.

Furthermore, the apparatus may, e.g., be adapted to assign a second one of the two identifiers of the second pair of two identifiers to a second processed channel of the second group of exactly two processed channels P3*, P4*.

In a particular embodiment, the first multichannel parameters MCH_PAR2 may, e.g., indicate said first pair of two identifiers of the set of the three or more identifiers. The noise filling module 220 may, e.g., be adapted to select the exactly two previous audio output channels from the three or more previous audio output channels by selecting the two previous audio output channels being assigned to the two identifiers of said first pair of two identifiers.

As already outlined, FIG. 7 illustrates an apparatus 100 for encoding a multichannel signal 101 having at least three channels (CH1:CH3) according to an embodiment.

The apparatus comprises an iteration processor 102 being adapted to calculate, in a first iteration step, inter-channel correlation values between each pair of the at least three channels (CH:CH3), for selecting, in the first iteration step, a pair having a highest value or having a value above a threshold, and for processing the selected pair using a multichannel processing operation 110,112 to derive initial multichannel parameters MCH_PAR1 for the selected pair and to derive first processed channels P1,P2.

The iteration processor 102 is adapted to perform the calculating, the selecting and the processing in a second iteration step using at least one of the processed channels P1 to derive further multichannel parameters MCH_PAR2 and second processed channels P3, P4.

Moreover, the apparatus comprises a channel encoder being adapted to encode channels (P2:P4) resulting from an iteration processing performed by the iteration processor 104 to acquire encoded channels (E1:E3).

Furthermore, the apparatus comprises an output interface 106 being adapted to generate an encoded multichannel signal 107 having the encoded channels (E1:E3), the initial multichannel parameters and the further multichannel parameters MCH_PAR1, MCH_PAR2.

Moreover, the apparatus comprises an output interface 106 being adapted to generate the encoded multichannel signal 107 to comprise an information indicating whether or not an apparatus for decoding shall fill spectral lines of one or more frequency bands, within which all spectral lines are quantized to zero, with noise generated based on previously decoded audio output channels that have been previously decoded by the apparatus for decoding.

Thus, the apparatus for encoding is capable of signaling whether or not an apparatus for decoding shall fill spectral lines of one or more frequency bands, within which all spectral lines are quantized to zero, with noise generated based on previously decoded audio output channels that have been previously decoded by the apparatus for decoding.

According to an embodiment, each of the initial multichannel parameters and the further multichannel parameters MCH_PAR1, MCH_PAR2 indicate exactly two channels, each one of the exactly two channels being one of the encoded channels (E1:E3) or being one of the first or the second processed channels P1, P2, P3, P4 or being one of the at least three channels (CH1:CH3).

The output interface 106 may, e.g., be adapted to generate the encoded multichannel signal 107, so that the information indicating whether or not an apparatus for decoding shall fill spectral lines of one or more frequency bands, within which all spectral lines are quantized to zero, comprises information that indicates for each one of the initial and the multichannel parameters MCH_PAR1, MCH_PAR2, whether or not for at least one channel of the exactly two channels that are indicated by said one of the initial and the further multichannel parameters MCH_PAR1, MCH_PAR2, the apparatus for decoding shall fill spectral lines of one or more frequency bands, within which all spectral lines are quantized to zero, of said at least one channel, with the spectral data generated based on the previously decoded audio output channels that have been previously decoded by the apparatus for decoding.

Further below, particular embodiments are described where such information is transmitted using a hasStereoFilling[pair] value that indicates whether or not Stereo Filling in currently processed MCT channel pair shall be applied.

Figure 13:
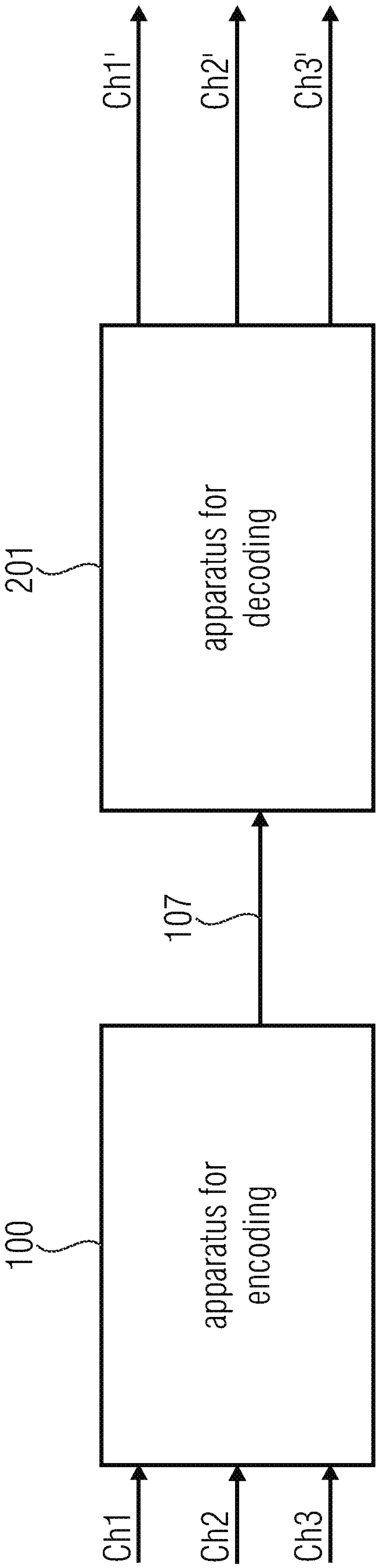
FIG. 13 shows a system according to an embodiment.

FIG. 13 illustrates a system according to embodiments.

The system comprises an apparatus 100 for encoding as described above, and an apparatus 201 for decoding according to one of the above-described embodiments.

The apparatus 201 for decoding is configured to receive the encoded multichannel signal 107, being generated by the apparatus 100 for encoding, from the apparatus 100 for encoding.

Furthermore, an encoded multichannel signal 107 is provided.

The encoded multichannel signal comprises
- encoded channels (E1:E3), and
- multichannel parameters MCH_PAR1, MCH_PAR2, and
- information indicating whether or not an apparatus for decoding shall fill spectral lines of one or more frequency bands, within which all spectral lines are quantized to zero, with spectral data generated based on previously decoded audio output channels that have been previously decoded by the apparatus for decoding.

According to an embodiment, the encoded multichannel signal may, e.g., comprise as the multichannel parameters MCH_PAR1, MCH_PAR2 two or more multichannel parameters.

Each of the two or more multichannel parameters MCH_PAR1, MCH_PAR2 may, e.g., indicate exactly two channels, each one of the exactly two channels being one of the encoded channels (E1:E3) or being one of a plurality of processed channels P1, P2, P3, P4 or being one of at least three original (for example, unprocessed) channels (CH:CH3).

The information indicating whether or not an apparatus for decoding shall fill spectral lines of one or more frequency bands, within which all spectral lines are quantized to zero, may, e.g., comprise information that indicates for each one of the two or more multichannel parameters MCH_PAR1, MCH_PAR2, whether or not for at least one channel of the exactly two channels that are indicated by said one of the two or more multichannel parameters, the apparatus for decoding shall fill spectral lines of one or more frequency bands, within which all spectral lines are quantized to zero, of said at least one channel, with the spectral data generated based on the previously decoded audio output channels that have been previously decoded by the apparatus for decoding.

As already outlined, further below, particular embodiments are described where such information is transmitted using a hasStereoFilling[pair] value that indicates whether or not Stereo Filling in currently processed MCT channel pair shall be applied.

In the following, general concepts and particular embodiments are described in more detail.

Embodiments realize for a parametric low-bitrate coding mode with the flexibility of using arbitrary stereo trees the combination of Stereo Filling and MCT.

Inter channel signal dependencies are exploited by hierarchically applying known joint stereo coding tools. For lower bitrates, embodiments extend the MCT to use a combination of discrete stereo coding boxes and stereo filling boxes. Thus, semi-parametric coding can be applied e.g. for channels with similar content i.e. channel pairs with the highest correlation, whereas differing channels can be coded independently or via a non-parametric representation. Therefore, the MCT bit stream syntax is extended to be able to signal if Stereo Filling is allowed and where it is active.

Embodiments realize a generation of a previous downmix for arbitrary stereo filling pairs Stereo Filling relies on the use of the previous frame's downmix to improve the filling of spectral holes caused by quantization in the frequency domain. However, in combination with the MCT, the set of jointly coded stereo pairs is now allowed to be time-variant.

Consequently, two jointly coded channels may not have been jointly coded in the previous frame, i.e. when the tree configuration has changed.

To estimate a previous downmix, the previously decoded output channels are saved and processed with an inverse stereo operation. For a given stereo box, this is done using the parameters of the current frame and the previous frame's decoded output channels corresponding to the channel indices of the processed stereo box.

If a previous output channel signal is not available, e.g. due to an independent frame (a frame which can be decoded without taking into account previous frame data) or a transform length change, the previous channel buffer of the corresponding channel is set to zero.

Thus, a non-zero previous downmix can still be computed, as long as at least one of the previous channel signals is available.

If the MCT is configured to use prediction based stereo boxes, the previous downmix is calculated with an inverse MS-operation as specified for stereo filling pairs, using one of the following two equations based on a prediction direction flag (pred_dir in the MPEG-H Syntax).

$$D_1=(\widehat{O}_1+\widehat{O}_2)\cdot d$$

$$D_2=(\widehat{O}_1-\widehat{O}_2)\cdot d,$$

where d is an arbitrary real and positive scalar.

If the MCT is configured to use rotation based stereo boxes, the previous downmix is calculated using a rotation with the negated rotation angle.

Thus, for a rotation given as:

$$\begin{bmatrix} O_1 \\ O_2 \end{bmatrix} = \begin{bmatrix} \cos\alpha & -\sin\alpha \\ \sin\alpha & \cos\alpha \end{bmatrix} \cdot \begin{bmatrix} I_1 \\ I_2 \end{bmatrix}$$

the inverse rotation is calculated as:

$$\begin{bmatrix} \hat{I}_1 \\ \hat{I}_2 \end{bmatrix} = \begin{bmatrix} \cos\alpha & \sin\alpha \\ -\sin\alpha & \cos\alpha \end{bmatrix} \cdot \begin{bmatrix} \widehat{O}_1 \\ \widehat{O}_2 \end{bmatrix}$$

with $\widehat{I}_1$ being the desired previous downmix of the previous output channels $\widehat{O}_1$ and $\widehat{O}_2$.

Embodiments realize an application of Stereo Filling in MCT.

The application of Stereo Filling for a single stereo box is described in [1], [5]. As for a single stereo box, Stereo Filling is applied to the second channel of a given MCT channel pair.

Inter alia, differences of Stereo Filling in combination with MCT are as follows:

The MCT tree configuration is extended by one signaling bit per frame to be able to signal if stereo filling is allowed in the current frame.

In the advantageous embodiment, if stereo filling is allowed in the current frame, one additional bit for activating stereo filling in a stereo box is transmitted for each stereo box. This is the advantageous embodiment since it allows encoder-side control over which boxes should have stereo filling applied in the decoder.

In a second embodiment, if stereo filling is allowed in the current frame, stereo filling is allowed in all stereo boxes and no additional bit is transmitted for each individual stereo box. In this case, selective application of stereo filling in the individual MCT boxes is controlled by the decoder.

Further concepts and detailed embodiments are described in the following:

Embodiments improve quality for low-bitrate multichannel operating points.

In a frequency-domain (FD) coded channel pair element (CPE) the MPEG-H 3D Audio standard allows the usage of a Stereo Filling tool, described in subclause 5.5.5.4.9 of [1], for perceptually improved filling of spectral holes caused by a very coarse quantization in the encoder. This tool was shown to be beneficial especially for two-channel stereo coded at medium and low bitrates.

The Multichannel Coding tool (MCT), described in section 7 of [2], was introduced, which enables flexible signal-adaptive definitions of jointly coded channel pairs on a per-frame basis to exploit time-variant inter-channel dependencies in a multichannel setup. The MCT's merit is particularly significant when used for the efficient dynamic joint coding of multichannel setups where each channel resides in its individual single channel element (SCE) since, unlike traditional CPE+SCE (+LFE) configurations which may be established a priori, it allows the joint channel coding to be cascaded and/or reconfigured from one frame to the next.

Coding multichannel surround sound without using CPEs currently bears the disadvantage that joint-stereo tools only available in CPEs—predictive M/S coding and Stereo Filling—cannot be exploited, which is especially disadvantageous at medium and low bitrates. The MCT can act as a substitute for the M/S tool, but a substitute for the Stereo Filling tool is currently unavailable.

Embodiments allow usage of the Stereo Filling tool also within the MCT's channel pairs by extending the MCT bit-stream syntax with a respective signaling bit and by generalizing the application of Stereo Filling to arbitrary channel pairs regardless of their channel element types.

Some Embodiments may, e.g., realize signaling of Stereo Filling in the MCT as follows:

In a CPE, usage of the Stereo Filling tool is signaled within the FD noise filling information for the second channel, as described in subclause 5.5.5.4.9.4 of [1]. When utilizing the MCT, every channel is potentially a "second channel" (due to the possibility of cross-element channel pairs). It is therefore proposed to explicitly signal Stereo Filling by means of an additional bit per MCT coded channel pair. To avoid the need for this additional bit when Stereo Filling is not employed in any channel pair of a specific MCT "tree" instance, the two currently reserved entries of MCTSignalingType element in MultichannelCodingFrame( ) [2] are utilized to signal the presence of the aforementioned additional bit per channel pair.

A detailed description is provided below.

Some embodiments may, e.g., realize calculation of the previous downmix as follows:

Stereo Filling in a CPE fills certain "empty" scale factor bands of the second channel by addition of the respective MDCT coefficients of the previous frame's downmix, scaled according to the corresponding bands' transmitted scale factors (which are otherwise unused since said bands are fully quantized to zero). The process of weighted addition, controlled using the target channel's scale factor bands, can be identically employed in the context of the MCT. The source spectrum for Stereo Filling, i. e. the previous frame's downmix, however, may be computed in a different manner than within CPEs, particularly since the MCT "tree" configuration may be time-variant.

In the MCT, the previous downmix can be derived from the last frame's decoded output channels (which are stored after MCT decoding) using the current frame's MCT parameters for the given joint-channel pair. For a pair applying predictive M/S based joint coding, the previous downmix equals, as in CPE Stereo Filling, either the sum or difference of the appropriate channel spectra, depending on the current frame's direction indicator. For a stereo pair using Karhunen-Loève rotation based joint coding, the previous downmix represents an inverse rotation computed with the current frame's rotation angle(s). Again, a detailed description is provided below.

A complexity assessment shows that Stereo Filling in the MCT, being a medium- and low-bitrate tool, is not expected to increase the worst-case complexity when measured over both low/medium and high bitrates. Moreover, using Stereo Filling typically coincides with more spectral coefficients being quantized to zero, thereby decreasing the algorithmic complexity of the context-based arithmetic decoder. Assuming usage of at most N/3 Stereo Filling channels in an N-channel surround configuration and 0.2 additional WMOPS per execution of Stereo Filling, the peak complexity increases by only 0.4 WMOPS for 5.1 and by 0.8 WMOPS for 11.1 channels when the coder sampling rate is 48 kHz and the IGF tool operates only above 12 kHz. This amounts to less than 2% of the total decoder complexity.

Embodiments implement a MultichanneiCodingFrame( ) element as follows:

| Syntax | No. of bits | Mnemonic |
|---|---|---|
| MultichannelCodingFrame( ) | | |
| { | | |
| MCTSignalingType; | 2 | uimsbf |
| keepTree; | 1 | uimsbf |
| if(keepTree==0) { | | |
| numPairs=escapedValue(5,8,16); | | |
| } | | |
| else { | | |
| numPairs=lastNumPairs; | | |
| } | | |
| MCTStereoFilling = 0; | | |
| if (MCTSignalingType > 1) { | | |
| MCTSignalingType = MCTSignaling Type − 2; | | |
| MCTStereoFilling = 1; | | |
| } | | |
| for(pair=0; pair<numPairs;pair++) { | | |
| hasStereoFilling[pair] = 0; | | |
| if(MCTStereoFilling == 1) { | | |
| hasStereoFilling[pair]; | 1 | uimsbf |
| } | | |
| if(MCTSignalingType == 0) { /* tree of stereo prediction boxes */ | | |
| MultichannelCodingBoxPrediction( ); | | |
| } | | |
| if(MCTSignalingType == 1) { /* tree of rotation boxes */ | | |
| MultichannelCodingBoxRotation( ); | | |
| } | | |
| ~~if((MCTSignalingType == 2) \|\|~~ | | |
| ~~(MCTSignalingType == 3)) {~~ | | |
| ~~/* reserved */~~ | | |
| ~~}~~ | | |
| } | | |
| } | | |

Stereo Filling in the MCT may, according to some embodiments, be implemented as follows:

Like Stereo Filling for IGF in a channel pair element, described in subclause 5.5.5.4.9 of [1], Stereo Filling in the Multichannel Coding Tool (MCT) fills "empty" scale factor bands (which are fully quantized to zero) at and above the noise filling start frequency using a downmix of the previous frame's output spectra.

When Stereo Filling is active in a MCT joint-channel pair (hasStereoFilling[pair]≠0 in Table AMD4.4), all "empty" scale factor bands in the noise filling region (i. e. starting at or above noiseFillingStartOffset) of the pair's second channel are filled to a specific target energy using a downmix of the corresponding output spectra (after MCT application) of the previous frame. This is done after the FD noise filling (see subclause 7.2 in ISO/IEC 23003-3:2012) and prior to scale factor and MCT joint-stereo application. All output spectra after completed MCT processing are saved for potential Stereo Filling in the next frame.

Operational Constraints, may, e.g., be that cascaded execution of Stereo Filling algorithm (hasStereoFilling[pair] ≠0) in empty bands of the second channel is not supported for any following MCT stereo pair with hasStereoFilling [pair]≠0 if the second channel is the same.

In a channel pair element, active IGF Stereo Filling in the second (residual) channel according to subclause 5.5.5.4.9 of [1] takes precedence over—and, thus, disables—any subsequent application of MCT Stereo Filling in the same channel of the same frame.

Terms and Definitions, may, e.g., be defined as follows:

| | |
|---|---|
| hasStereoFilling[pair] | indicates usage of Stereo Filling in currently processed MCT channel pair |
| ch1, ch2 | indices of channels in currently processed MCT channel pair |

-continued

| | |
|---|---|
| spectral_data[ ][ ] | spectral coefficients of channels in currently processed MCT channel pair |
| spectral_data_prev[ ][ ] | output spectra after completed MCT processing in previous frame |
| downmix_prev[ ][ ] | estimated downmix of previous frame's output channels with indices given by currently processed MCT channel pair |
| num_swb | total number of scale factor bands, see ISO/IEC 23003-3, subclause 6.2.9.4 |
| ccfl | coreCoderFrameLength, transform length, see ISO/IEC 23003-3, subclause 6.1. |
| noiseFillingStartOffset | Noise Filling start line, defined depending on ccfl in ISO/IEC 23003-3, Table 109. |
| igf_WhiteningLevel | Spectral whitening in IGF, see ISO/IEC 23008-3, subclause 5.5.5.4.7 |
| seed[ ] | Noise Filling seed used by randomSign( ), see ISO/IEC 23003-3, subclause 7.2. |

For some particular embodiments, the decoding process may, e.g., described as follows:

MCT Stereo Filling is performed using four consecutive operations, which are described in the following:

Step 1: Preparation of Second Channel's Spectrum for Stereo Filling Algorithm

If the Stereo Filling indicator for the given MCT channel pair, hasStereoFilling[pair], equals zero, Stereo Filling is not used and the following steps are not executed. Otherwise, scale factor application is undone if it was previously applied to the pair's second channel spectrum, spectral_data [ch2].

Step 2: Generation of Previous Downmix Spectrum for Given MCT Channel Pair

The previous downmix is estimated from the previous frame's output signals spectral_data_prev[ ][ ] that was stored after application of MCT processing. If a previous output channel signal is not available, e.g. due to an independent frame (indepFlag>0), a transform length change or core_mode==1, the previous channel buffer of the corresponding channel shall be set to zero.

For prediction stereo pairs, i.e. MCTSignalingType==0, the previous downmix is calculated from the previous output channels as downmix_prev[ ][ ] defined in step 2 of subclause 5.5.5.4.9.4 of [1], whereby spectrum[window][ ] is represented by spectral_data[ ][window].

For rotation stereo pairs, i.e. MCTSignalingType==1, the previous downmix is calculated from the previous output channels by inverting the rotation operation defined in subclause 5.5.X.3.7.1 of [2].

```
apply_mct_rotation_inverse(*R, *L, *dmx, aIdx, nSamples)
{
  for (n=0; n<nSamples; n++) {
    dmx = L[n] * tabIndexToCosAlpha[aIdx] + R[n] * tabIndexToSinAlpha[aIdx];
  }
}
using L = spectral_data_prev[ch1][ ], R = spectral_data_prev[ch2][ ], dmx = downmix_prev[
] of the previous frame and using aIdx, nSamples of current frame and MCT pair.
```

Step 3: Execution of Stereo Filling Algorithm in Empty Bands of Second Channel

Stereo Filling is applied in the MCT pair's second channel as in step 3 of subclause 5.5.5.4.9.4 of [1], whereby spectrum[window] is represented by spectral_data[ch2][window] and max_sfb_ste is given by num_swb.

Step 4: Scale factor application and adaptive synchronization of Noise Filling seeds.

As after step 3 of subclause 5.5.5.4.9.4 of [1], the scale factors are applied on the resulting spectrum as in 7.3 of ISO/IEC 23003-3, with the scale factors of empty bands being processed like regular scale factors. In case a scale factor is not defined, e.g. because it is located above max_sfb, its value shall equal zero. If IGF is used, igf_WhiteningLevel equals 2 in any of the second channel's tiles, and both channels do not employ eight-short transformation, the spectral energies of both channels in the MCT pair are computed in the range from index noiseFillingStartOffset to index ccfl/2−1 before executing decode_mct( ).

If the computed energy of the first channel is more than eight times greater than the energy of the second channel, the second channel's seed[ch2] is set equal to the first channel's seed[ch1].

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] ISO/IEC international standard 23008-3:2015, "Information technology—High efficiency coding and media delivery in heterogeneous environments—Part 3: 3D audio," March 2015

[2] ISO/IEC amendment 23008-3:2015/PDAM3, "Information technology—High efficiency coding and media delivery in heterogeneous environments—Part 3: 3D audio, Amendment 3: MPEG-H 3D Audio Phase 2," July 2015

[3] International Organization for Standardization, ISO/IEC 23003-3:2012, "Information Technology—MPEG audio—Part 3: Unified speech and audio coding," Geneva, January 2012

[4] ISO/IEC 23003-1:2007—Information technology—MPEG audio technologies Part 1: MPEG Surround

[5] C. R. Helmrich, A. Niedermeier, S. Bayer, B. Edler, "Low-Complexity Semi-Parametric Joint-Stereo Audio Transform Coding," in Proc. EUSIPCO, Nice, September 2015

[6] ETSI TS 103 190 V1.1.1 (2014 April)—Digital Audio Compression (AC-4) Standard

[7] Yang, Dai and Ai, Hongmei and Kyriakakis, Chris and Kuo, C.-C. Jay, 2001: Adaptive Karhunen-Loeve Transform for Enhanced Multichannel Audio Coding, http/ict.usc.edu/pubs/Adaptive%20Karhunen-Loeve%20-Transform%20for%20Enhanced%20Multichannel%20Audio%20Coding.pdf

[8] European Patent Application, Publication EP 2 830 060 A1: "Noise filling in multichannel audio coding", published on 28 Jan. 2015

[9] Internet Engineering Task Force (IETF), RFC 6716, "Definition of the Opus Audio Codec," Int. Standard, September 2012. Available online at: http//tools.ietf.org/html/rfc6716

[10] International Organization for Standardization, ISO/IEC 14496-3:2009, "Information Technology—Coding of audio-visual objects—Part 3: Audio," Geneva, Switzerland, August 2009

[11] M. Neuendorf et al., "MPEG Unified Speech and Audio Coding—The ISO/MPEG Standard for High-Efficiency Audio Coding of All Content Types," in Proc. 132$^{rd}$ AES Convention, Budapest, Hungary, April 2012. Also to appear in the Journal of the AES, 2013

The invention claimed is:

1. Apparatus for decoding a previous encoded multichannel signal of a previous frame to acquire three or more previous audio output channels, and for decoding a current encoded multichannel signal of a current frame to acquire two or more current audio output channels, wherein the apparatus comprises a channel decoder, a multichannel processor for generating the two or more current audio output channels, and a noise filling module, wherein the channel decoder is adapted to decode the current encoded multichannel signal of the current frame to acquire a set of three or more decoded channels of the current frame, wherein the multichannel processor is adapted to select a first selected pair of two decoded channels from the set of three or more decoded channels depending on first multichannel parameters of side information, wherein the multichannel processor is adapted to generate a first group of two or more processed channels based on said first selected pair of two decoded channels to acquire an updated set of three or more decoded channels, wherein for at least one of the two channels of said first selected pair of two decoded channels, one or more frequency bands exist, within which all spectral lines are quantized to zero, and the multichannel processor is configured to generate a mixing channel using two or more, but not all of the three or more previous audio output channels, and to fill the spectral lines of the one or more frequency bands, within which all spectral lines are quantized to zero, with noise depending on the mixing channel, wherein the noise filling module is adapted to select the two or more previous audio output channels that are used for generating the mixing channel from the three or more previous audio output channels depending on the side information.

2. An apparatus according to claim 1, wherein the apparatus comprises an interface, wherein the noise filling module is adapted to generate the mixing channel using exactly two previous audio output channels of the three or more previous audio output channels as the two or more of the three or more previous audio output channels;

wherein the noise filling module is adapted to select the exactly two previous audio output channels from the three or more previous audio output channels depending on the side information.

3. An apparatus according to claim 2, wherein the noise filling module is adapted to generate the mixing channel using exactly two previous audio output channels based on the formula $$D_{ch}=(\hat{O}_1+\hat{O}_2)\cdot d$$ or based on the formula $$D_{ch}=(\hat{O}_1-\hat{O}_2)\cdot d$$

wherein $D_{ch}$ is the mixing channel, wherein $\hat{O}_1$ is a first one of the exactly two previous audio output channels, wherein $\hat{O}_2$ is a second one of the exactly two previous audio output channels, being different from the first one of the exactly to previous audio output channels, and wherein d is a real, positive scalar.

4. An apparatus according to claim 2, wherein the noise filling module is adapted to generate the mixing channel using exactly two previous audio output channels based on the formula $$\hat{I}_{ch}=(\cos\alpha\cdot\hat{O}_1+\sin\alpha\cdot\hat{O}_2)\cdot d$$ or based on the formula $$\hat{I}_{ch}=(-\sin\alpha\cdot\hat{O}_1+\cos\alpha\cdot\hat{O}_2)\cdot d$$

wherein $\hat{I}_{ch}$ is the mixing channel, wherein $\hat{O}_1$ is a first one of the exactly two previous audio output channels, wherein $\hat{O}_2$ is a second one of the exactly two previous audio output channels, being different from the first one of the exactly to previous audio output channels, and wherein $\alpha$ is an rotation angle.

5. An apparatus according to claim 4, wherein the side information is current side information being assigned to the current frame, wherein the interface is adapted to receive previous side information being assigned to the previous frame, wherein the previous side information comprises a previous angle, wherein the interface is adapted to receive the current side information comprising a current angle, and wherein the noise filling module is adapted to use the current angle of the current side information as the rotation angle $\alpha$, and is adapted to not use the previous angle of the previous side information as the rotation angle $\alpha$.

6. An apparatus according to claim 2, wherein the noise filling module is adapted to select the exactly two previous audio output channels from the three or more previous audio output channels depending on the first multichannel parameters.

7. An apparatus according to claim 2, wherein the interface is adapted to receive the current encoded multichannel signal, and to receive the side information comprising the first multichannel parameters and second multichannel parameters, wherein the multichannel processor is adapted to select a second selected pair of two decoded channels from the updated set of three or more decoded channels depending on the second multichannel parameters, at least one channel of the second selected pair of two decoded channels being one channel of the first pair of two or more processed channels, and wherein the multichannel processor is adapted to generate a second group of two or more processed channels based on said second selected pair of two decoded channels to further update the updated set of three or more decoded channels.

8. An apparatus according to claim 7, wherein, the multichannel processor is adapted to generate the first group of two or more processed channels by generating a first group of exactly two processed channels based on said first selected pair of two decoded channels;

wherein the multichannel processor is adapted to replace said first selected pair of two decoded channels in the set of three of more decoded channels by the first group of exactly two processed channels to acquire the updated set of three or more decoded channels;

wherein the multichannel processor is adapted to generate the second group of two or more processed channels by generating a second group of exactly two processed channels based on said second selected pair of two decoded channels, and wherein the multichannel processor is adapted to replace said second selected pair of two decoded channels in the updated set of three of more decoded channels by the second group of exactly two processed channels to further update the updated set of three or more decoded channels.

9. An apparatus according to claim 8, wherein the first multichannel parameters indicate two decoded channels from the set of three or more decoded channels;

wherein the multichannel processor is adapted to select the first selected pair of two decoded channels from the set of three or more decoded channels by selecting the two decoded channels being indicated by the first multichannel parameters;

wherein the second multichannel parameters indicate two decoded channels from the updated set of three or more decoded channels;

wherein the multichannel processor is adapted to select the second selected pair of two decoded channels from the updated set of three or more decoded channels by selecting the two decoded channels being indicated by the second multichannel parameters.

10. An apparatus according to claim 9, where the apparatus is adapted to assign an identifier from a set of identifiers to each previous audio output channel of the three or more previous audio output channels, so that each previous audio output channel of the three or more previous audio output channels is assigned to exactly one identifier of the set of identifiers, and so that each identifier of the set of identifiers is assigned to exactly one previous audio output channel of the three or more previous audio output channels, where the apparatus is adapted to assign an identifier from said set of identifiers to each channel of the set of the three or more decoded channels, so that each channel of the set of the three or more decoded channels is assigned to exactly one identifier of the set of identifiers, and so that each identifier of the set of identifiers is assigned to exactly one channel of the set of the three or more decoded channels, wherein the first multichannel parameters indicate a first pair of two identifiers of the set of the three or more identifiers, wherein the multichannel processor is adapted to select the first selected pair of two decoded channels from the set of three or more decoded channels by selecting the two decoded channels being assigned to the two identifiers of the first pair of two identifiers;

wherein the apparatus is adapted to assign a first one of the two identifiers of the first pair of two identifiers to a first processed channel of the first group of exactly two processed channels, and wherein the apparatus is adapted to assign a second one of the two identifiers of the first pair of two identifiers to a second processed channel of the first group of exactly two processed channels.

11. An apparatus according to claim 10, wherein the second multichannel parameters indicate a second pair of two identifiers of the set of the three or more identifiers, wherein the multichannel processor is adapted to select the second selected pair of two decoded channels from the updated set of three or more decoded channels by selecting the two decoded channels being assigned to the two identifiers of the second pair of two identifiers;

wherein the apparatus is adapted to assign a first one of the two identifiers of the second pair of two identifiers to a first processed channel of the second group of exactly two processed channels, and wherein the apparatus is adapted to assign a second one of the two identifiers of the second pair of two identifiers to a second processed channel of the second group of exactly two processed channels.

12. An apparatus according to claim 10, wherein the first multichannel parameters indicate said first pair of two identifiers of the set of the three or more identifiers, and wherein the noise filling module is adapted to select the exactly two previous audio output channels from the three or more previous audio output channels by selecting the two previous audio output channels being assigned to the two identifiers of said first pair of two identifiers.

13. An apparatus according to claim 1, wherein, before the multichannel processor generates the first pair of two or more processed channels based on said first selected pair of two decoded channels, the noise filling module is adapted to identify for at least one of the two channels of said first selected pair of two decoded channels, one or more scale factor bands being the one or more frequency bands, within which all spectral lines are quantized to zero, and to generate the mixing channel using said two or more, but not all of the three or more previous audio output channels, and to fill the spectral lines of the one or more scale factor bands, within which all spectral lines are quantized to zero, with the noise depending on a scale factor of each of the one or more scale factor bands within which all spectral lines are quantized to zero.

14. An apparatus according to claim 13, wherein the apparatus comprises a receiving interface configured to receive the scale factor of each of said one or more scale factor bands, and wherein the scale factor of each of said one or more scale factor bands indicates an energy of the spectral lines of said scale factor band before quantization, and wherein the noise filling module is adapted to generate the noise for each of the one or more scale factor bands, within which all spectral lines are quantized to zero, so that an energy of the spectral lines after adding the noise into one of the frequency bands corresponds to the energy being indicated by the scale factor for said scale factor band.

15. Apparatus for encoding a multichannel signal comprising at least three channels, wherein the apparatus comprises:

an iteration processor being adapted to calculate, in a first iteration step, inter-channel correlation values between each pair of the at least three channels, for selecting, in the first iteration step, a pair comprising a highest value or comprising a value above a threshold, and for processing the selected pair to derive initial multichannel parameters for the selected pair and to derive first processed channels, wherein the iteration processor is adapted to perform the calculating, the selecting and the processing in a second iteration step using at least one of the processed channels to derive further multichannel parameters and second processed channels;

a channel encoder being adapted to encode channels resulting from an iteration processing performed by the iteration processor to acquire encoded channels; and an output interface being adapted to generate an encoded multichannel signal comprising the encoded channels, and comprising an information indicating whether or not an apparatus for decoding shall fill spectral lines of one or more frequency bands, within which all spectral lines are quantized to zero, with noise generated based on previously decoded audio output channels that have been previously decoded by the apparatus for decoding.

16. Apparatus according to claim 15, wherein each of the initial multichannel parameters and the further multichannel parameters indicate exactly two channels, each one of the exactly two channels being one of the encoded channels or being one of the first or the second processed channels or being one of the at least three channels.

17. System comprising:

an apparatus for encoding a multichannel signal comprising at least three channels, wherein the apparatus comprises:

an iteration processor being adapted to calculate, in a first iteration step, inter-channel correlation values between each pair of the at least three channels, for selecting, in the first iteration step, a pair comprising a highest value or comprising a value above a threshold, and for processing the selected pair to derive initial multichannel parameters for the selected pair and to derive first processed channels, wherein the iteration processor is adapted to perform the calculating, the selecting and the processing in a second iteration step using at least one of the processed channels to derive further multichannel parameters and second processed channels;

a channel encoder being adapted to encode channels resulting from an iteration processing performed by the iteration processor to acquire encoded channels; and an output interface being adapted to generate an encoded multichannel signal comprising the encoded channels, the initial multichannel parameters and the further multichannel parameters and comprising an information indicating whether or not an apparatus for decoding shall fill spectral lines of one or more frequency bands, within which all spectral lines are quantized to zero, with noise generated based on previously decoded audio output channels that have been previously decoded by the apparatus for decoding; and an apparatus for decoding according to claim 1, wherein the apparatus for decoding is configured to receive the encoded multichannel signal, being generated by the apparatus for encoding, from the apparatus for encoding.

18. Method for decoding a previous encoded multichannel signal of a previous frame to acquire three or more previous audio output channels, and for decoding a current encoded multichannel signal of a current frame to acquire two or more current audio output channels, wherein the method comprises:

decoding the current encoded multichannel signal of the current frame to acquire a set of three or more decoded channels of the current frame;

selecting a first selected pair of two decoded channels from the set of three or more decoded channels depending on first multichannel parameters of side information;

generating a first group of two or more processed channels based on said first selected pair of two decoded channels to acquire an updated set of three or more decoded channels;

wherein, before the first pair of two or more processed channels is generated based on said first selected pair of two decoded channels, the following steps are conducted:

wherein for at least one of the two channels of said first selected pair of two decoded channels, one or more frequency bands exist, within which all spectral lines are quantized to zero, and generating a mixing channel is conducted using two or more, but not all of the three or more previous audio output channels, and filling the spectral lines of the one or more frequency bands, within which all spectral lines are quantized to zero, with noise, wherein selecting the two or more previous audio output channels that are used for generating the mixing channel from the three or more previous audio output channels is conducted depending on the side information.

19. Method for encoding a multichannel signal comprising at least three channels, wherein the method comprises:

calculating, in a first iteration step, inter-channel correlation values between each pair of the at least three channels, for selecting, in the first iteration step, a pair comprising a highest value or comprising a value above a threshold, and processing the selected pair to derive initial multichannel parameters for the selected pair and to derive first processed channels;

performing the calculating, the selecting and the processing in a second iteration step using at least one of the processed channels to derive further multichannel parameters and second processed channels;

encoding channels resulting from an iteration processing performed by the iteration processor to acquire encoded channels; and generating an encoded multichannel signal comprising the encoded channels and comprising an information indicating whether or not an apparatus for decoding shall fill spectral lines of one or more frequency bands, within which all spectral lines are quantized to zero, with noise generated based on previously decoded audio output channels that have been previously decoded by the apparatus for decoding.

20. A non-transitory digital storage medium comprising a computer program stored thereon to perform the method for decoding a previous encoded multichannel signal of a previous frame to acquire three or more previous audio output channels, and for decoding a current encoded multichannel signal of a current frame to acquire two or more current audio output channels, wherein the method comprises:

decoding the current encoded multichannel signal of the current frame to acquire a set of three or more decoded channels of the current frame;

selecting a first selected pair of two decoded channels from the set of three or more decoded channels depending on first multichannel parameters of side information;

generating a first group of two or more processed channels based on said first selected pair of two decoded channels to acquire an updated set of three or more decoded channels;

wherein, before the first pair of two or more processed channels is generated based on said first selected pair of two decoded channels, the following steps are conducted:

wherein for at least one of the two channels of said first selected pair of two decoded channels, one or more frequency bands exist, within which all spectral lines are quantized to zero, and generating a mixing channel is conducted using two or more, but not all of the three or more previous audio output channels, and filling the spectral lines of the one or more frequency bands, within which all spectral lines are quantized to zero, with noise, wherein selecting the two or more previous audio output channels that are used for generating the mixing channel from the three or more previous audio output channels is conducted depending on the side information, when said computer program is run by a computer.

21. A non-transitory digital storage medium comprising a computer program stored thereon to perform the method encoding a multichannel signal comprising at least three channels, wherein the method comprises:

calculating, in a first iteration step, inter-channel correlation values between each pair of the at least three channels, for selecting, in the first iteration step, a pair comprising a highest value or comprising a value above a threshold, and processing the selected pair to derive initial multichannel parameters for the selected pair and to derive first processed channels;

performing the calculating, the selecting and the processing in a second iteration step using at least one of the processed channels to derive further multichannel parameters and second processed channels;

encoding channels resulting from an iteration processing performed by the iteration processor to acquire encoded channels; and generating an encoded multichannel signal comprising the encoded channels, the initial multichannel parameters and the further multichannel parameters and comprising an information indicating whether or not an apparatus for decoding shall fill spectral lines of one or more frequency bands, within which all spectral lines are quantized to zero, with noise, when said computer program is run by a computer.

* * * * *